United States Patent
Seiver et al.

(10) Patent No.: US 9,648,036 B2
(45) Date of Patent: May 9, 2017

(54) SYSTEMS FOR NETWORK RISK ASSESSMENT INCLUDING PROCESSING OF USER ACCESS RIGHTS ASSOCIATED WITH A NETWORK OF DEVICES

(71) Applicant: PALANTIR TECHNOLOGIES INC., Palo Alto, CA (US)

(72) Inventors: Miles Seiver, Los Altos Hills, CA (US); Stephen Cohen, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/209,434

(22) Filed: Jul. 13, 2016

(65) Prior Publication Data
US 2017/0078322 A1    Mar. 16, 2017

Related U.S. Application Data

(63) Continuation-in-part of application No. 14/731,312, filed on Jun. 4, 2015, now Pat. No. 9,467,455, which
(Continued)

(51) Int. Cl.
*H04L 29/06*     (2006.01)
*H04L 12/24*     (2006.01)

(52) U.S. Cl.
CPC ...... *H04L 63/1433* (2013.01); *H04L 41/0866* (2013.01); *H04L 41/12* (2013.01); *H04L 63/102* (2013.01)

(58) Field of Classification Search
CPC . H04L 63/1433; H04L 41/0866; H04L 41/12; H04L 63/102
See application file for complete search history.

(56) References Cited

U.S. PATENT DOCUMENTS 5,951,644 A    9/1999   Creemer
5,978,475 A    11/1999  Schneier et al.
(Continued)

FOREIGN PATENT DOCUMENTS

CN    101729531    6/2010
CN    103281301    9/2013
(Continued)

OTHER PUBLICATIONS

Allgress, "Allgress Risk Analysis Module," http://www.allgress.com/en/products/risk-analysis-module/ as printed Jan. 6, 2015 in 3 pages.
(Continued)

*Primary Examiner* — Darren B Schwartz
(74) *Attorney, Agent, or Firm* — Knobbe Martens Olson & Bear LLP

(57) ABSTRACT

Methods, systems, and apparatus, including computer programs encoded on computer storage media, for network risk assessment. One of the methods includes obtaining information describing network traffic between a plurality of network devices within a network. A network topology of the network is determined based on the information describing network traffic, with the network topology including nodes connected by an edge to one or more other nodes, and with each node being associated with one or more network devices. Indications of user access rights of users are associated to respective nodes included in the network topology. User interface data associated with the network topology is generated.

25 Claims, 44 Drawing Sheets

Related U.S. Application Data is a continuation of application No. 14/585,043, filed on Dec. 29, 2014, now Pat. No. 9,100,430.

(60) Provisional application No. 62/334,918, filed on May 11, 2016, provisional application No. 62/272,999, filed on Dec. 30, 2015.

(56) References Cited

U.S. PATENT DOCUMENTS

| | | | |
|---|---|---|---|
| 6,499,034 B1 | 12/2002 | Mackinlay | |
| 6,535,227 B1 | 3/2003 | Fox et al. | |
| 6,725,240 B1 | 4/2004 | Asad et al. | |
| 6,807,569 B1 | 10/2004 | Bhimani et al. | |
| 6,826,698 B1 | 11/2004 | Minkin et al. | |
| 6,895,383 B2 | 5/2005 | Heinrich | |
| 7,013,395 B1 | 3/2006 | Swiler et al. | |
| 7,017,046 B2 | 3/2006 | Doyle et al. | |
| 7,069,586 B1 | 6/2006 | Winneg et al. | |
| 7,120,120 B2 | 10/2006 | Guerin et al. | |
| 7,159,023 B2 | 1/2007 | Tufts | |
| 7,193,968 B1 | 3/2007 | Kapoor et al. | |
| 7,225,468 B2 | 5/2007 | Waisman et al. | |
| 7,450,524 B2 | 11/2008 | Hennessey et al. | |
| 7,472,421 B2 | 12/2008 | Cummins | |
| 7,555,778 B2 | 6/2009 | Noel et al. | |
| 7,596,285 B2 | 9/2009 | Brown et al. | |
| 7,663,626 B2 | 2/2010 | Rexroad et al. | |
| 7,770,032 B2 | 8/2010 | Nesta et al. | |
| 7,801,871 B2 | 9/2010 | Gosnell | |
| 7,855,978 B2 | 12/2010 | Beaudoin | |
| 7,864,707 B2 | 1/2011 | Dimitropoulos et al. | |
| 7,890,869 B1 | 2/2011 | Mayer et al. | |
| 7,904,962 B1 | 3/2011 | Jajodia et al. | |
| 7,962,495 B2 | 6/2011 | Jain et al. | |
| 7,971,244 B1 | 6/2011 | Kajekar et al. | |
| 8,099,760 B2 | 1/2012 | Cohen et al. | |
| 8,132,260 B1 | 3/2012 | Mayer et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,209,760 B1 | 6/2012 | Hardman | |
| 8,239,668 B1 | 8/2012 | Chen et al. | |
| 8,272,061 B1* | 9/2012 | Lotem | G06F 21/577 709/223 |
| 8,301,904 B1 | 10/2012 | Gryaznov | |
| 8,307,444 B1 | 11/2012 | Mayer et al. | |
| 8,312,546 B2 | 11/2012 | Alme | |
| 8,321,944 B1* | 11/2012 | Mayer | G06F 21/577 726/22 |
| 8,402,546 B2 | 3/2013 | Greenshpon et al. | |
| 8,407,798 B1* | 3/2013 | Lotem | G06F 21/55 726/18 |
| 8,490,196 B2 | 7/2013 | Lucangeli Obes et al. | |
| 8,494,955 B2 | 7/2013 | Quarterman et al. | |
| 8,601,587 B1 | 12/2013 | Powell et al. | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,780,758 B2 | 7/2014 | Bukofser et al. | |
| 8,782,794 B2 | 7/2014 | Ramcharran | |
| 8,931,043 B2 | 1/2015 | Cooper et al. | |
| 9,009,827 B1 | 4/2015 | Albertson et al. | |
| 9,021,260 B1 | 4/2015 | Falk et al. | |
| 9,049,117 B1 | 6/2015 | Nucci et al. | |
| 9,058,492 B1* | 6/2015 | Satish | G06F 21/50 |
| 9,100,428 B1 | 8/2015 | Visbal | |
| 9,100,430 B1 | 8/2015 | Seiver et al. | |
| 9,292,695 B1* | 3/2016 | Bassett | G06F 21/577 |
| 2002/0112157 A1 | 8/2002 | Doyle et al. | |
| 2002/0120558 A1 | 8/2002 | Reid | |
| 2002/0147803 A1* | 10/2002 | Dodd | G06F 21/577 709/223 |
| 2003/0028803 A1* | 2/2003 | Bunker | H04L 12/2602 726/4 |
| 2004/0123139 A1 | 6/2004 | Aiello et al. | |
| 2004/0153418 A1 | 8/2004 | Hanweck | |
| 2004/0167793 A1 | 8/2004 | Masuoka et al. | |
| 2004/0250124 A1 | 12/2004 | Chesla et al. | |
| 2005/0050351 A1* | 3/2005 | Cain | H04L 63/1433 726/4 |
| 2005/0071650 A1* | 3/2005 | Jo | G06F 21/55 713/188 |
| 2005/0096944 A1 | 5/2005 | Ryan | |
| 2005/0131828 A1 | 6/2005 | Gearhart | |
| 2005/0132225 A1* | 6/2005 | Gearhart | G06Q 10/00 726/4 |
| 2005/0157662 A1 | 7/2005 | Bingham et al. | |
| 2005/0229256 A2 | 10/2005 | Banzhof | |
| 2005/0257267 A1* | 11/2005 | Williams | H04L 63/1408 726/25 |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0129672 A1 | 6/2006 | Mayer | |
| 2006/0195905 A1* | 8/2006 | Fudge | G06F 11/008 726/25 |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0067847 A1* | 3/2007 | Wiemer | H04L 63/1433 726/25 |
| 2007/0143851 A1 | 6/2007 | Nicodemus et al. | |
| 2007/0226796 A1* | 9/2007 | Gilbert | G06F 21/55 726/22 |
| 2007/0294766 A1* | 12/2007 | Mir | G06F 21/577 726/23 |
| 2008/0104407 A1 | 5/2008 | Horne et al. | |
| 2008/0104665 A1* | 5/2008 | Naldurg | G06F 21/577 726/2 |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0138938 A1 | 5/2009 | Harrison et al. | |
| 2009/0168648 A1 | 7/2009 | Labovitz et al. | |
| 2009/0228701 A1 | 9/2009 | Lin | |
| 2009/0271863 A1* | 10/2009 | Govindavajhala | H04L 63/1433 726/23 |
| 2009/0327903 A1 | 12/2009 | Smith et al. | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0235915 A1 | 9/2010 | Memon et al. | |
| 2010/0262688 A1 | 10/2010 | Hussain et al. | |
| 2010/0275263 A1 | 10/2010 | Bennett et al. | |
| 2010/0330801 A1 | 12/2010 | Rouh | |
| 2011/0060910 A1 | 3/2011 | Gornish et al. | |
| 2011/0202555 A1 | 8/2011 | Cordover et al. | |
| 2011/0219450 A1 | 9/2011 | McDougal et al. | |
| 2012/0023230 A1 | 1/2012 | Hosking et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0143650 A1* | 6/2012 | Crowley | G06F 21/554 705/7.28 |
| 2012/0144476 A1* | 6/2012 | McClure | G02B 6/105 726/11 |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0266245 A1 | 10/2012 | McDougal et al. | |
| 2012/0284791 A1 | 11/2012 | Miller et al. | |
| 2012/0290989 A1* | 11/2012 | Li | G06Q 10/04 715/853 |
| 2012/0304244 A1 | 11/2012 | Xie et al. | |
| 2012/0323829 A1 | 12/2012 | Stokes et al. | |
| 2012/0330801 A1 | 12/2012 | McDougal et al. | |
| 2013/0019306 A1 | 1/2013 | Lagar-Cavilla et al. | |

(56) References Cited

U.S. PATENT DOCUMENTS

| | | | |
|---|---|---|---|
| 2013/0096980 A1* | 4/2013 | Basavapatna | G06Q 10/00 705/7.28 |
| 2013/0097662 A1* | 4/2013 | Pearcy | G06F 21/577 726/1 |
| 2013/0097709 A1 | 4/2013 | Basavapatna et al. | |
| 2013/0104236 A1* | 4/2013 | Ray | H04L 63/1408 726/25 |
| 2013/0139268 A1 | 5/2013 | An et al. | |
| 2013/0191919 A1* | 7/2013 | Basavapatna | G06F 21/577 726/25 |
| 2013/0239217 A1 | 9/2013 | Kindler et al. | |
| 2013/0247205 A1* | 9/2013 | Schrecker | G06F 21/577 726/25 |
| 2014/0059683 A1 | 2/2014 | Ashley | |
| 2014/0082196 A1 | 3/2014 | Harrison et al. | |
| 2014/0123279 A1 | 5/2014 | Bishop et al. | |
| 2014/0130160 A1 | 5/2014 | Golovanov | |
| 2014/0143009 A1 | 5/2014 | Brice et al. | |
| 2014/0173090 A1 | 6/2014 | Davis | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0222745 A1 | 8/2014 | Deng et al. | |
| 2014/0229422 A1 | 8/2014 | Jain et al. | |
| 2014/0282854 A1 | 9/2014 | Clark et al. | |
| 2014/0282855 A1 | 9/2014 | Clark et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castellucci et al. | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0021117 A1* | 1/2016 | Harmon | H04L 63/102 726/1 |
| 2016/0028759 A1 | 1/2016 | Visbal | |
| 2016/0301709 A1* | 10/2016 | Hassanzadeh | H04L 63/1433 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |
| WO | WO 2007/061404 | 5/2007 |
| WO | WO 2010/042979 | 4/2010 |

OTHER PUBLICATIONS

Ammann et al., "Scalable, Graph-Based Network Vulnerability Analysis," CCS '02—Proceedings of the 9th ACM Conference on Computer and Communications Security, Nov. 18-22, 2002, pp. 218-224.
Baker et al., "The Development of a Common Enumeration of Vulnerabilities and Exposures," Presented at the Second International Workshop on Recent Advances in Intrusion Detection, Sep. 7-9, 1999, pp. 35.
Bhuyan et al., "Network Anomaly Detection: Methods, Systems and Tools" First Quarter 2014, IEEE, 34 pages.
Böhme, "Cyber-Insurance Revisited," Presented at the Workshop on the Economics of Information Security Kennedy School of Government at Harvard University, Jun. 3, 2005, pp. 22.
Cashell et al., "The Economic Impact of Cyber-Attacks," CRS Report for Congress, Order Code RL32331, Apr. 1, 2004, pp. 45.
Crosby et al., "Efficient Data Structures for Tamper-Evident Logging," Department of Computer Science, Rice University, 2009, pp. 17.

Dantu et al., "Risk Management Using Behavior Based Attack Graphs," Proceedings of the International Conference on Information Technology, Coding and Computing (ITCC '04), 2004, pp. 5.
EMC, "RSA Security Analytics," http://www.emc.com/security/security-analytics/security-analytics.htm, printed Jan. 6, 2015, pp. 2.
Eusegeld et al., "Dependability Metrics, Advanced Lectures," Lecture Notes in Computer Science, vol. 4909, 1998, pp. 304.
FireEye—Products and Solutions Overview, http://www.fireeye.com/products-and-solutions Printed Jun. 30, 2014 in 3 pages.
FireEye, http://www.fireeye.com; printed Jun. 30, 2014 in 2 pages.
Firemon, http://www.firemon.com/, printed Jan. 6, 2015 in 2 pages.
Glaab et al., "EnrichNet: Network-Based Gene Set Enrichment Analysis," Bioinformatics 28.18 (2012): pp. i451-i457.
Harmantzis et al., "Security Risk Analysis and Evaluation," 2004 IEEE International Conference on Communications, vol. 4, Jun. 20-24, 2004, pp. 1897-1901.
Homer et al., "A Sound and Practical Approach to Quantifying Security Risk in Enterprise Networks," Technical Report, Kansas State University, 2009, pp. 1-15.
Huang et al., "Systematic and Integrative Analysis of Large Gene Lists Using DAVID Bioinformatics Resources", Nature Protocols, 2009, vol. 4, No. 1, pp. 44-57.
Hur et al., "SciMiner: web-based literature mining tool for target identification and functional enrichment analysis," Bioinformatics 25.6 (2009): pp. 838-840.
Idika et al., "Extending Attack Graph-Based Security Metrics and Aggregating Their Application," IEEE Transactions on Dependable and Secure Computing, vol. 9, No. 1, Jan./Feb. 2012, pp. 75-85.
Ingols et al., "Practical Attack Graph Generation for Network Defense," MIT, Proceedings of the 22nd Annual Computer Security Applications Conference (ACSAC '06), 2006, pp. 10.
Jajodia et al., "Topological Analysis of Network Attack Vulnerability," Center for Secure Information Systems, George Mason University, Chapter 5, Springer, 2005, pp. 1-20.
Jajodia et al., "Topological Vulnerability Analysis: A Powerful New Approach for Network Attack Prevention, Detection, and Response," Center for Secure Information Systems, George Mason University, Cyber Situation Awareness, Advances in Information Security 46, Springer, 2010, pp. 1-20.
Jha et al., "Two Formal Analyses of Attack Graphs," CSFW '02 Proceedings of the 15th IEEE Workshop on Computer Security Foundations, 2002, pp. 15.
Johnson, "Managing Information Risk and the Economics of Security," Center for Digital Strategies, Springer, Dec. 2008, pp. 339.
Kotenko et al., "Attack Graph Based Evaluation of Network Security," Communications and Multimedia Security, 2006, vol. 4237, pp. 216-227.
Lee et al., "A Data Mining and CIDF Based Approach for Detecting Novel and Distributed Intrusions," Lecture Notes in Computer Science, vol. 1907 Nov. 11, 2000, pp. 49-65.
Live Action, "NetFlow Visualization," http://liveaction.com/netflow-visualization/ printed on Jan. 6, 2015, pp. 5.
"Lumeta Integrates Products with Allgress" Insurance Networking News (Online), http://news.advisen.com/documents/AMX/20140325/01/201403250100SM_ONLINE_00034081_110.216.xml, Mar. 25, 2014, pp. 1.
Lumeta Ipsonar, "Active Network Discovery, Mapping & Leak Path Detection," Data Sheet, http://www.lumeta.com/pdfs/Lumeta_IPsonar_datasheet.pdf, 2014, pp. 4.
Lumeta, "Alliance Partners," http://www.Lumeta.com/partners/alliancepartners.html, printed Jan. 6, 2015 in 5 pages.
Lumeta, "Lumeta IPsonar," http://wwww.Lumeta.com/product/ipsonar.html, printed Jan. 6, 2015 in 3 pages.
Lumeta, "Lumeta IPsonar: Network Discovery and Visual Analytics," available at https://web.archive.org/web/20140203135659/http://www.lumeta.com/public-content/Map-Interactivity/index.html, as accessed Feb. 3, 2014.
Lumeta, "Strategic Partners," http://www.lumeta.com/partners/strategicpartners.html, printed Jan. 6, 2015 in 2 pages.
Lumeta, "Technology Partners & Integrations," http://www.lumeta.com/partners/technicalpartners.html, printed Jan. 6, 2015 in 2 pages.

(56) References Cited

OTHER PUBLICATIONS

Lumeta, "Webinar: How to Assess True Risk within the Enterprise," available at http://web.archive.org/web/20150107184030/http://www.youtube.com/watch!v=TuB-ekUFYGo, as accessed Jan. 7, 2015.

Lumeta, http://www.Lumeta.com, printed Jan. 6, 2015 in 2 pages.

Ma et al., "A New Approach to Secure Logging," ACM Transactions on Storage, vol. 5, No. 1, Article 2, Published Mar. 2009, 21 pages.

Madan et al., "A Method for Modeling and Quantifying the Security Attributes of Intrusion Tolerant Systems," Performance Evaluation, vol. 56, 2004, pp. 167-186.

Madan et al., "Security Modeling and Quantification of Intrusion Tolerant Systems Using Attack-Response Graph," Journal of High Speed Networks, vol. 13, No. 4, 2004, pp. 14.

Madan et al., "Security Modeling and Quantification of Intrusion Tolerant Systems," Fast Abstract ISSRE, Chillarge Press, 2002, pp. 2.

Mehta et al., "Ranking Attack Graphs," RAID '06 Proceedings of the 9th International Conference on Recent Advances in Intrusion Detection, 2006, pp. 127-144.

Nessus, http://www.tenable.com/products/nessus, printed Jan. 6, 2015 in 8 pages.

Nicol et al., "Model-Based Evaluation: From Dependability to Security," Dependable and Secure Computing, IEEE Transactions, vol. 1, No. 1, 2004, pp. 48-65.

Noel et al., "Measuring Security Risk of Networks Using Attack Graphs," International Journal of Next-Generation Computing, vol. 1, No. 1, Jul. 2010, pp. 135-147.

Phillips et al., "A Graph-Based System for Network-Vulnerability Analysis," NSPW '98 Proceedings of the 1998 Workshop on New Security Paradigms, New York, NY, 1998, pp. 71-79.

"RedSeal Continuous Monitoring Solutions Selected to Support Missions of U.S. Intelligence Community," https://www.igt.org/redseal-continuous-monitoring-solutions-selected-to-support-mission-of-u-s-intelligence-community/, In-Q-Tel, Jan. 10, 2011, 1 page.

RedSeal, https://redseal.co/, printed on Jan. 5, 2015, 3 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

Shackelford, "Should Your Firm Invest in Cyber Risk Insurance?" Business Horizons, 2012, vol. 55, pp. 349-356.

Sheyner et al., "Tools for Generating and Analyzing Attack Graphs," Formal Methods for Components and Objects, Second International Symposium, FMCO 2003, Leiden, The Netherlands, Nov. 4-7, 2003, Revised Lectures, 2004, pp. 344-371.

Singhal et al., "Security Risk Analysis of Enterprise Networks Using Probabilistic Attack Graphs," National Institute of Standards and Technology & U.S. Department of Commerce, NIST Interagency Report 7788, Aug. 2011, pp. 24.

SolarWinds, "Network Topology Mapper," http://www.solarwinds.com/network-topology-mapper.aspx, printed Jan. 6, 2015 in 6 pages.

Sommestad et al., "Cyber Security Risks Assessment with Bayesian Defense Graphs and Architectural Models," 42nd Hawaii International Conference on System Sciences, HICSS-42, Jan. 5-8, 2009, pp. 1-10.

Soo Hoo, Kevin J., "How Much is Enough? A Risk-Management Approach to Computer Security," Consortium for Research on Information Security and Policy, Jun. 2000, pp. 99.

Sturges et al., "Computer Attack: The Role of Modelling in Developing an Integrated Security Policy," Conference Proceedings, 14th International Conference of the System Dynamics Society, vol. 2, 1996, pp. 525-528.

Taylor et al., "Risk Analysis and Probabilistic Survivability Assessment (RAPSA): An Assessment Approach for Power Substation Hardening," in Proceedings of the 1st Workshop on Scientific Aspects of Cyber Terrorism, Nov. 2002, pp. 9.

"The Financial Impact of Cyber Risk: 50 Questions Every CFO Should Ask," American National Standards Institute/Internet Security Alliance, 2008, pp. 40.

Tuffin, "Network Topology," http://www.tufin.com/products-solutions/products/network-topology/, printed Jan. 6, 2015 in 3 pages.

Varonis, http://www.varonis.com/, printed Jan. 6, 2015 in 3 pages.

Verendel, Vilhelm, "Quantified Security is a Weak Hypothesis: A Critical Survey of Results and Assumptions," NSPW '09, Sep. 8-11, 2009, Oxford, United Kingdom, pp. 37-49.

VirusTotal—About, http://www.virustotal.com/en/about/ Printed Jun. 30, 2014 in 8 pages.

Wang et al., "Exploring Attack Graph for Cost-Benefit Security Hardening: A Probabilistic Approach," Computers & Security, vol. 32, 2013, pp. 158-169.

Wang et al., "Generation and Analysis of Attack Graphs," Procedia Engineering, vol. 29, 2012, pp. 4053-4057.

Wang et al., "Measuring the Overall Security of Network Configurations Using Attack Graphs," 21st Annual IFIP WG 11.3 Working Conference on Data and Applications Security, Jul. 8-11, 2007, pp. 16.

Wang et al., "Minimum-Cost Network Hardening Using Attack Graphs," Computer Communications, vol. 29, 2006, pp. 3812-3824.

Wang et al., "An Attack Graph-Based Probabilistic Security Metric," 22nd Annual IFIP WG 11.3 Working Conference on Data and Applications Security, Jul. 13-16, 2008, pp. 16.

Waters et al., "Building an Encrypted and Searchable Audit Log," Published Jan. 9, 2004, 11 pages, http://www.parc.com/content/attachments/building_encrypted_searchable_5059_parc.pdf.

Willis, Amy, "Business Insurance: First-Party Commercial Property Insurance and the Physical Damage Requirement in a Computer-Dominated World," Florida State University Law Review, vol. 37, No. 4, Summer 2010, pp. 21.

Yun et al., "A Probabilistic Computing Approach of Attack Graph-Based Nodes in Large-Scale Network," Procedia Environmental Sciences, vol. 10, 2011, pp. 3-8.

Yun et al., "An Attack Graph-Based Probabilistic Computing Approach of Network Security," Chinese Journal of Computers, vol. 33, No. 10, Oct. 2010, pp. 1987-1996.

Zhang et al., "An Effective Method to Generate Attack Graph," Proceedings of the Fourth International Conference on Machine Learning and Cybernetics, Guangzhou, Aug. 18-21, 2005, pp. 3926-3931.

Zhang et al., "Effective Network Vulnerability Assessment through Model Abstraction," DIMVA'11 Proceedings of the 8th International Conference on Detection of Intrusions and Malware, and Vulnerability Assessment, 2011, pp. 18.

Zheng et al., "GOEAST: a web-based software toolkit for Gene Ontology enrichment analysis," Nucleic acids research 36.suppl 2 (2008): pp. W385-W363.

Notice of Allowance for U.S. Appl. No. 14/033,076 dated Mar. 11, 2016.

Notice of Allowance for U.S. Appl. No. 14/223,918 dated Jan. 6, 2016.

Notice of Allowance for U.S. Appl. No. 14/280,490 dated Nov. 26, 2014.

Notice of Allowance for U.S. Appl. No. 14/473,860 dated Feb. 27, 2015.

Notice of Allowance for U.S. Appl. No. 14/473,860 dated Jan. 5, 2015.

Notice of Allowance for U.S. Appl. No. 14/479,863 dated Mar. 31, 2015.

Official Communication for European Patent Application No. 14199180.2 dated Jun. 22, 2015.

Official Communication for European Patent Application No. 14199180.2 dated Aug. 31, 2015.

Official Communication for European Patent Application No. 15175106.2 dated Nov. 5, 2015.

Official Communication for European Patent Application No. 15180985.2 dated Jan. 15, 2016.

(56) References Cited

OTHER PUBLICATIONS

Official Communication for European Patent Application No. 15202920.3 dated May 6, 2016.
Official Communication for U.S. Appl. No. 14/033,076 dated Aug. 13, 2015.
Official Communication for U.S. Appl. No. 14/033,076 dated Nov. 6, 2015.
Official Communication for U.S. Appl. No. 14/223,918 dated Jun. 8, 2015.
Official Communication for U.S. Appl. No. 14/280,490 dated Jul. 24, 2014.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/731,312 dated Apr. 14, 2016.
Official Communication for U.S. Appl. No. 14/816,748 dated Apr. 1, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.

* cited by examiner

⊕ CREATIVE METRIC — 2500

METRIC TYPE — 2502     DEFAULT DISPLAY VALUE — 2504

| User | System |
| --- | --- |

| Count | Percent |
| --- | --- |

METRIC NAME AND DESCRIPTION — 2506

Inactive — 2508

Description

METRIC DEFINITION

Denominator Filters — 2510   Numerator Filters — 2512

| Is Enabled ▶ | True | 2516 |
| --- | --- | --- |
| Is Enabled | True | |

Is AD Admin
Last Logon — 2515
Password Last Set — 2514   within the last ▶   30   days
Distinguished Name
Short Name
Long Name 2518   Cancel   Save — 2519

FIG. 25A

⊕ CREATIVE METRIC

METRIC TYPE — 2522　　　DEFAULT DISPLAY VALUE

| User | System |　　| Count | Percent |

METRIC NAME AND DESCRIPTION

Inactive

Description

METRIC DEFINITION

Denominator Filters ⎯ 2524 Numerator Filters

| Is Enabled ▶ | True |

| Chassis Type |
| Short Name |
| Distinguished Name |
| Password Last Set |
| Last Logon |
| Last Active in SCCM |
| Has Application Data |

Cancel　Save

⊕ CREATIVE METRIC

METRIC TYPE ⟋2532
| User | System |

DEFAULT DISPLAY VALUE ⟋2530
| Count | Percent |

METRIC NAME AND DESCRIPTION

Server OS

Percent of systems executing a server operating system that are enabled

METRIC DEFINITION

Denominator Filters     Numerator Filters ⟋2534

| Is Enabled ▼ | | True ▼ |

| OS Type ▼ | is ▼ | Server OS ▼ |

⊕ Add new filter

⊗ Clear Definition

Cancel  Save

FIG. 25D

SYSTEMS FOR NETWORK RISK ASSESSMENT INCLUDING PROCESSING OF USER ACCESS RIGHTS ASSOCIATED WITH A NETWORK OF DEVICES

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Networks are commonly utilized to connect an organization's, e.g., a company's, computer systems and electronically stored information. The organization can utilize components, e.g., routers, to receive connection requests from network devices, e.g., computer systems, and route the requests to appropriate devices that can handle the requests. Networks can include thousands or millions of network devices, with thousands or millions of user accounts permitted to access the network devices.

System administrators, e.g., people that set up and maintain networks, can attempt to separate their networks such that certain users/devices cannot access other parts of the network. To effect this separation, system administrators can utilize firewalls to block access, and utilize access control lists that identify user accounts expressly permitted to access particular network devices.

SUMMARY

In general, one innovative aspect of the subject matter described in this specification can be embodied in methods that include the actions of obtaining information describing network traffic between a plurality of network devices within a network; determining, based on the information describing network traffic, a network topology of the network, wherein the network topology comprises a plurality of nodes each connected by an edge to one or more of the plurality of nodes, and wherein each node is associated with one or more network devices; associating indications of user access rights of users to respective nodes included in the network topology; and generating user interface data associated with the network topology.

The foregoing and other embodiments can each optionally include one or more of the following features, alone or in combination. An indication of user access rights of a particular user to a particular node comprises one or more of: information indicating that the particular user is permitted access to a space which includes at least one network device associated with the particular node, information indicating that a user account associated with the particular user can provide information to, or receive information from, at least one network device associated with the particular node, or information indicating that the user account associated with the particular user is permitted to access, or has actually attempted to access, at least one network device associated with the particular node. The actions include obtaining access control lists associated with respective nodes, wherein each access control list identifies user accounts permitted to access one or more network devices associated with a node. The actions include obtaining access records associated with respective nodes, wherein each access record identifies actual access attempts by user accounts to one or more network devices associated with a node. Generating user interface data comprises generating a graph identifying the network topology. Each edge included in the network topology represents a communication path. The actions include receiving an identifier of a particular user; obtaining indications of user access rights of the particular user that are associated with respective nodes included in the network topology; and including information in the user interface data identifying the indications of user access rights.

Particular embodiments of the subject matter described in this specification can be implemented so as to realize one or more of the following advantages. A system can efficiently determine a network topology describing connections between network devices of a network, and user accounts permitted to access each network device. The system can then automatically determine weaknesses in the network, such as a previously unknown communication path between secure and insecure parts of the network, and quantify risks associated with the network, e.g., a loss to a company if a network device or user account were compromised. In this way, a company can obtain visual representations of its network, quickly view the level of access that each user account or network device has with respect to its network, and quantify costs associated with a compromised level of access.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 25A illustrates an example user interface for creating a metric to be applied to user accounts or systems associated with one or more networks.

FIG. 25B illustrates an example user interface for creating a metric associated with a network device.

FIG. 25C-25D illustrate an example of creating a metric.

Like reference numbers and designations in the various drawings indicate like elements.

DETAILED DESCRIPTION

Figure 1:
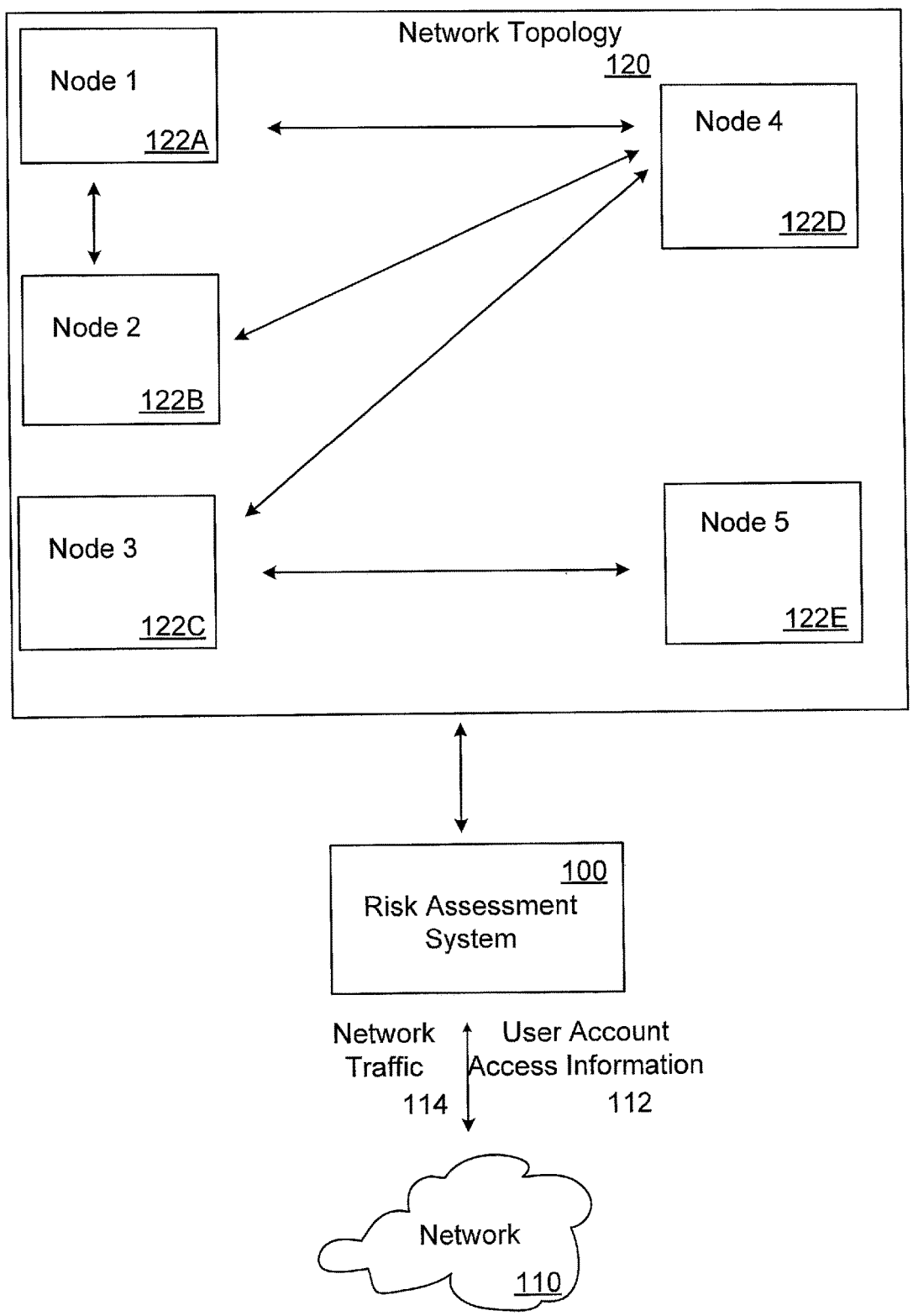
FIG. 1 illustrates a risk assessment system in communication with a network and an example of a determined network topology.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Definitions

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Network Devices refers generally to any server, laptop, desktop, storage device, router, point of sale machines, and so on. A network device may be accessed by a single user or may be accessed by multiple users, such as directly (e.g., sitting at the keyboard of a network device) and/or remotely (e.g., accessing the network device via a network).

Network traffic refers generally to any communications or data transmitted within a network, such as may be indicated in router logs, e.g., network flow data describing communications between network devices, firewall logs, e.g., data identifying network devices that are permitted to access particular other network devices, and proxy logs, e.g., data describing network devices that request or receive information through a proxy server.

Network topology refers generally to the relationship between various network devices, such as an indication of network devices and the connections between those network devices. A network topology may be determined based on network traffic to identify unique network devices, and connections from each unique network device to other unique network devices.

Access information refers generally to any information describing a level of access that a user account has within a network. For instance, access information can include information regarding a particular user account's access rights and/or actual accesses to nodes in a network topology. Such access information may be determined based on access privileges and/or access records.

Access privileges refers general to any rules or information that is used to control what a user can access. Access privileges may be implemented using a list of rules that apply to a specific node (or other object, such as a file, folder, printer, etc.) that defines which user accounts or groups of user accounts have access to that object. An Access Control List (ACL) is one example of access privileges.

Access records refers generally to information indicating actual accesses by a network device, such as to other specific network devices and/or particular directories, files, etc., within the network. Examples of access records include those maintained by directory services, such as MICROSOFT ACTIVE DIRECTORY service. In some embodiments, access information includes information regarding user accounts associated with individuals that can physically touch a network device, e.g., people with access rights to a room containing the network device, which may be tracked using a physical keycard access log, for example.

Vulnerability (also referred to herein as "compromise vulnerability" or "compromise likelihood") refers generally to a likelihood of an associated user account (e.g., "account vulnerability") or network device (e.g., "network device vulnerability") being compromised.

Value (also referred to herein as "compromise value," or "importance") refers generally to a measure of an estimated priority an attacker would assign a user account (e.g., "user account value") or network device (e.g., "network device value") to compromise. In some embodiments, a network device value may be indicative of a cost of data stored by the network device (e.g., alone or in combination with the above described priority).

Value metrics refers generally to attributes that are used in determining value of one or more user accounts, network devices, and/or combinations of user accounts and/or network devices. Value metrics may include user metrics such as privileges, title, group memberships, and so on. Value metrics may include network device metrics such as types of operating systems, types of applications being executed, value of user accounts that log-in to a network device, title, and so on.

Risk (also referred to herein as "compromise risk") refers generally to a combination of vulnerability and value that may be calculated for each user account (e.g., "account risk"), network device (e.g., "network device risk"), and or group of any of these entities.

Weighting refers generally to an adjustment to a particular metric, vulnerability, importance, user account, network device and/or group of any of these entities. For example, a weighting may be associated with a particular importance metric to increase (or decrease) significance of that particular importance metric in calculating an importance.

External event refers generally to a real world event that informs, or affects, a vulnerability of a user account or network device. External events may include exploits that allow for software or hardware included in one or more network devices to be compromised, compromised user data from server systems which host external web pages that may be accessed by employees (e.g., a social network storing personal information).

Overview

This specification describes techniques to determine a network risk assessment. For example, a risk determination system can initially determine a network topology and obtain access information for each network device and/or for each user. The system can then provide information, e.g., to a system administrator, identifying the network topology and the level of access that each user account has with the network. The system can receive selections of user accounts, and provide a visual representation of the network devices that the user account can reach, e.g., ping or communicate with, or access, e.g., log into.

To identify risks, e.g., quantifiable risks, such as account risks and/or system risks, associated with the network, the system can determine various vulnerabilities and values associated with users and devices within the network.

After determining compromise values for network devices, the system can receive an identification of a user account, or network device, and determine the total compromise value associated with the user account, or network device, being compromised, e.g., by an attacker. That is, the system can determine the total compromise value for a user account, or network device, from the respective compromise values of network devices that the user account, or network device, is permitted to access. The total compromise value therefore identifies the risk, e.g., to a company, incurred if a user account or network device gets compromised.

Additionally, the system can determine a compromise likelihood of a user account, or network device, being compromised. The compromise likelihood identifies a probability of the network device, or user account, being compromised, e.g., by an attacker.

The system can combine, e.g., multiply in a weighted relationship, the compromise likelihood with the respective total compromise value to determine a compromise risk value. The compromise risk value can be used to quickly determine how secure a network device, or user account, is, e.g., by an insurance company, or by individuals responsible for risk management at a company. In some embodiments, other inputs, e.g. a security questionnaire that is completed by a network administrator and/or individual network account holders, may be included in calculating a final network security evaluation, such as a network compromise risk value.

Example System Architecture and Network Topology

FIG. 1 illustrates a risk assessment system 100 in communication with a network 110 and an example of a determined network topology 120. The risk assessment system 100, e.g., a system of one or more computers, or software executing on a system of one or more computers (also referred to herein as "the system,") is configured to determine the network topology 120 from network traffic 114, e.g., router logs, firewall logs, proxy logs, router rules, of network devices included in a network 100. Example methods of determining a network topology 120 are described below, with reference to FIG. 4. The risk assessment system 100 can be used, or operated, by a system administrator, e.g., an IT staffer, Chief Technology Officer, technology consultant, manager, and so on. Thus, any reference to a "system administrator" or "administrator" herein should be interpreted to include any one or more of these individuals or groups of individuals, or any other entity that views and interacts with the various user interfaces disclosed herein.

The illustrated example of FIG. 1 includes five nodes, e.g., nodes 1-5 122A-E, with each node including one or more network devices. Each node was determined by the risk assessment system 100 to be included in the network 110. The risk assessment system 100 has also identified connections between each of the five nodes, e.g., node 3 122C and node 5 122E have communicated, by analyzing the network traffic 114. As discussed below with reference to FIG. 4, the network topology 120 may be determined in various manners, based on various combinations of network traffic information 114. In some embodiments, the network topology 120 is determined by a third party and then enhanced by the risk assessment system 100, such as to include access information (e.g., from an access control list) overlaid on the network topology 120, as discussed further below.

The risk assessment system 100 may also obtain user account access information 112, e.g., access privileges and/or access records. Thus, the risk assessment system 100 can provide information identifying nodes included in the network topology 120 that a particular user account can access and/or has actually accessed, which is described below with reference to FIG. 2D.

The network topology can be generated and/or updated using various other data sources and/or processes that can be performed on the network, some of which are discussed further below with reference to FIG. 4. For example, in some embodiments the system sends instructions to identified network devices (or some subset of network devices, such as one device per access policy group) to send traceroute requests to other network devices. Information obtained in response to such traceroute requests may be useful in identifying network devices to which the requesting network device actually has access, paths by which access may be obtained, and network devices to which the requesting device does not have access. See FIG. 4, below, for other examples of information that may be included in development of a network topology.

Example Network Topology User Interfaces

Figure 2A:
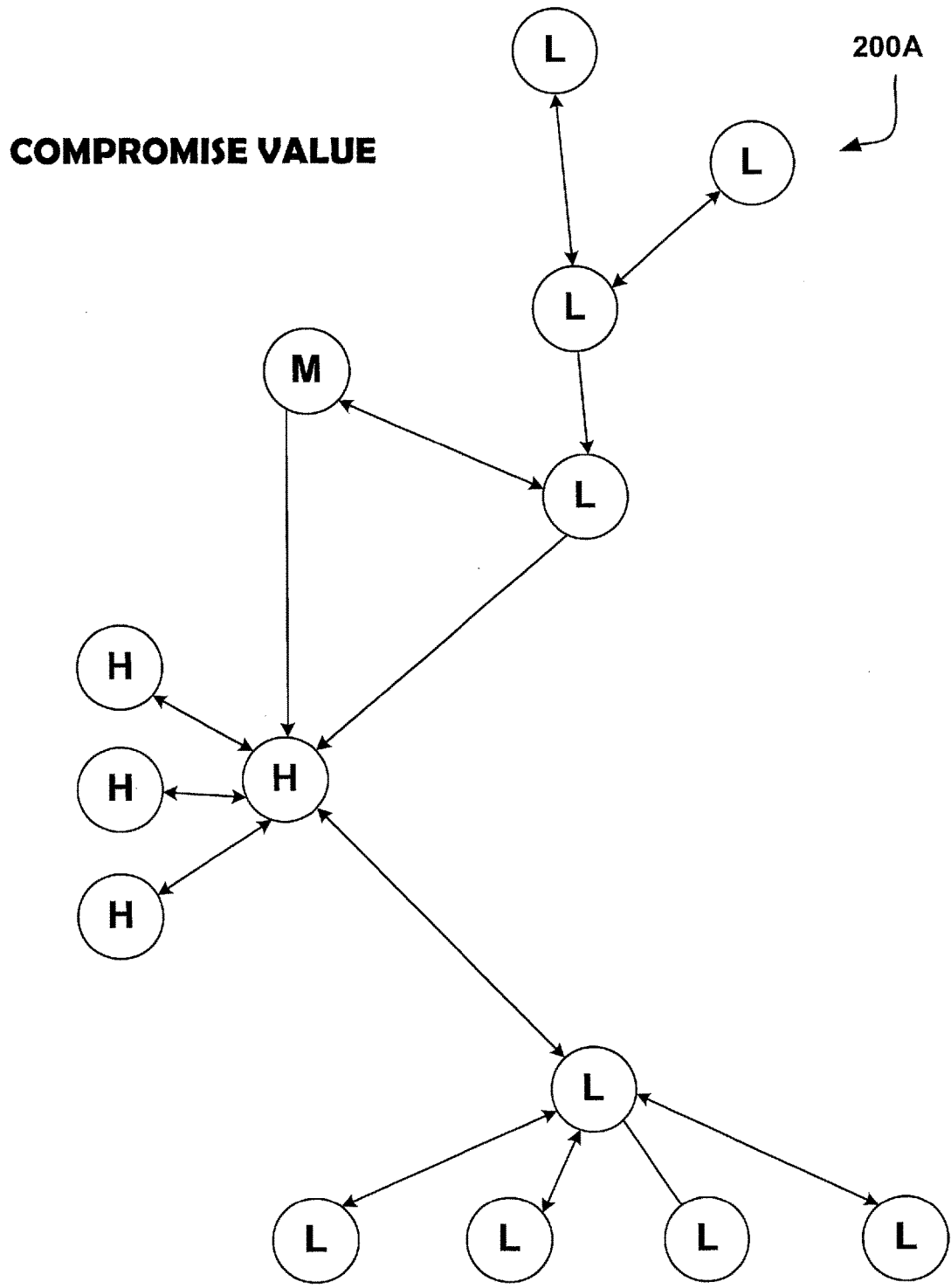
FIG. 2A illustrates an example user interface of a graph identifying a network topology with associated compromise values.

FIG. 2A illustrates an example user interface of a graph 200A identifying a network topology with associated compromise values. The risk assessment system 100 can generate user interface data, e.g., to provide for presentation to a system administrator of the network 110, that includes a representation of a network topology, as described above in FIG. 1. In some implementations, this representation is a graph 200A, e.g., a directed graph as illustrated in the example, which includes nodes each representing one or more network devices, which are connected to other nodes by edges representing logged communications and/or possible communication paths between nodes.

The example of FIG. 2A further illustrates compromise values associated with each node. A compromise value represents an approximate cost that would be incurred, e.g., to a company that owns the network, if the node were compromised, e.g. some portion of its data holdings being made available to an unauthorized party. For instance, the compromise value can be the cost of the data stored by the node, such as a value to recover the data, to pay for specialized services associated with loss of the data, e.g., credit monitoring, costs of insurance deductibles and/or increases in premiums, and/or any other costs. In some embodiments, costs may be estimated based on the type and quantity of specific types of data. For example, each item of credit card data can be associated with a particular compromise value that is higher than the compromise values for telephone numbers of customers. Thus, a compromise value for a node can be calculated by summing the compromise values for each data item, or a particular set of data items of types having values of interest, stored on the node, where each data item has a defined compromise value based on its type (e.g., credit card data, healthcare data, contact information, etc.). The risk assessment system 100 can then associate the calculated compromise values with respective nodes in the graph 200A.

In the example of FIG. 2A, each node in the graph 200A is labeled with a High ("H"), Medium ("M"), or Low ("L") compromise value. That is, the graph 200A provides an easy method of viewing nodes that need to be secured carefully, e.g., due to a node storing sensitive/valuable data associated with a High compromise value. In this way, a system administrator can identify high value nodes for which extra security precautions may be desirable. In securing a node, the risk assessment system 100 can overlay information on the graph 200A displaying nodes that a selected node has access to, e.g., can provide information to, or request information from. Overlaying information describing nodes a selected node has access to is described below, with reference to FIG. 2B. In other embodiments, compromise values may be dollar amounts, and the risk assessment system 100 may calculate a total compromise value for the network from the compromise values for all nodes, a total compromise value of a node, e.g., the compromise value for the node and the compromise values for all accessible nodes, and/or a total compromise value of a user account, e.g., the compromise values for all nodes accessible to the user account.

In some embodiments, nodes may additionally (or alternatively) indicate other attributes associated with network security, such as compromise likelihood (e.g., likelihood of the particular node being accessed by an unauthorized entity) and/or compromise risk value (e.g., some combination of total compromise value and compromise likelihood). Thus, in such an embodiment multiple indicators may be included on each node, such as an indicator of compromise value (e.g., High, Medium, Low, some dollar value indicator, and/or some other indicator), an indicator of compromise likelihood (e.g., High, Medium, Low, or some other relative indicator), and/or an indicator of compromise risk value (e.g., High, Medium, Low, or any other such indicator). In the embodiment of FIG. 2E (discussed below), a total Network Risk Score of "F" ("Failing") is provided, which identifies a network compromise risk calculated based on compromise risk values associated with the entire network.

Figure 2B:
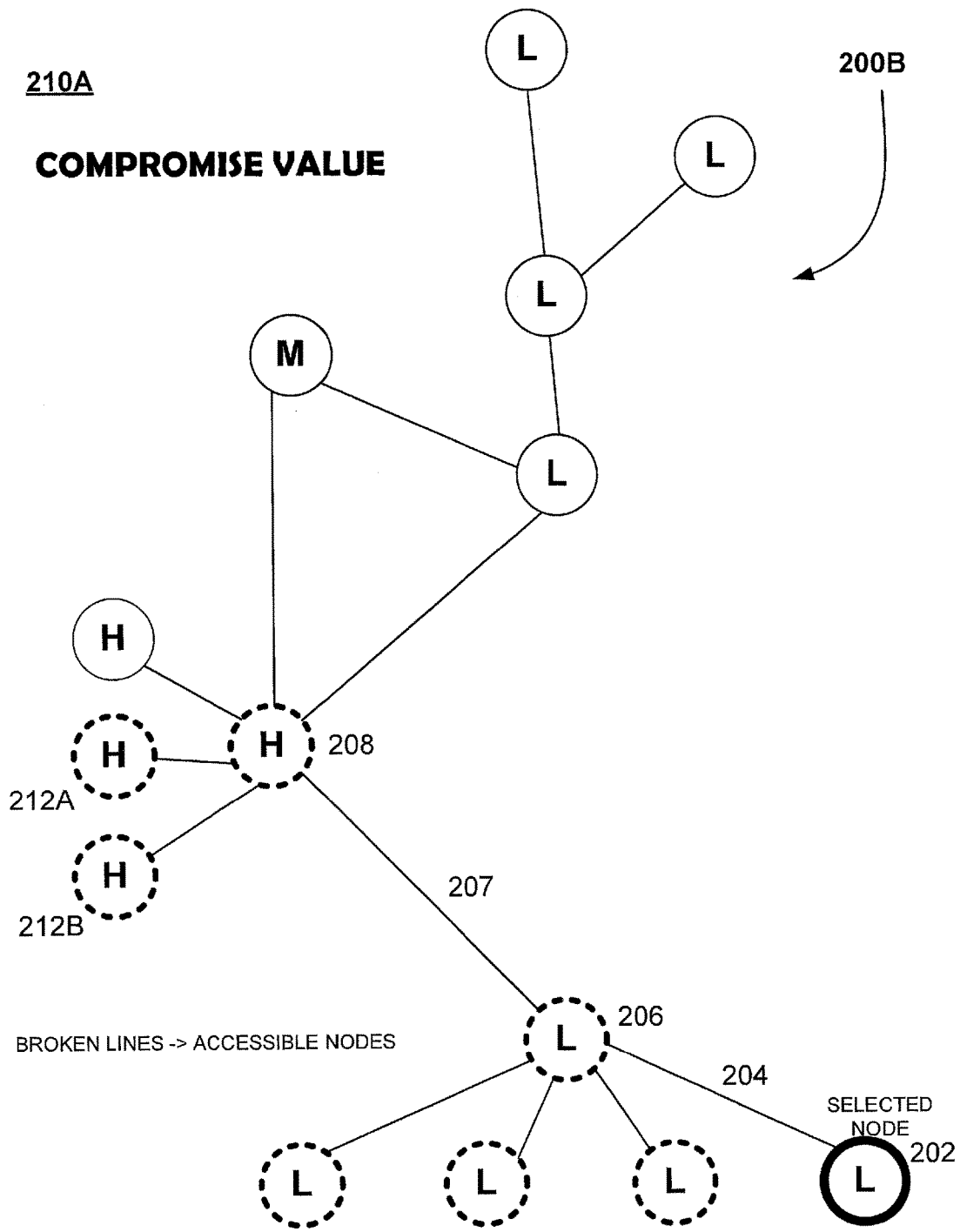
FIG. 2B illustrates an example user interface of the graph showing access rights of a selected node.

FIG. 2B illustrates an example user interface 210A of the graph 200B showing access rights of a selected node 202. The risk assessment system 100 can receive a selection of the node 202, such as by a system administrator clicking on a node of a user interface displaying the graph 200B, and identify nodes that the selected node 202 can access, e.g., communicate with and/or is physically connected to. In some implementations, having access to a node can mean that the selected node 202 can provide a request to the node, e.g., as a ping, or can access data stored at the node.

In this example, the node 202 selected by the system administrator is highlighted with a darker border, and all nodes that can be reached by the selected node 202 are illustrated with broken lines. In other embodiments, other visualizations may be used to identity a selected node and accessible nodes, such as colors, highlighting, etc.

After receiving a selection of node 202, the graph 200B is updated to illustrate that the selected node 202 has access to node 204, e.g., by an edge representing that the two nodes have communicated and/or are configured to communicate within the network. Additionally, the graph 200 illustrates that selected node 202 has access to node 208, e.g., by edge 207. This can occur when, for instance, node 206 has access to node 208, and thus is configured to pass communications from selected node 202 to node 208. Furthermore, selected node 202 has access to nodes 212A and 212B by virtue of node 208.

The graph 200B can be utilized by a system administrator to determine a need for a firewall between nodes 208 and 206, for example, which can be configured to block network traffic from selected node 202, and allow only select network traffic from node 206. In this way, a system administrator can visually examine the network to determine whether particular nodes, e.g., nodes with a low compromise value, have unnecessary access to other nodes, e.g., nodes with higher compromise values.

Figure 2C:
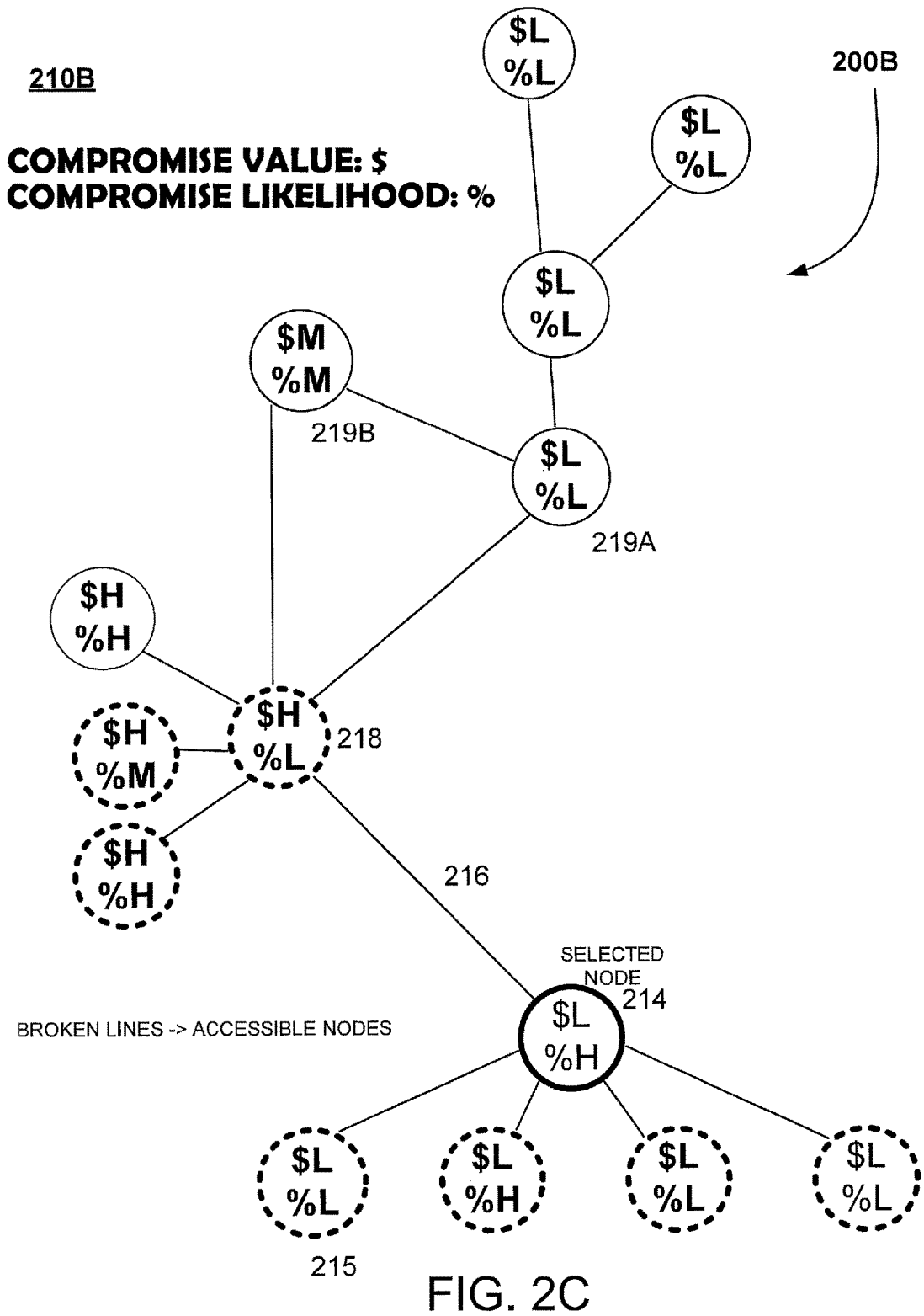
FIG. 2C illustrates another example user interface of the graph showing access rights of the selected node.

FIG. 2C illustrates another example user interface 210B of the graph 200B showing access rights of the selected node 202. The user interface 210B illustrates the graph 200B with nodes, and associated compromise values and compromise likelihoods, e.g., a probability identifying the likelihood that a node can be compromised. Examples of determining compromise likelihood are described below, with reference to FIG. 6.

In this example, the node 214 selected by the system administrator is highlighted with a darker border, and all nodes that can be reached by the selected node 214 are illustrated with broken lines. In other embodiments, other visualizations may be used to identity a selected node and accessible nodes, such as colors, highlighting, etc.

The risk assessment system 100 has determined that node 214 is associated with a low compromise value and high compromise likelihood, e.g., a high probability that the node can be compromised, and node 218 is associated with a high compromise value and low compromise likelihood, e.g., a low probability that the node can be compromised. Based on the information displayed in the user interface 210B, a system administer may consider whether the edge 216 between node 214 and node 218 can be eliminated. Since an attacker could compromise node 214, with a high likelihood of a compromise, to gain access to node 218 with a high compromise value, the system administrator can decide that the edge 214 should be limited, or eliminated. Additionally, the system administrator could alter node 214 to make it harder for an attacker to compromise, e.g., increase password complexity to the node 214, limit user accounts that can access the node 214, limit physical access to the node 214, and so on.

In some implementations, the risk assessment system 100 can determine a compromise risk value for each node, e.g., by multiplying the compromise likelihood and total compromise value for the node. As described above, the total compromise value for a particular node is determined from compromise values of nodes the particular node has access to. In these implementations, the graph 200B can be updated to include the compromise risk value, allowing a system administrator to directly compare nodes. Since each node will have a total compromise value scaled by the probability of it being compromised, the system administrator can quickly identify high risk nodes, e.g., nodes associated with high compromise risk values. In this way, the system administrator can quickly identify the risk to a company if the node was compromised. Examples of determining compromise risk values are described below, with reference to FIG. 6.

Figure 2D:
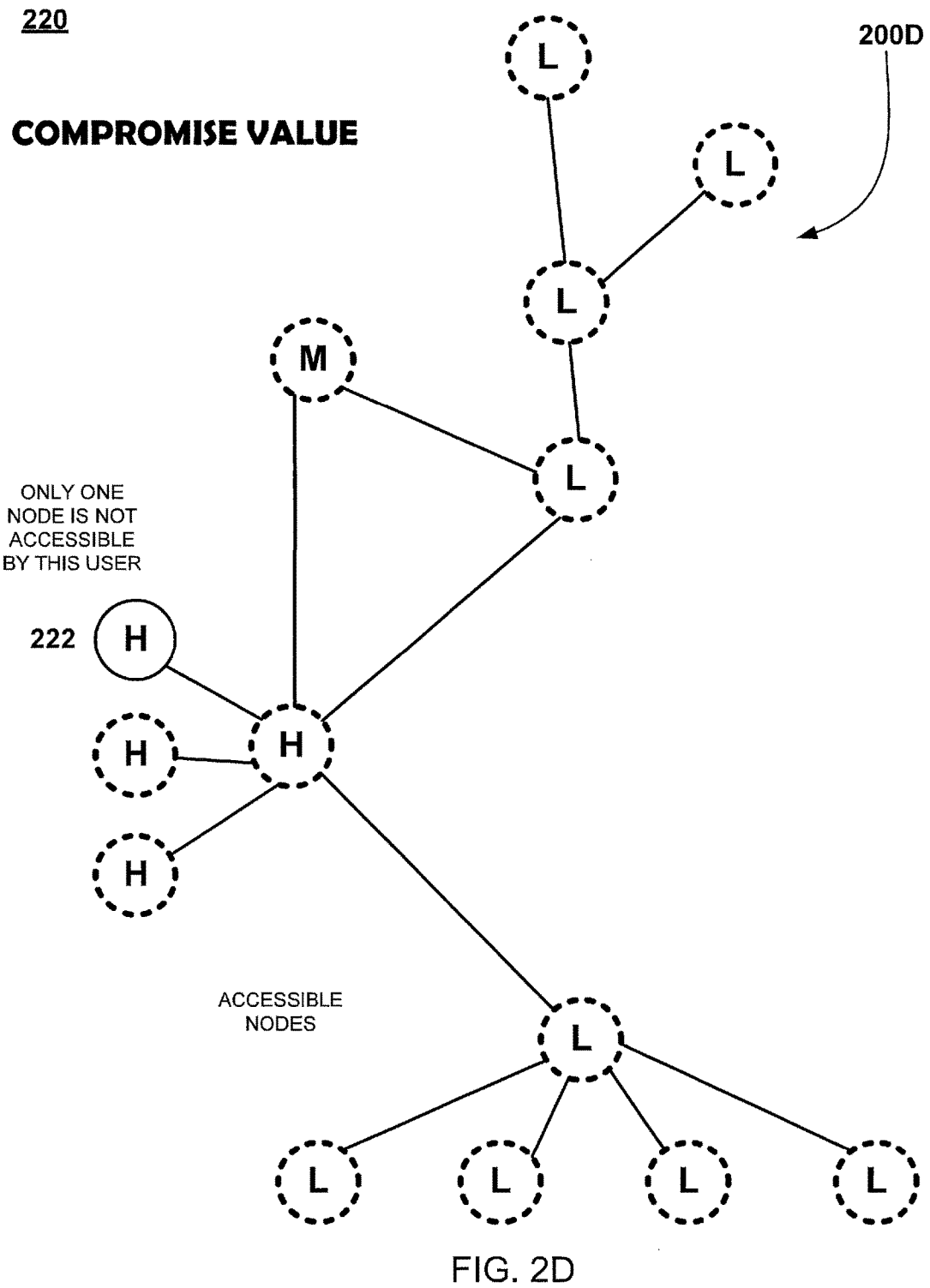
FIG. 2D illustrates an example user interface of the graph showing access rights of a selected user account.
Figure 2E:
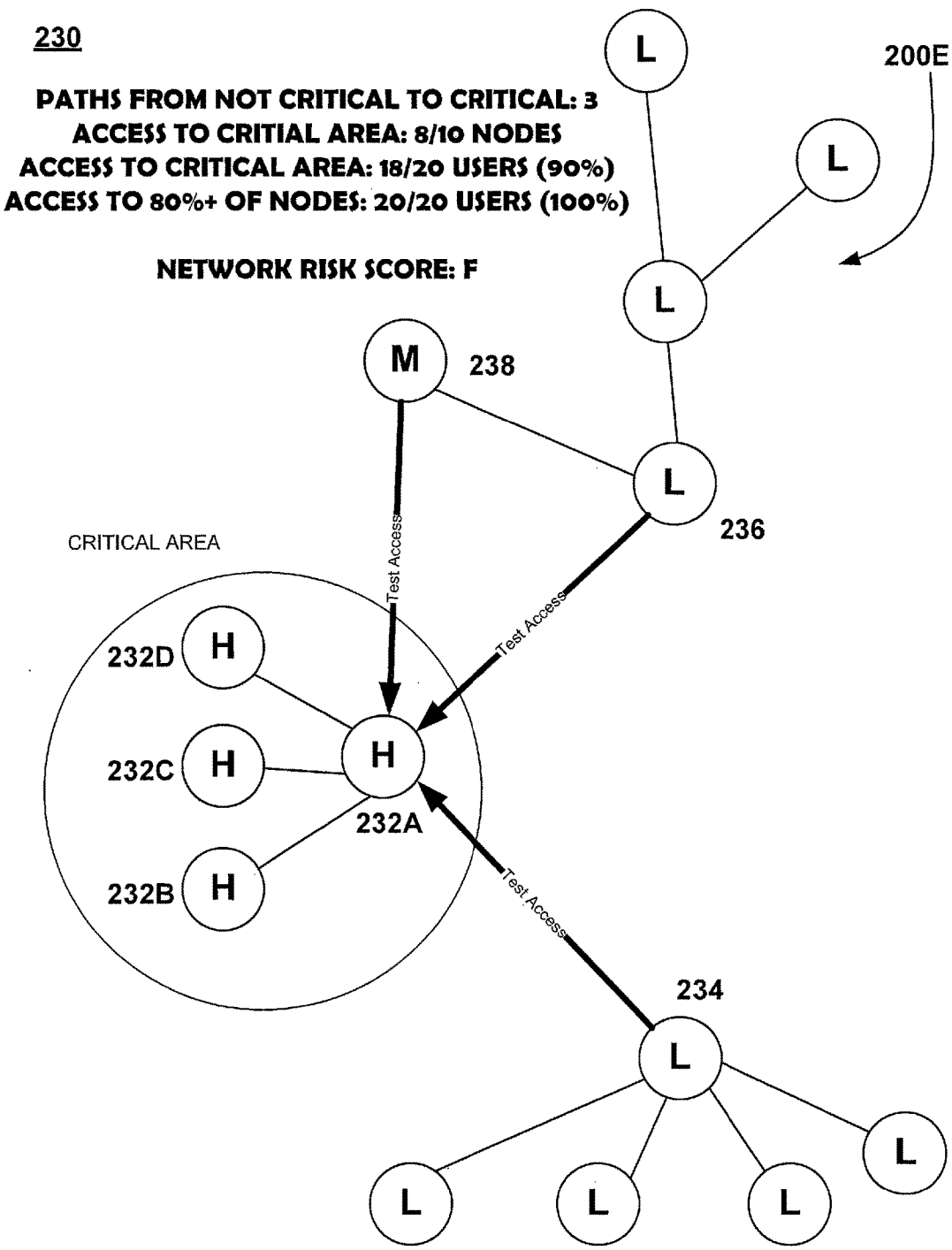
FIG. 2E illustrates an example user interface of the graph showing access rights to an identified critical area of a network.

FIG. 2D illustrates an example user interface 220 of the graph 200D showing access rights of a selected user account. The risk assessment system 100 can receive an identification of a user account, e.g., a user account associated with the network described in FIG. 1. For instance, the risk assessment system 100 can provide a listing of user account names, or search functionality, to a system administrator, and the system administrator can identify a user account. In one embodiment, a user interface that includes a drop-down (or some other selection) user interface component, may be accessed by the system administrator in order to select one or more user accounts. Such a user interface may allow the network administrator to select groups of users, e.g., new hires, contractors, employees in particular departments, etc., filter the user accounts by various attributes, such as hire date, title, etc., and/or provide other searching and filtering functionality that allows the network administrator to easily select one or more user accounts of interest. After receiving the identification of the user account, the risk assessment system 100 can identify nodes that the selected user account can access, e.g., the user account has access rights to, and/or nodes that the user account has actually accessed within a defined period of time. In one embodiment, the user may be provided with one or more user interface controls (e.g., a slider or drop-down menu) that allow adjusting of the access criteria used to determine access rights of the selected user account for display in the network topology, such as a slider that allows adjustment of a time period of actual accesses by the user account to include in the network topology.

To identify nodes that the selected user account can access, the risk assessment system 100 may access user account access information, such as one or more access privileges and/or access records, as defined above. For example, in some embodiments, the risk assessment system 100 discussed herein can map the access rights of a particular user account (or group) onto the network topology (e.g., generated based on NETFLOW, proxy logs, etc.), such that "reach" of the user account within the network can be comprehensively visualized. A similarly mapping may also be performed based on access records for a particular user account, physical access privileges and/or records for a particular user account, or some combination of various access information.

In the example of FIG. 2D, the risk assessment system 100 has determined that the selected user account can access each node in the graph (shown in broken lines), except one node, e.g., node 222. A system administrator using the user interface 220 can inspect the nodes to easily determine whether the selected user account has greater access rights than is warranted, e.g., due to their job position. Additionally, the system administrator can request that the risk assessment system 100 provide actual log-in information over a defined time period, e.g., a selectable time period, and identify whether the selected user account rarely, or never, accesses certain nodes to which the user account has access as such nodes may be candidates for updating their respective ACLs so that the user account no longer has access rights.

In some implementations, the user interface 220 can include a selectable option for updating the network topology to indicate nodes the user account has access to (e.g., based on access rights) and/or has actually accessed (e.g., based on access records). As noted above, in some implementations the risk assessment system 100 can obtain information identifying nodes that a person associated with the selected user account can physically access. For instance, the risk assessment system 100 can obtain lists identifying physical badges worn by people, e.g., employees, and rooms or spaces containing nodes that particular physical badges can access. The risk assessment system 100 can then identify nodes in rooms or spaces that the person associated with the selected user account can physically access.

As described above, the user interface may identify nodes that the selected user account has actually accessed, e.g., over a selectable time period, instead of nodes the user account can access as in FIG. 2D. In this embodiment, unnecessary access to nodes can be identified in the user interface by highlighting nodes that the user account can access, but has never accessed (over some selectable period of time selected by the system administrator, such as a default time period or one that is dynamically adjustable by the system administrator using one or more user interface controls). For example, differences between a particular user account's access rights and that particular user account's access records (for some time period or based on all records) may be determined in order to identify possible areas for tightening access rights for that user account.

In some embodiments, user accounts may have access to only portions of data on a particular node. Thus, the user interface 220 may be updated with an indication that only parts of a particular node are accessible and may be configured to provide a detailed drill-down of particular directories, files, etc. that the user account has access to in response to a request from the system administrator (such as double-clicking on a particular node).

FIG. 2E illustrates an example user interface 230 of the graph 200E showing access rights to an identified critical area of a network. The risk assessment system 100 can receive an identification of a critical area of the network, e.g., a system administrator can provide identifications of nodes, e.g., nodes 232A-D, that are intended by the system administrator to be critical e.g., important to a company or the network. In some implementations the risk assessment system 100 can automatically identify nodes likely to be critical, e.g., the system 100 can determine compromise values for each node and identify critical nodes as being associated with high compromise values. Determining compromise values is described below, with reference to FIG. 4.

After identifying a critical area of the network, the risk assessment system 100 can identify a percentage of user accounts that can access the critical area of the network, as described above with reference to FIG. 2D, and a percentage of nodes that can access the secure area of the network, as described above with reference to FIG. 2B. That is, the risk assessment system 100 determines the access rights of each node outside of the critical area, and identifies a number of nodes that can access any node in the critical area. The risk assessment system 100 can then compute a percentage of nodes outside the critical area that can access the critical area, and provide the percentage to a system administrator using the user interface 230. Additionally, the risk assessment system 100 can determine a number of edges that connect to a node in the critical area. For instance, in the example the risk assessment system 100 has determined that three edges connect to nodes in the critical area, e.g., node 234 connects to node 232A by an edge, node 236 connects to node 232A by an edge, and node 238 connects to node 232A by an edge. A larger quantity of connections to the critical area may be indicative of an increased risk of compromise of that critical. Any connection to the critical area should be audited to ensure that only authorize traffic can travel across it.

Similarly, the risk assessment system 100 can determine a percentage of user accounts that can access, or have accessed, nodes in the critical area. In the example, the risk assessment system 100 has determined that 18 out of 20 user accounts can access, or have accessed, nodes in the critical area.

Figure 3:
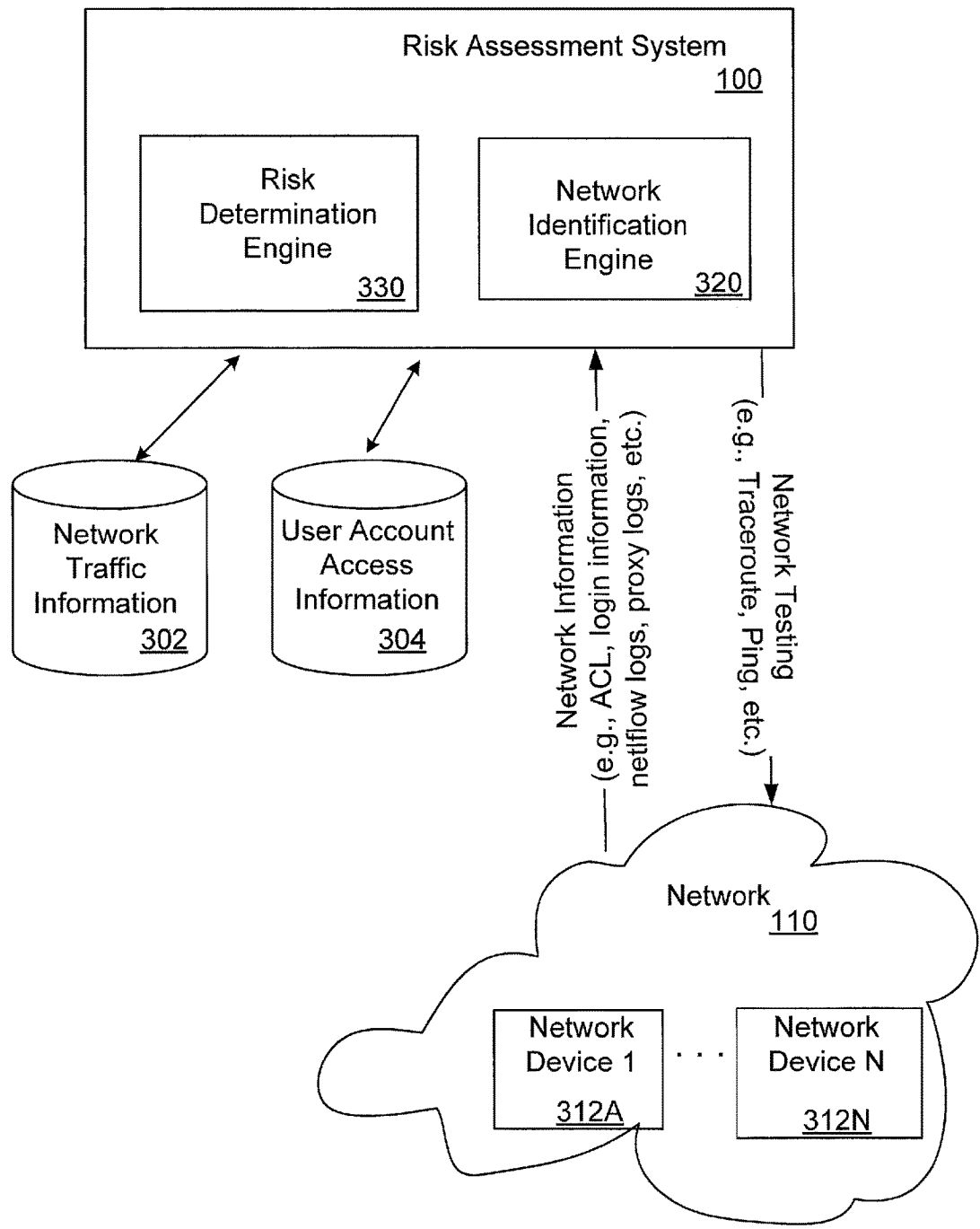
FIG. 3 is a diagram of an example risk assessment system.

In some implementations, the system also calculates one or more metrics related to users' access to the network. For example, a metric indicating a total number of user accounts that have access to a particular area of the network (and/or have actually accessed), such as a defined critical area, or number of user accounts that have access to (and/or have actually accessed) a threshold percentage, or number, of network nodes, e.g., 70%, 80%, 85% (wherein such percentage may be provided by the system administrator). In the example, the risk assessment system 100 has determined that 20 out of 20 user accounts can access 80% of the total number of nodes in the graph. A similar metric could be provided to indicate a percentage of user accounts that have actually accessed at least 80% of the total number of nodes. Furthermore, discrepancies between these two ratio (e.g., have access and actually accessed) may trigger alerts, e.g., recommendations, to the system administrator suggesting tightening of user account access rights in view of actual node access being much lower than available node access.
Example Network Configuration FIG. 3 illustrates a diagram of the risk assessment system 100 in communication with the network 110 in order to build and/or enhance the network topology based on access rights of user accounts. In this embodiment, the risk assessment system 100 is shown in communication with the network 110 that includes one or more network devices, e.g., network devices 312A-312N. In some implementations the risk assessment system 100 can be a network device included in the network 110, or can be software executing on a network device.

The risk assessment system 100 is in communication with, or maintains, one or more databases storing network traffic information and user account access information, e.g., the network traffic information database 302 and user account access information database 304.

In one embodiment, the network traffic information database 302 stores router logs, e.g., network traffic data describing communications between network devices such as NET-FLOW data, firewall logs, e.g., data identifying network devices that are permitted to access particular other network devices, and/or proxy logs, e.g., data describing network devices that request or receive information through a proxy server. Additionally, the risk assessment system 100 can provide requests, e.g., traceroute requests or pings, to network devices included in the network 110, and receive identifications of network devices that the request was routed through. In this way the risk assessment system 100 can actively identify network devices in communication with each other, e.g., network devices that can provide information to, or receive information from, other network devices. The risk assessment system 100 can then use these identified network device communication paths to enrich the network topology 120 or store these identified network device communication paths in the network traffic information database 302.

In one embodiment, the user account access information database 304 stores access information describing a level of access that a user account, e.g., a user account of the network 110, has with a network device included in the network 110. For instance, user account access information can include identifications of user accounts that are permitted to access a network device, e.g., log into the network device, or user accounts that can request data from or send data to a network device, e.g., ping the network device. The information can be obtained from access rights associated with respective nodes of the network 110. For example, rights of each network node in an Access Control List ("ACL") may be parsed in order to determine, for each user account, which network nodes the user account can access. The user account access information may also include information obtained from access records particular to each network node included in the network 110, e.g., information identifying user accounts that have accessed a network device, or directory information identifying user accounts. In some implementations, the information can identify network nodes that particular persons associated with user accounts can physically touch and/or has physically touched, e.g., physical access rights or physical access records. For instance, as described above in FIG. 2D, the information can identify badges worn by people that allow entry into a room or space containing particular network devices.

The risk assessment system 100 includes a network identification engine 320 configured to obtain information stored in the network traffic information database 302 and determine and/or update a network topology of the network 110. As noted above, a network topology identifies nodes in the network 110, e.g., one or more network devices grouped as a node, and connections between the nodes, e.g., network devices permitted to access other network devices. Additionally, the risk assessment system 100 can actively provide requests to network devices included in the network 110, e.g., traceroute requests, to identify connections between network devices. The risk assessment system 100 can also direct network devices in the network 110 to provide requests to other network devices, e.g., to identify connections between network devices, and receive indications of whether requests to respective devices was successful. Examples of actively providing requests are described below, with reference to FIG. 4.

In some embodiments, an initial network topology may be generated by a third party service or software, and then the risk assessment system 100 updates the network topology with additional information, such as user account access information, proxy logs, etc. Thus, the network identification engine 320 can associate user account access information with the network topology. For instance, the network identification engine 320 can store mappings between nodes determined in the network topology, and user accounts permitted to access the nodes.

Additionally, the risk assessment system 100 includes a risk determination engine 330 to determine risks associated with the network 110 being compromised, e.g., by an attacker. For instance, the risk determination engine 330 can determine compromise values associated with each node, e.g., approximate costs that would be incurred to a company that owns the network 110 if one or more network devices were compromised. The risk determination engine 330 can then identify nodes that each user account, node, or group of user accounts or nodes, is permitted to access, and determine a total compromise value. The total compromise value represents approximate costs that would be incurred if a particular user account, or particular node, were compromised. Furthermore, the risk determination engine 330 can determine a total compromise value for the entire network 110, e.g., from respective compromise values of each node. Examples of determining a total compromise value are described below, with reference to FIG. 7.

The risk determination engine 330 can also determine compromise likelihood for each node, and user account, associated with the network 110. The compromise likelihood identifies a probability of the node, or user account, being compromised. Examples of determining compromise likelihood are described below, with reference to FIG. 6. The risk assessment system can then determine a compromise risk value for each node, or user account, from the compromise likelihood for the node, or user account, the total compromise value for the node, or user account, and possible other attributes associated with the node and/or user account. In one embodiment, the compromise risk value is a scaled version of the total compromise value, scaled by the compromise likelihood (e.g., probability that the node, or user account, can be compromised). Examples of determining compromise risk values are described below, with reference to FIG. 6.

The risk determination engine 330 can also generate user interface data identifying the network topology, described above, and risks associated with the network 110. In some implementations the risk determination engine 330 generates a graph of nodes and edges, with each node representing one or more network devices, and each edge identifying a connection between two nodes. The user interface data is configured to be provided for presentation, and receive interactions from a system administrator using the risk assessment system 100. Example user interface data is described above, with reference to FIGS. 2A-2E.

Example Methods

Figure 4:
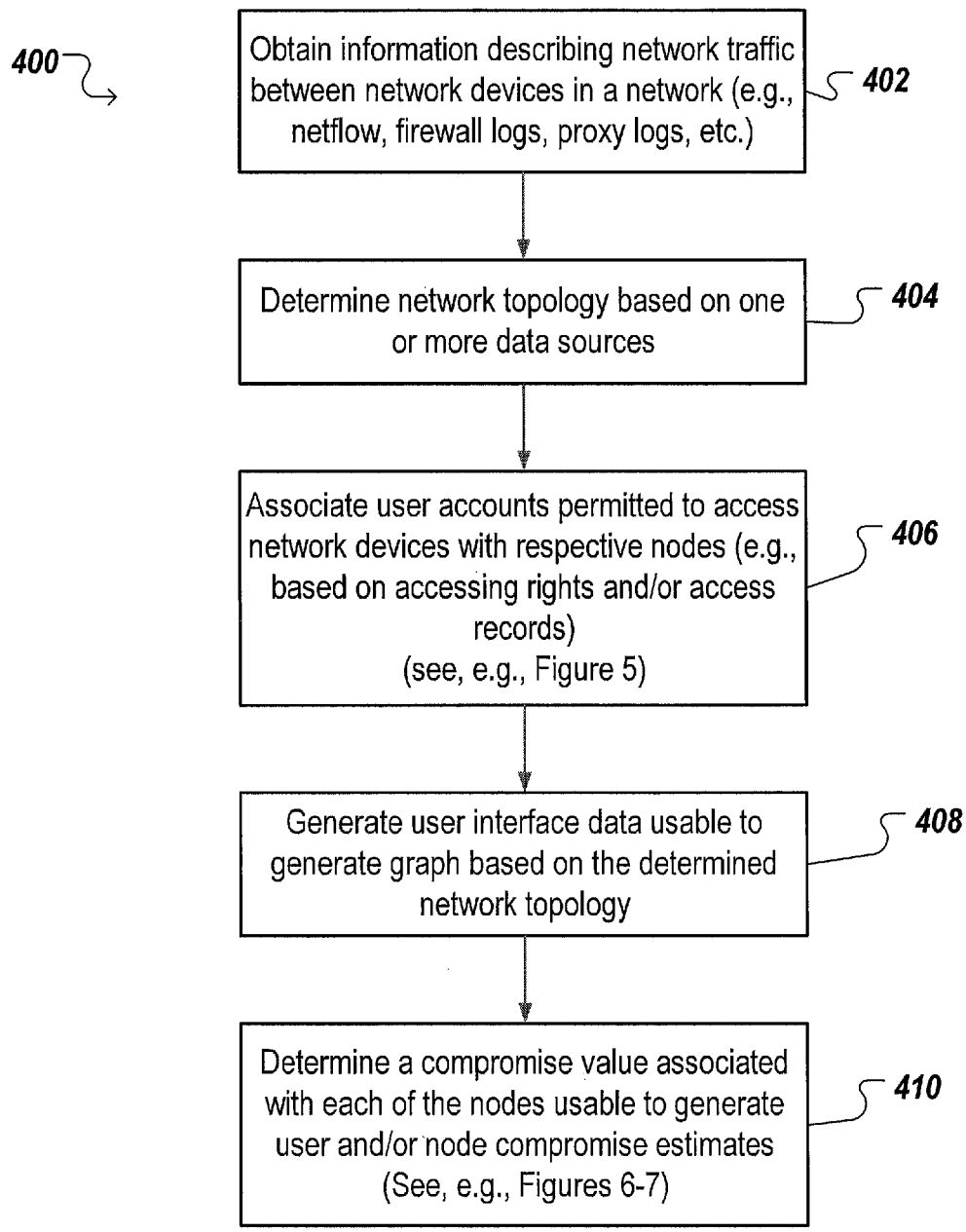
FIG. 4 illustrates a flowchart of an example process for network risk assessment.

FIG. 4 illustrates a flowchart of an example process 400 for network risk assessment. For convenience, the process 400 will be described as being performed by a system of one or more computers, e.g., the risk assessment system 100. Depending on the embodiment, the method of FIG. 4 may include fewer or additional blocks and the blocks may be performed in an order that is different than illustrated.

In the example of FIG. 4, the system obtains information describing network traffic between network devices in a network (block 402). The system can obtain the information, e.g., router logs, router rules, firewall logs, and so on, from one or more databases. Information describing network traffic is any information that identifies one or more network devices that can communicate with, or access, each other. In some implementations, the system maintains the databases and retrieves the information, e.g., from routing devices, for storage in the databases. In some other implementations, the system can access the databases that have been pre-populated with information describing network traffic.

As described above, the information can be from routing systems that route requests from a network device to an appropriate receiving network device. Routing systems can include routers, and proxy servers that hide an identification of the requesting network device and route the hidden request to a receiving network device. As described below in block 404, the system may obtain proxy logs to identify that two network devices are in communication with each other, even though a proxy server would ordinarily hide that reality.

In some implementations the system can actively determine network devices that can communicate with, or access, each other by providing traceroute requests to all network devices. A traceroute request reports the route that the request took to get a receiving network device, e.g., the network devices and routers that the request was provided to. If the system receives a response identifying the traceroute, the system can store information identifying all the network devices involved in the response and the respective connections between them. Additionally the system can provide a traceroute request to all possible addresses of network devices on particular subnets, e.g., the system can cycle through all permutations of network addresses in the subnet, and identify network devices from traceroute requests that receive a response.

Next, the system determines a network topology from the information describing network traffic (block 404). A network topology identifies nodes that each represents one or more network devices connected by edges, with each edge representing a communication link. Each edge can be associated with a direction from a node to another node, e.g., identifying a direction of communication. Additionally edges can be bi-directional. In some implementations, the system can represent all network devices that belong to a particular subnet as being a single node. In some other implementations, a system administrator using the system can identify that more than one network device is to belong to a single node.

To determine the network topology, the system can obtain router logs, e.g., NETFLOW data, that identifies network traffic between network devices that provide requests to, or receive requests from, routers. The system then identifies pairs of network devices that have communicated, and represents the network devices as nodes connected by respective edges.

The system can also obtain firewall logs, and identify network devices expressly permitted to communicate with, or access, other network devices. Additionally, the system can obtain proxy logs, and identify a requesting network device, and a receiving network device. Since a proxy server hides the requesting network device's address, e.g., network address, from the receiving network device, discovering whether two network devices are in communication with each other would be difficult without proxy log information. The system can also utilize router rules, e.g., rules specifying a method of routing requests received from particular network devices. In this way the system can determine, from the rules, that two network devices are in communication with each other by identifying a router rule specifying the communication.

In some implementations, the system can obtain information identifying network devices that are physically connected, e.g., by a direct wired or wireless connection. The system can store these connected network devices as nodes connected by edges in the network topology.

Moving to block 406, the system associates identifications of user accounts permitted to access network devices with respective nodes of the network topology. For example, the system obtains access information from one or more access rights, access records, and/or other sources. Such information may indicate user accounts that have access to respective nodes and user accounts that have actually accessed nodes within a defined time period (e.g., the previous week, month, year, or selectable time period), respectively. From this user account access information, the system may associate identifications of the user accounts with nodes that include the accessible and/or accessed nodes. In one embodiment, the system first overlays access records and then access privileges onto the network topology generated in block 404 to provide a network topology with overlaid access rights and access history information.

In some implementations, the system can provide information, e.g., to a system administrator, identifying user accounts permitted to access nodes that they haven't actually accessed in a selectable period of time, e.g., one month, 3 months, one year.

Furthermore, the system can obtain physical active control list (ACL) badge information to identify rooms containing network devices that a person associated with a user account can physically access. Nodes including the network devices in the identified rooms are associated with (e.g. indicated as accessible by) identifications of the user accounts.

Examples of associating identifications of user accounts with nodes are further described below, with reference to FIG. 5.

The system generates user interface data identifying the network topology (block 408). In some implementations, the system generates a graph that identifies the network topology, e.g., FIG. 2A. The graph can be a directed graph, and each node in the graph can correspond to a node in the network topology. Similarly, each directed edge in the graph can correspond to an edge in the network topology. In some other implementations, the system generates a table that identifies all nodes that each particular node can access.

This user interface data can be provided for presentation, e.g., to a system administrator using the system. Additionally, the system can receive interactions with the user interface data and update the user interface according to the interaction discussed above, e.g., FIGS. 2A-2D. for example, a network administrator can click on a particular node of a network topology in order to cause the system to automatically determine access rights associated with that node and display those in the network topology (e.g., via some type of overlay, such as coloring certain nodes, shading certain nodes, hiding nodes that are not accessible by the selected node, etc.). In addition, the network administrator may be able to zoom in and out of the network to view additional detail or less detail regarding the network topology. For example, in response to a zoom level being decreased (to view more of the network topology), the system may group nodes (such as nodes that each have a common connection to a particular node) for simplified presentation of that group of nodes. The network administrator can manipulate and explore the network topology before compromise values are calculated and/or after such compromise values are calculated. In one embodiment, compromise values may be calculated in response to a network administrator selecting one or more nodes on a network.

In the embodiment of FIG. 4, the system determines a compromise value associated with each node in the network topology (block 410). A compromise value represents an approximate cost that would be incurred, e.g., to a company that owns the network, if the node were compromised, e.g., by an attacker. For nodes that include more than one network device, e.g., multiple network devices that are part of the same subnet, the system can determine compromise values of those multiple network devices, and compute a sum of the network devices for the node.

For instance, the compromise value can be the cost of the data stored by the node, such as a value to recover the data, a value to ensure that all data stored by nodes has not been tampered with, a value to pay for specialized services associated with loss of the data (e.g., credit monitoring), costs of insurance deductibles and/or increases in premiums, and/or any other costs. The compromise value of a node can also be the cost incurred by a company that owns the network if the node were out of service, e.g., offline. The cost can be the cost incurred per day by the company, or cost incurred hourly (or any other unit of time). The compromise value can also factor in the cost to replace the node, and information stored on it. Additionally, any compromise of the network can be associated with a compromise value that is in addition to a compromise value of each node, e.g., a reputational compromise value. This reputational compromise value identifies an expected loss to the company that operates the network, e.g., any quantifiable loss of investor faith, loss of consumer faith, or costs incurred with respect to average legal fees to defend itself in a lawsuit by a government or a consumer.

In some implementations the system can obtain information that describes what each node stores, and determine an associated compromise value from the information. To determine an associated compromise value, the system can store mappings between specific types of information and associated costs. For instance, if the system obtains information a particular node that stores credit card information, the system can identify an associated cost in the mappings, e.g., cost per particular credit card. In some other implementations, the system can receive approximate costs of information stored in a node, e.g., from a system administrator using the system.

In some implementations, the system can provide an identification of the compromise values to a system administrator using the system as an overlay of the graph identifying the network topology, e.g., FIGS. 2A-2E.

After determining compromise values, the system can receive identifications of user accounts, or nodes in the network topology, and determine a total compromise value associated with all nodes that the user account, or identified node, can access. In this way a company can quickly identify the potential costs incurred to them if any user account, or network device, were compromised. Examples of determining total compromise values are described below, with reference to FIG. 7.

Figure 5:
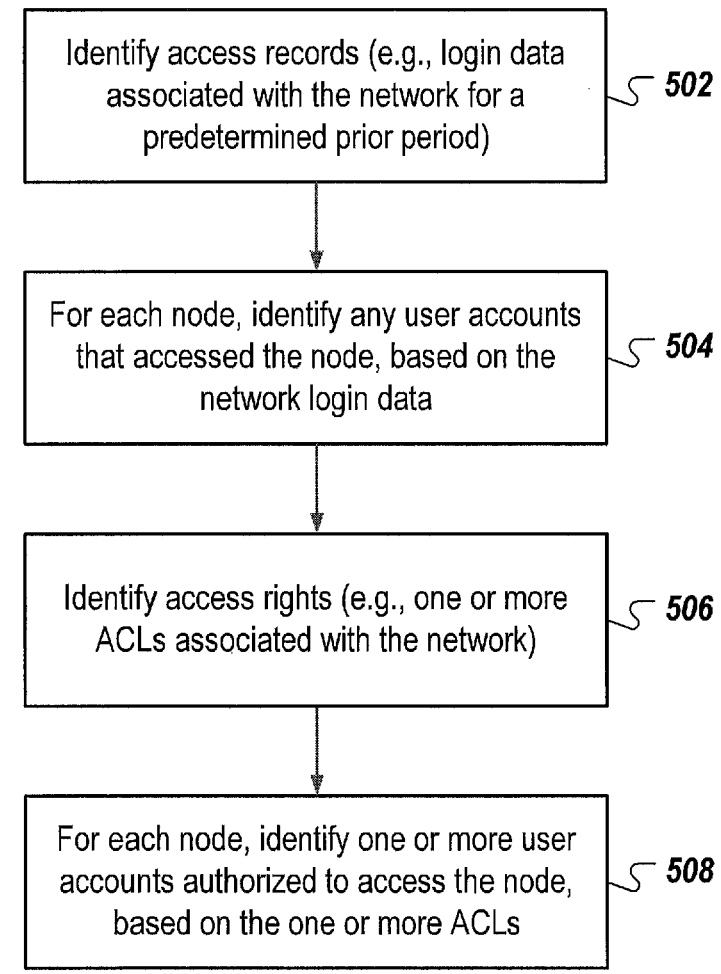
FIG. 5 illustrates a flowchart of an example process for determining access rights of user accounts.

FIG. 5 illustrates a flowchart of an example process 500 for determining access rights of user accounts. For convenience, the process 500 will be described as being performed by a system of one or more computers, e.g., the risk assessment system 100. Depending on the embodiment, the method of FIG. 5 may include fewer or additional blocks and the blocks may be performed in an order that is different than illustrated. Additionally, the system can perform blocks 502-504 in parallel with blocks 506-508. For example, the processes of analyzing access records and analyzing access rights may not be dependent on one another. Thus, access rights may be analyzed independent of access records, and such analysis may even be performed concurrently in order to obtain potentially unnecessary privileges associated with the user account.

The system identifies access records, such as network log-in data, associated with the network (block 502). As noted above, access records may describing user accounts that have logged into, e.g., accessed, particular network devices. The access records can be actively obtained from each network device and/or from a database storing log-in data. For instance, the system can provide a request to each network device to receive log-in data, e.g., data describing user accounts that have logged into the network device. The access records can include historical log-in data, e.g., log-in data from the prior quarter, month, or year (or any other period of time).

The system identifies user accounts that accessed nodes using the access records (block 504). The system scans the access records to identify user accounts, and network devices that each of the user accounts have accessed. The system then associates identifications of user accounts with respective nodes in the network topology.

The system identifies access rights associated with the network (block 506). As noted above, access rights can identify user accounts permitted to access each network device, e.g., over a network, regardless of whether the user account actually has accessed the network device. Additionally, physical access rights can identify whether persons associated with user account can physically touch network devices, e.g., whether the persons have access to rooms that contain particular network devices.

The system identifies user accounts permitted to access nodes (block 508). As described above in block 506, the system identifies user accounts permitted to access, e.g., over a network or physically, network devices. The system then associates identifications of the user accounts with nodes in the network topology that include the respective network devices.

With the information regarding nodes that the selected user account can access (e.g., based on access rights) and information regarding nodes that the selected user account actually has accessed (e.g., based on access records), the system can determine a recommendation for reduction of access rights to the particular user account, such as to remove access rights to any network nodes (or other object on the network) that the user account has not actually accessed (e.g., within the time period determined by the network administrator), but for which the user account has access rights. Such a recommendation may be provided to the network administrator via many manners, such as by highlighting nodes on a network topology (e.g., overlaid on any of the network topologies of FIG. 2) for which access rights may be removed. In some embodiments, the suggested reduction of access rights may be implemented via the same user interface by the network administrator selecting a button or other UI control indicating a desire to have the system automatically implement such suggested reduction in access rights.

Figure 6:
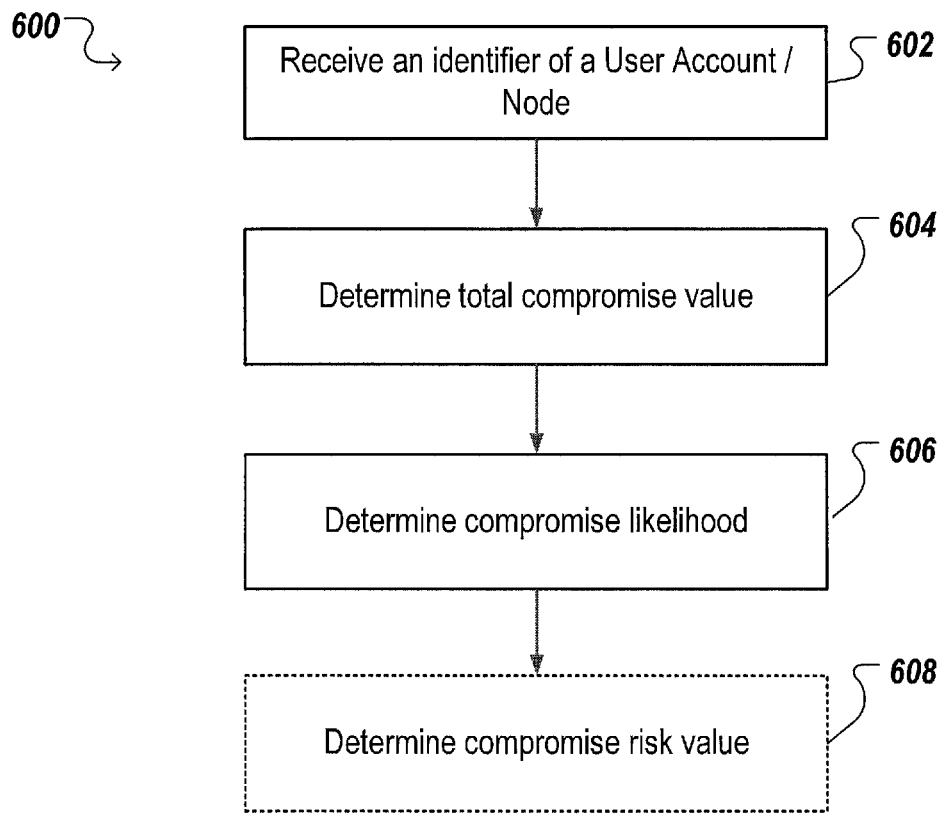
FIG. 6 illustrates a flowchart of an example process for determining a compromise risk value associated with a user account or node.

FIG. 6 illustrates a flowchart of an example process 600 for determining the compromise risk value associated with a user account or node. For convenience, the process 600 will be described as being performed by a system of one or more computers, e.g., the risk assessment system 100. Depending on the embodiment, the method of FIG. 6 may include fewer or additional blocks and the blocks may be performed in an order that is different than illustrated.

The system receives an identification of a user account or node (block 602). A system administrator can provide a user account name, or the system can provide search functionality to help facilitate identifying a user account. In one embodiment, the system performs the below-noted process for each user account and/or user account group to develop compromise risk value for each and provides a sorted listed of the accounts and account groups. Thus, the system administrator may be provided with a list of users or user groups having the highest total compromise values and/or likelihoods and may assess whether access controls with reference to those users or user groups should be tightened to reduce compromise risk values.

The system administrator can also identify the network address of a network device included in a node, or provide an identification, e.g., a name, of the node. In some implementations the system administrator can provide a selection of the node as presented in the graph identifying the network topology, described above with reference to block 408 of FIG. 4.

The system determines a total compromise value of the user account or node (block 604). The system obtains all nodes that the user account, or node, is permitted to access, e.g., from the information determined in FIG. 5. The system then obtains a compromise value for each of the obtained nodes, and determines a total compromise value from the obtained compromise values. In some implementations the system can sum the obtained compromise values to determine a total compromise value. In some implementations the system can apply weights to each of the obtained compromise values, e.g., scaling factors, to determine the total compromise value. Examples of determining a total compromise value are described below, with reference to FIG. 7.

The system determines a compromise likelihood for the user account or node (block 606). The system determines a probability, or decimal value, that the user account, or node, can be compromised.

For example with a user account, the system can obtain information identifying a complexity of the user account password, the location that a person associated with the user account normally logs into nodes from, a length of time the person has worked at the company that controls the network, one or more values identifying an importance of the user account, and so on. This information can be provided to a machine learning model, e.g., a neural network, a Gaussian mixture model, and so on, and the system can obtain a probability identifying a chance the user account will get compromised.

For example with a node, the system can obtain information identifying user accounts that are permitted to access the node, and obtain information identifying password complexities of each user account, locations that persons associated with the user accounts normally log in from, length of time that the persons have worked at the company, and so on. Additionally, the system can obtain information describing how easy, or hard, it is for persons to access, e.g., physically access, the node. The system can identify whether the node is associated with a high compromise value, e.g., identifying that the node is an important target, or whether the node is permitted to access another node with a high compromise value. Compromise likelihood may consider linkages (e.g. proximity to insecure parts of the network like the demilitarized zone of the network), attributes (e.g. software version) for a given node, and/or an academic theory like attack graphs in computing a compromise likelihood for a node. This information can be provided to the machine learning model, described above, and the system can obtain a probability identifying a chance the node will get compromised.

In some implementations the system determines compromise likelihoods for each node after, or before, determining the compromise value for the node, described above with reference to block 410 of FIG. 4. Similarly, the system can determine compromise likelihoods for each user account. That is, the system can automatically determine a compromise likelihood for each user account, or node, e.g., without system administrator action. After determining the network topology, the system can provide information identifying the network topology, e.g., a graph, and include the compromise value and compromise likelihood for each node in the graph, e.g., described above with reference to FIG. 2C.

In the embodiment of FIG. 6, the system determines a compromise risk value for the user account or node (block 608). For example, the system obtains the total compromise value, determined in block 604, and the compromise likelihood, determined in block 606, and determines a compromise risk value for the user account or node. In some implementations the system computes a multiplication of the total compromise value by the compromise likelihood, e.g., decimal representation of the compromise likelihood to arrive at the compromise risk value for the selected user account or node. In other embodiments, the compromise risk value may be calculated based on other combinations of total compromise value, compromise likelihood, and/or other factors.

The system can then provide the compromise risk value for presentation to a system administrator, who can identify a scaled version of the risk of a user account, or node. For instance, a system administrator can directly compare any arbitrary node, or user account, and identify nodes, or user accounts, that are high risk, e.g., have a high compromise risk value.

Additionally, the system can automatically determine a compromise risk value for each node and/or each user account, associated with the network. The system can then determine a network compromise risk value, e.g., by combining in some manner, such as summing, the compromise risk values for each node and/or user account in the network. The network compromise risk value identifies a compromise risk value for the entire network, and can then be provided to a system administrator to obtain a high level estimation of the overall risks associated with the network. A network compromise risk value may also be compared to other network compromise risk values, e.g., of other organizations, such as by an insurance provider in order to establish relative risks associated with a network.

Figure 7:
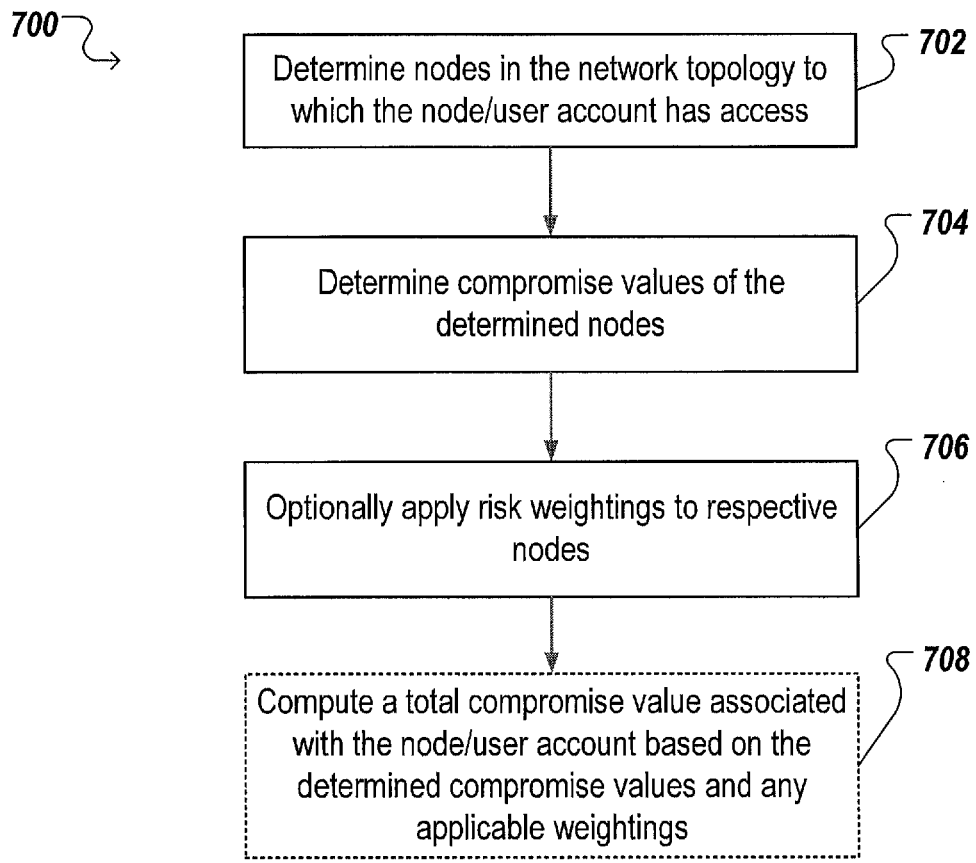
FIG. 7 illustrates a flowchart of an example process for determining a total compromise value associated with a user account or node.

FIG. 7 illustrates a flowchart of an example process 700 for determining a total compromise value of a node or user account. For convenience, the process 700 will be described as being performed by a system of one or more computers, e.g., the risk assessment system 110. Depending on the embodiment, the method of FIG. 7 may include fewer or additional blocks and the blocks may be performed in an order that is different than illustrated.

The system determines nodes in the network topology which the selected node or user account has access (block 702). As described above, in step 602 of FIG. 6, the system can receive a selection of a user account or node, e.g., by a system administrator.

For a node, the system determines all communication paths from nodes in the network topology, determined in block 404 of FIG. 4, to the selected node, and stores information identifying the determined nodes. In some implementations, the system can provide an identification of the determined nodes to a system administrator as an overlay of the graph identifying the network topology, described above with reference to block 408 of FIG. 4. For example, the system can shade the determined nodes as presented to the system administrator on the graph. In another example, the system can present the determined nodes with hatched lines, e.g., FIG. 2B, or can color the determined nodes differently than remaining nodes.

Similarly for a user account, the system determines all nodes that the user account is permitted to access, e.g., from the information determined in FIG. 5. In some implementations, a system administrator can specify whether he/she is interested in nodes the selected user account has accessed in a previous time period, and/or nodes the user account is permitted to access, either physically or over a network.

In some implementations, the system can provide an identification of the determined nodes to a system administrator using the system as an overlay of the graph identifying the network topology, such as in the example of FIG. 2D and as described further above with reference to block 408 of FIG. 4. For example, the system can shade or color the determined nodes as presented to the system administrator on the graph. In another example, the system can present the determined nodes with hatched lines, e.g., FIG. 2D, or can color the determined nodes differently than remaining nodes.

In this example, the system determines compromise values of the determined nodes (block 704). For example, the system may determine compromise values for each node the user account, or node, is permitted to access. Determining a compromise value is described above, with reference to block 410 of FIG. 4.

The system, optionally, applies risk weightings to respective nodes (block 706). After obtaining compromise values for each node, the system can apply respective weights to the nodes, e.g., apply a scaling factor to each compromise value. In some implementations, the system can apply a higher weighting to a node that has been previously identified as being part of a critical area, e.g., the critical area identified in FIG. 2E. In some implementations, the system can receive weights to apply to particular nodes, e.g., a system administrator can specify that particular nodes are of a greater importance than other nodes.

The system computes a total compromise value (block 708). In some implementations, the system computes a sum of the compromise values obtained for each identified node that the selected user account, or node, can access. In some other implementations, the system applies the weightings of block 706 to respective compromise values of nodes, and sums the output to obtain a total compromise value.

The system can then provide the total compromise values for particular nodes for presentation, e.g., to a system administrator as an overlay of the graph described in FIG. 4.

The system can also determine a compromise value of the entire network, e.g., the system can perform blocks 702-708, and assumes that all nodes are accessible in block 702. In this way the system can then provide a compromise value of the network, e.g., for presentation, to a system administrator.

In addition to the description of FIGS. 1-7 above, the system, e.g., the risk assessment system 100, can generate and provide recommendations to a system administrator using the system, e.g., a network administrator. For instance, the system can automatically identify changes in the network, e.g., the network 110, that will lower total compromise values, compromise likelihoods, and/or compromise risks associated with the network and/or specific user accounts and/or nodes. The system can obtain information identifying nodes that user accounts have actually used in a defined time period, and determine whether blocking access to remaining nodes, e.g., nodes user accounts don't actually use, will lower the compromise risk values of the user accounts to a greater degree than the cost of implementing the changes, and may even provide suggestions on user access rights to further restrict. For example, the system may provide recommendations to limit users' access rights to only those resources, e.g., nodes or objects within nodes, that particular user accounts have accessed within some previous time period, such as 30 or 60 days. In some embodiments, the system may have sufficient user access rights to ACL settings on nodes of the network to actually initiate changes of user access rights, such as by transmitting information regarding changes to ACL rules to respective nodes.

Additionally, the system can determine whether limiting access to particular nodes, e.g., nodes identified as being included in a critical area, will provide a greater decrease in compromise risk value, e.g., in units of dollars, than the cost of implementing the changes. To determine whether the recommended network changes will result in a greater benefit than cost incurred, the system can obtain information describing average costs of components needed to effect the recommendation, e.g., firewalls, added software to control security, added personnel costs, and so on.

The system can weigh the costs incurred to make the recommended changes against the benefit, e.g., the reduction in compromise risk values, and provide a recommendation to a system administrator that is determined to have the greatest benefit/cost incurred tradeoff. Additionally the system can receive an identification of a budget, e.g., from the system administrator, and determine recommended network changes to the network 110 that fall within the budget.

Example Network Segmentation Recommendations

The system can also perform processes to determine maximum network segmentation. That is, the system can determine a number of communication paths between nodes in the network topology, and determine whether the number can be limited. For instance, the system can limit the number of communication paths from nodes that aren't critical to critical nodes, or from nodes associated with low compromise values to nodes associated with high compromise values. To effect this recommended segmentation, the system can provide recommendations of network components, e.g., firewalls, proxy servers, and provide the recommendations as an overlay on the user interface graphs described in FIGS. 2A-2E.

Standardized Risk Assessment

In addition to the system providing recommendations to a system administrator, the system can be utilized by an insurance provider to quote potential insurance rates, e.g., premiums, to a company, for losses incurred by networks being compromised. Since the system provides an actual analysis of the network, e.g., compromise values, compromise risk values, and an analysis of user account and node access rights, the insurance provider can determine accurate insurance rates. Additionally, the insurance provider can provide a questionnaire to a company about their security protocols, e.g., access rights of employees, alarm systems, and so on. The answers to this questionnaire can be incorporated by the insurance provider to determine insurance rates.

The insurance provider can determine insurance premiums by obtaining an average compromise value per node in the network, average compromise value per node in an identified critical area of the network, or a network compromise risk value. The insurance provider can then tie the above information to one or more actuarial tables that identify costs for insuring a company given the information. Additionally, the insurance provider can generate actuarial tables for different sectors of an economy, such as based on compromise risk values for multiple entities within each of those sectors. The various uses of compromise risk values can advantageously be used by an insurance provider (and others) to compare network security risks associated with each of multiple networks, such as those within the same vertical market or sector. For example, an administrator may compare risks associated with two different networks of a company to identify networks of relative higher risk.

To determine actuarial tables, the insurance provider can receive information from multiple companies identifying network compromise risk values (and/or underlying compromise values of particular nodes and/or compromise risk values of particular nodes or user accounts), and use the information to determine insurance rates. The insurance provider therefore has a look into the actual state of a broad segment of the networks utilized by companies, giving the insurance provider insight into the proper insurance rates to quote. The insurance provider can also provide information to a company identifying how risky their network is, e.g., the company has high compromise risk values or a high network compromise risk value compared to its peers, or the company is giving access to rights to too great a number of user accounts or nodes compared to its peers.

Example System Implementation and Architecture

Figure 8:
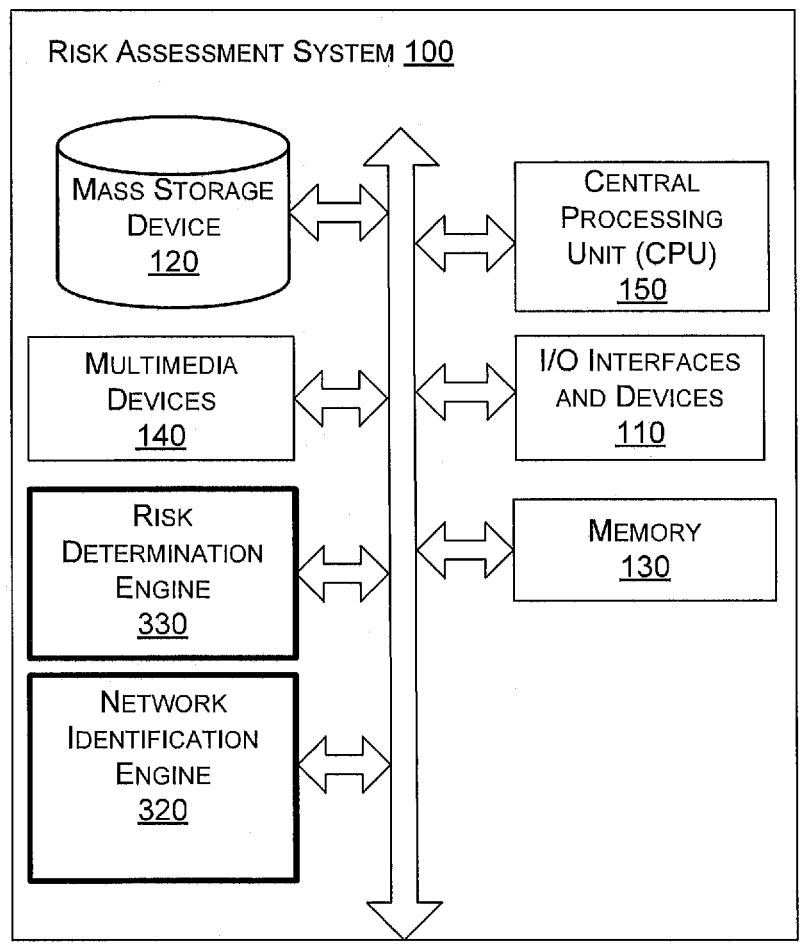
FIG. 8 is a block diagram of an embodiment of the example risk assessment system.

FIG. 8 is a block diagram of one embodiment of the risk assessment system 100, including example components and modules. In the embodiment of FIG. 8, the risk assessment system 100 includes the risk determination engine 330 and network identification engine 320 discussed above with reference to FIG. 3. These "engines," which are also referred to herein as "modules," are configured for execution by the CPU 150 and may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The risk assessment system 100 includes, for example, one or more servers, workstations, or other computing devices. In one embodiment, the exemplary risk assessment system 100 includes one or more central processing units ("CPU") 150, which may each include a conventional or proprietary microprocessor. The risk assessment system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules (or "engines") of the risk assessment system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA"), and Extended ISA ("EISA") architectures, for example. In addition, the functionality provided for in the components and modules of risk assessment system 100 may be combined into fewer components and modules or further separated into additional components and modules.

The risk assessment system 100 is generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the risk assessment system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary risk assessment system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The risk assessment system 100 may also include one or more multimedia devices 140, such as speakers, video cards, graphics accelerators, and microphones, for example.

The I/O devices and interfaces 110 provide a communication interface to various external devices such as, for example, he network 110 (FIGS. 1-2). The network 110 may comprise one or more of a LAN, WAN, and/or the Internet, for example, via a wired, wireless, or combination of wired and wireless, communication link. The network 110 communicates with various computing devices and/or other electronic devices via wired or wireless communication links.

Risk Determination of User Accounts and Network Accessible Systems

As described above, a system (e.g., the risk assessment system 100), can determine a network topology of one or more networks, and through information associated with the network topology (e.g., user account access information, information describing each user account and network device), can determine compromise risk values for each user account and network device. This focus on determining compromise risk values can (1) greatly enhance the security of the analyzed networks and (2) quantify damage that can be wrought through compromise of a given network device or user account. For example, a reviewing user (e.g., a security officer) can view not only an expected compromise risk of a network device, indicating a weighted estimate of the cost associated with the compromise, but also the compromise risks of all network devices in communication paths with the network device. In this way, the system can surface potentially hidden risks associated with a network, and shift the reviewing user's gaze from being focused on particular network devices to the entire network, afforded by access to the overall network topology. That is, the system can determine an extent to which a network device being compromised can affect the security of the entire network.

While the above description provides powerful insights into networks, the system can further enhance network security by more precisely pinning down metrics describing a likelihood of each network device and user account being compromised, and more precisely defining the value (e.g., from an attackers perspective) of each user account and network device on the networks.

Through more precisely defining value from the perspective of an attacker, the reviewing user can gain deeper insights into which network devices and user accounts are the most interesting to an attacker, and thus which network devices and user accounts need to be most locked down. For instance, the system can determine that network devices with particular names (e.g., a domain controller), are at a great risk of being attacked (e.g., a domain controller can provide access to other network devices on the networks), and thus have a greater value.

As will be described, determining a likelihood of compromise (e.g., a compromise vulnerability as described below) and a value (e.g., a compromise value as described below) for a user account or network device includes determining metrics that each measure an aspect of a likelihood of compromise and/or a value of an associated user account or network device. For instance, a metric for determining a likelihood of compromise of a network device can include determining whether the network device is executing applications known to be trivially exploitable. Similarly, a metric for determining a likelihood of compromise of a user account can include determining whether accessing the user account requires use of two factor authentication. The metrics for a compromise vulnerability can be combined (e.g., weighted) to determine an overall compromise vulnerability, and similarly the metrics for a compromise value can be combined to determine an overall compromise value, such as an overall compromise risk for a user, a network device, a network of users and network devices, and/or some other group (e.g., users associated with a same employee role, employees associated with a same office, network devices associated with a same functionality, and so on).

Figure 9A:
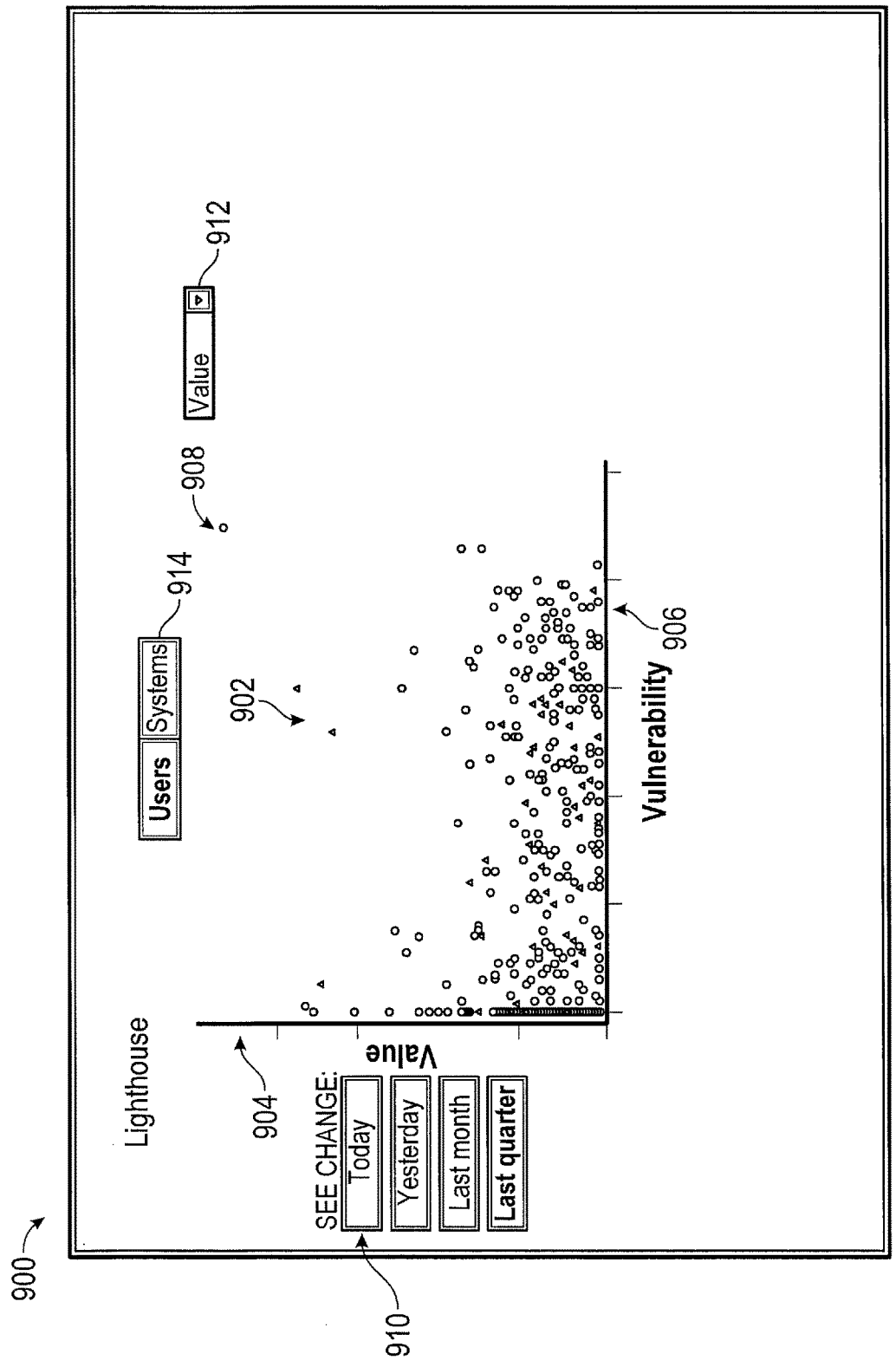
FIG. 9A is an example user interface illustrating user account risk values of user accounts.

Coupling the expanded determination of value, with a likelihood of an associated network device, or user account, being compromised, can provide the reviewing user with an indication of the overall risk associated with the network device, or user account. To visualize risk associated with the networks, the system can generate user interfaces describing the risk associated with each user account and network device. For instance, as illustrated in FIG. 9A, the system can map each user account, or network device, to a point in a chart mapped from respective values of compromise vulnerability and compromise value. By scanning this generated chart, the reviewing user can identify network devices, or user accounts, with a high compromise value that also have a high compromise vulnerability, and thus should be monitored.

Furthermore, the system can monitor changes to compromise values and compromise vulnerabilities of user accounts, and network devices, over time. The reviewing user can then determine any positive, or negative, changes to the determined values and take remedial actions in response. For instance, the reviewing user can indicate goals to improve compromise values and compromise vulnerabilities, and the system can monitor whether the goals are positively affecting network security (e.g., an investment as will be described below).

The system can also obtain information describing external events (e.g., outside of the control of an entity that maintains the networks) that identify real world events that inform, or affect, compromise vulnerabilities of network devices or user accounts. For instance, the system can monitor for compromises of domains storing user information, such as a web page, or system, being hacked (e.g., or otherwise compromised), and subsequently user account information, or other private information, being released (e.g., from a domain associated with the web page). The system can obtain the compromised information associated with the external event (e.g., user account, or other private, information), and determine whether any persons associated with user accounts of the networks (e.g., employees) utilized the compromised domain, and if so, can raise the compromise vulnerabilities of the affected user accounts (e.g., the persons may have utilized the same passwords for their user accounts of the networks and the compromised domain user accounts). Similarly, the system can monitor for exploits of hardware or software, identify affected network devices, and increase compromise vulnerabilities associated with the affected network devices. In some implementations, the system can also remove, or disable, the compromised software from the affected network devices (e.g., allowing the reviewing user a one-stop shop to review network security and perform remedial actions).

By providing the above functionality in deceptively powerful user interfaces, the system can facilitate greatly enhanced network security. In this way, the reviewing user can have greater faith in the health of the networks, and can provide customers, and other companies with an interest in the security of the networks (e.g., an insurance company), more quantifiable assurances of the security of the networks. Furthermore, as described above, the system can also cause the removal, or disabling, of compromised software or, in some implementations, hardware utilized in network devices (e.g., the system can modify operating systems of the network devices to disable access to the hardware). In this way, the system can rapidly trigger fixes (e.g., temporary fixes) to rapid time-sensitive exploits.

FIG. 9A is an example user interface 900 illustrating user account risk values of user accounts. The user interface 900, and additional described user interfaces, can be generated by the system (e.g., risk assessment system 100, or a presentation system in communication with the system 100) and be provided as an interactive document (e.g., a web page) for presentation on a user device (e.g., a terminal, a laptop, a computer, a tablet), or other system, of a reviewing user (e.g., a security officer). In some implementations, the user interface 900, and additional described user interfaces, can be generated by the user device (e.g., an application, such as an 'app' downloaded from an application store for execution on the user device, or other software executing on the user device). In these implementations, the user device can receive information (e.g., user account risk values) and present the information in user interfaces (e.g., according to user interface templates stored by the user device).

The user interface 900 includes a graphical representation 902 of user account risk values of user accounts associated with one or more networks. As indicated above, each risk value is a combination (e.g., a weighted combination) of a compromise value (e.g., a measure describing a priority an attacker of the networks would place on compromising the user account with respect to other user accounts) and a compromise vulnerability (e.g., a measure describing an ease at which the user account can be compromised).

As illustrated in the user interface 900, the graphical representation 902 is a mapping (e.g., a chart) with a first axis 904, indicating compromise values, orthogonal to a second axis 906, indicating compromise vulnerabilities. Each user account is represented as a point in the graphical representation 902 according to its associated compromise value and compromise vulnerability. For instance, a particular user account 908 is illustrated in the upper right portion of the graphical representation 902, representing that the user account has a high compromise value and a high compromise vulnerability. A reviewing user (e.g., a security officer) can quickly view the graphical representation, and ascertain that the particular user account 908 should be monitored, including taking remedial actions (e.g., as will be described below with respect to investments) to lower the presented compromise vulnerability (e.g., visually ascertainable by a quick examination of the particular user account's 908 position along the orthogonal axis 906).

The user interface 900 includes selectable options 910 to illustrate changes in user account risk values since a prior period of time (e.g., a prior time during which user account risk values were determined). For instance, the reviewing user can select options to view changes that have occurred since earlier the same day, since a prior day, since a prior month, since a prior quarter, and so on. In some implementations the reviewing user can indicate a particular time period of interest, and the system can determine changes in user account risk values since the indicated time period. Additionally, as described below, and illustrated in FIG. 28A, a time slider can be included, enabling the reviewing user to quickly slide between times of interest. Using the time slider, the reviewing user can essentially view an animation of changing comprise risk.

After selecting a selectable option 910 specifying a prior period of time, the system can access maintained information describing user account risk values, and determine, or obtain (e.g., from cached pre-determined information) information indicating, prior user account risk values associated with the specified prior period of time. The system can then determine changes in user account risk values (e.g., a difference from a present user account risk value to the prior user account risk value), and update the graphical representation to illustrate the respective change for each user account. In some implementations, the system can generate an animation, video, and so on, which can be presented in the user interface 900. The generated animation, and so on, can illustrate each user account beginning at an initial location in the graphical representation 902 (e.g., an initial user account risk value determined at the selected prior time period) and transitioning to a present location in the graphical representation 902 (e.g., a present user account risk value). In this way, the reviewing user can view positive or negative changes in user account risk values. In some implementations, the system can update the graphical representation 902 to include two points for each user account connected by an edge, with each point indicating a different user account risk value. Furthermore, in some implementations each point associated with a user account can be illustrated as a particular color corresponding to the determined change. For instance, positive changes (e.g., reductions in user account risk values) can be particular colors (e.g., darker shades of green can indicate greater reductions), and negative changes can be particular colors (e.g., darker shades of red can indicate greater increases).

Figure 17:
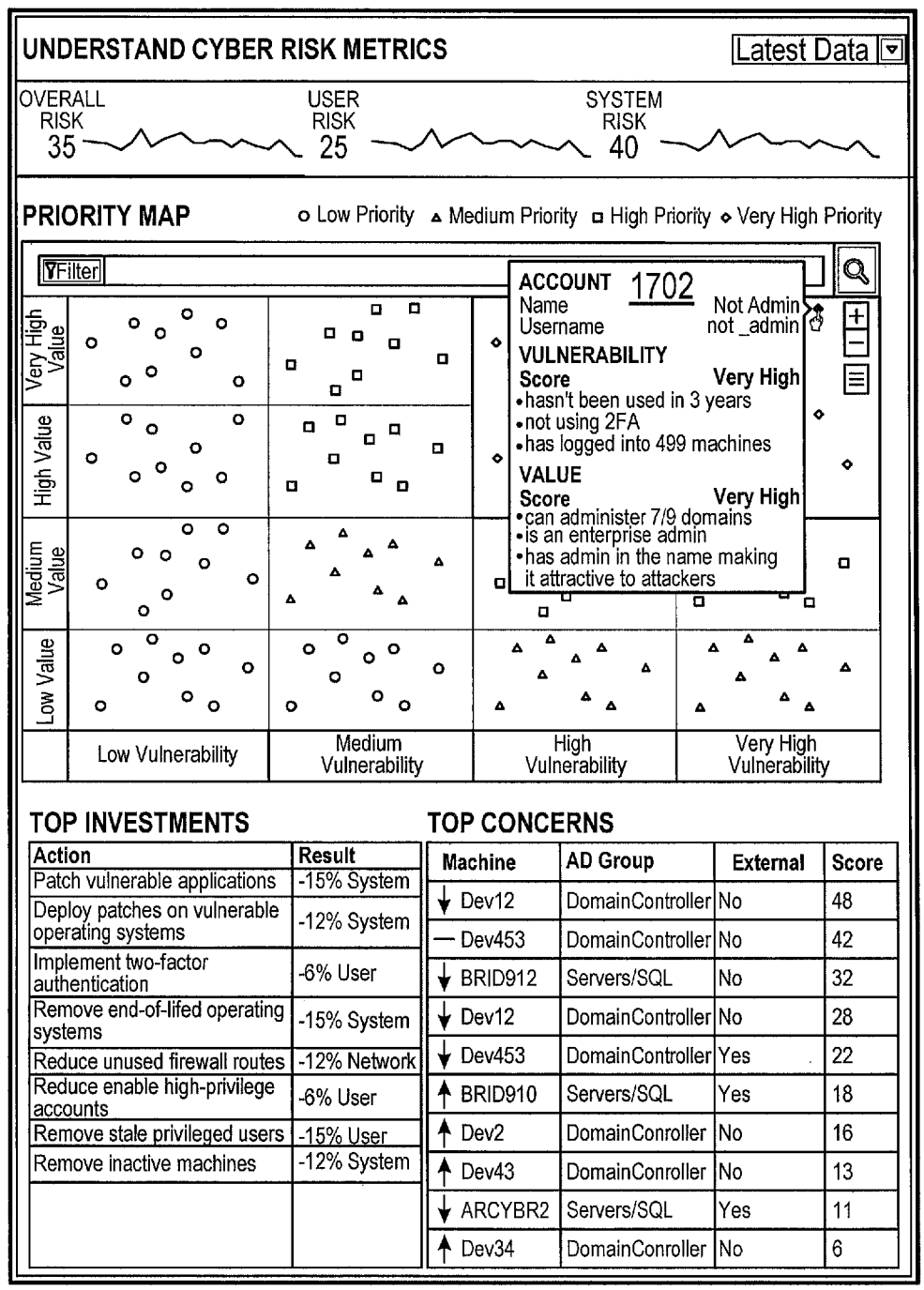
FIG. 17 is an example user interface illustrating selection of a user account.

The user interface 900 further includes identifications of user accounts with associated user account risk values greater than a threshold (e.g., a top user selectable threshold number of user accounts). The identifications can be presented in a list 912 organized according to respective user account risk values. Each user account can be selected, and information describing the user account can be presented in the user interface 900. For instance, and as illustrated in FIG. 17, user profile information associated with the user account can be presented, along with indications of particular metrics that are causing the selected user account to have a high user account compromise value. Examples of metrics are described below, with respect to FIG. 12A-12B.

The user interface 900 can be updated to include information similar to the above description for network devices 914, such that the reviewing user can determine associated network device risk values for each network device.

Figure 9B:
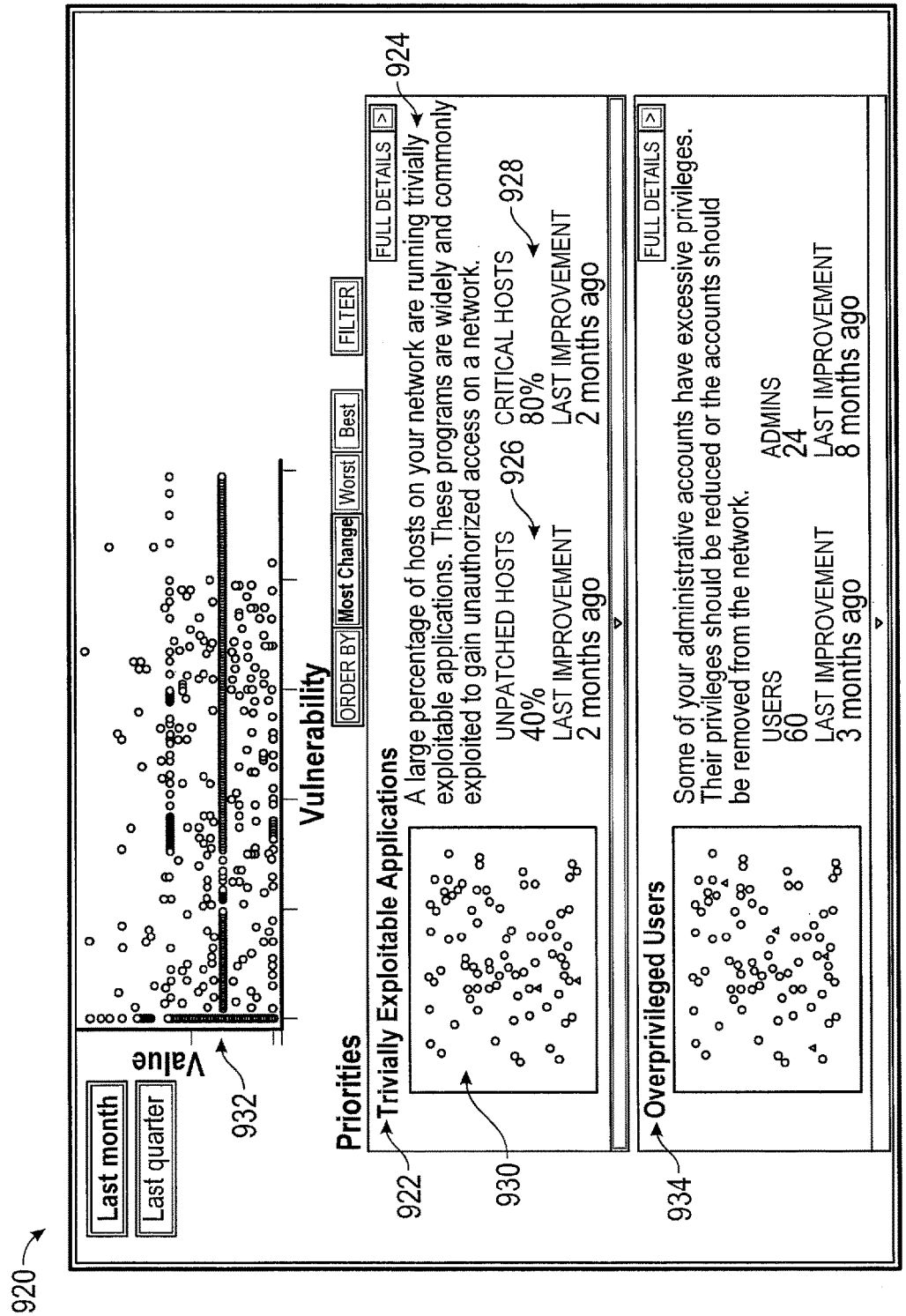
FIG. 9B is an example user interface illustrating summary data.

As illustrated in FIG. 9B, the system can provide description of summary data associated with user account risk values and/or network device risk values. For instance, the user interface 920 indicates metrics 922 that are most affecting the network device risk values of network devices. As an example, the system has determined one or more metrics indicating that a large percentage (e.g., greater than a threshold) of network devices are executing applications known to be trivially exploitable (e.g., comprised without extensive effort by a hacker). The user interface 920 includes text 924 (e.g., the system can store textual descriptions) describing the metric, and indicates a percentage of network devices 926 that are affected (e.g., executing exploitable software), along with an indication of when the metric was last improved, for example from a previous determination of the metric. Additionally, the user interface 920 includes a percentage of critical network devices 928 (e.g., network devices indicated to the system as being critical, or network devices determined to be critical according to a name of the network device, such as a domain controller, or according to a determined critical area as described above in FIG. 2E). The system also identifies affected network devices as a graphical representation 930, which can be the graphical representation of all network devices 932 filtered to only include affected network devices.

Similarly, the system has determined that a metric 934 affecting user account risk values is associated with administrative accounts having excessive privileges (e.g., as described above with respect to FIG. 5), and includes information describing the metric. In the example user interface 920, the system has determined that "60" users have unnecessary privileges, including "24" administrative users, and further indicates a most recent time that the metric has improved (e.g., improved greater than a threshold, such as by a threshold percentage reduction of users, or by an actual threshold reduction in number of users).

Figure 9C:
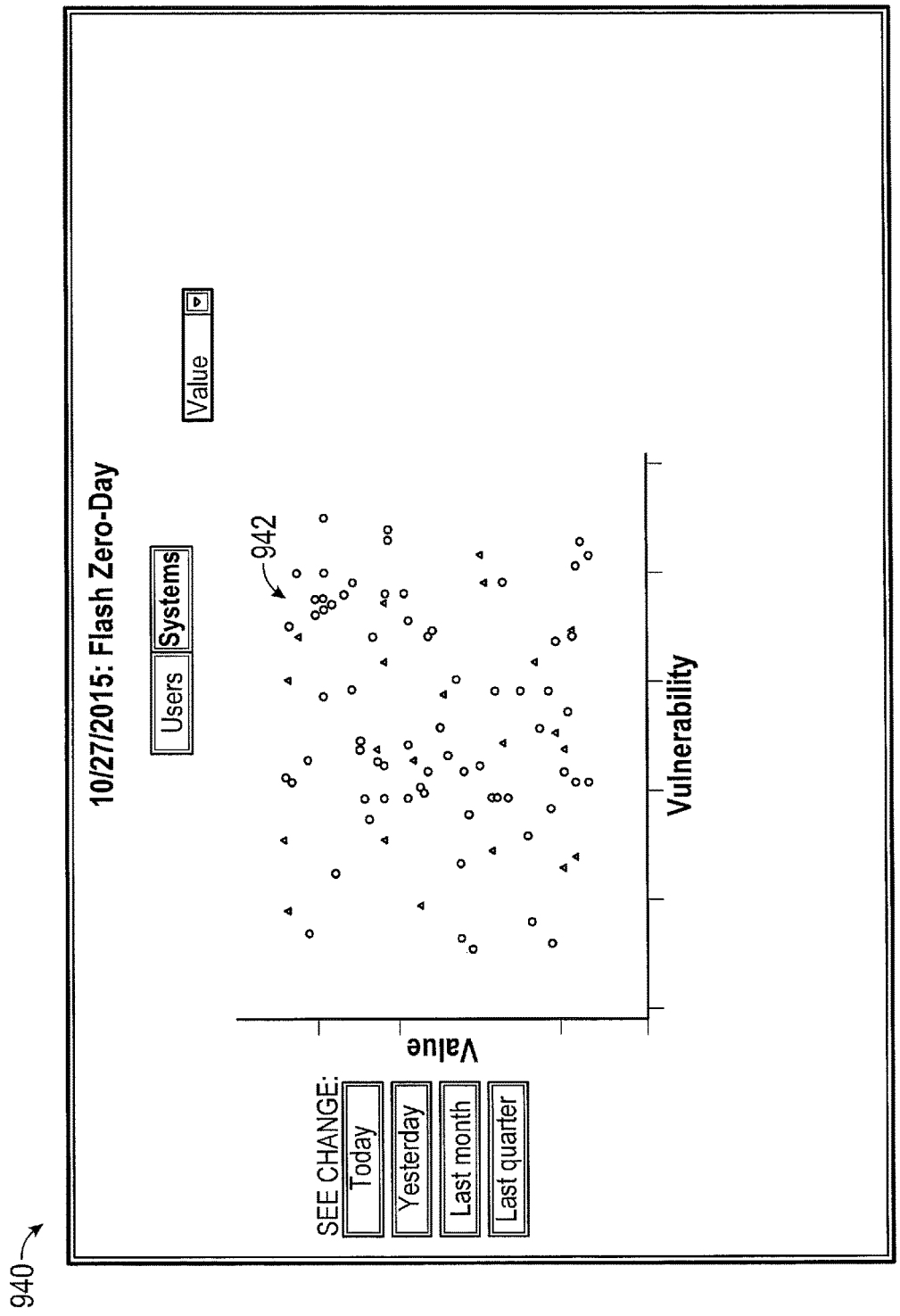
FIG. 9C is an example user interface illustrating modifications to network device risk values caused by an external event.

FIG. 9C is an example user interface 940 illustrating modifications to network device risk values caused by an external event. As described above, quantifying an external event (e.g., a real world event that informs, or affects, compromise vulnerabilities) can be difficult, and often an entity (e.g., a corporation) will be unable to determine the severity of an exploit to software or hardware.

The system can determine the degree to which an external event, such as a FLASH zero-day exploit as illustrated, affects network device risk values of network devices. For instance, the system can determine that the specific application affected by the external event (e.g., FLASH) can allow for an attacker to compromise a host network device, and can thus increase an associated value of a metric describing exploitable applications. After modifying network device risk values of affected network devices (e.g., network devices running FLASH), the system can provide information describing the external event in the user interface 940.

User interface 940 includes a graphical representation 942 of network devices mapped in a chart according to respective network device risk values as described in FIG. 9A. In some implementations, to illustrate the affect of the external event, the graphical representation 942 can include an animation, a video, and so on, which identifies (e.g., highlights) affected network devices and illustrates their increase in associated compromise vulnerability. In this way, the reviewing user can quickly review the graphical representation 942 to get a sense of how deeply the external event affects the network devices.

Figure 9D:
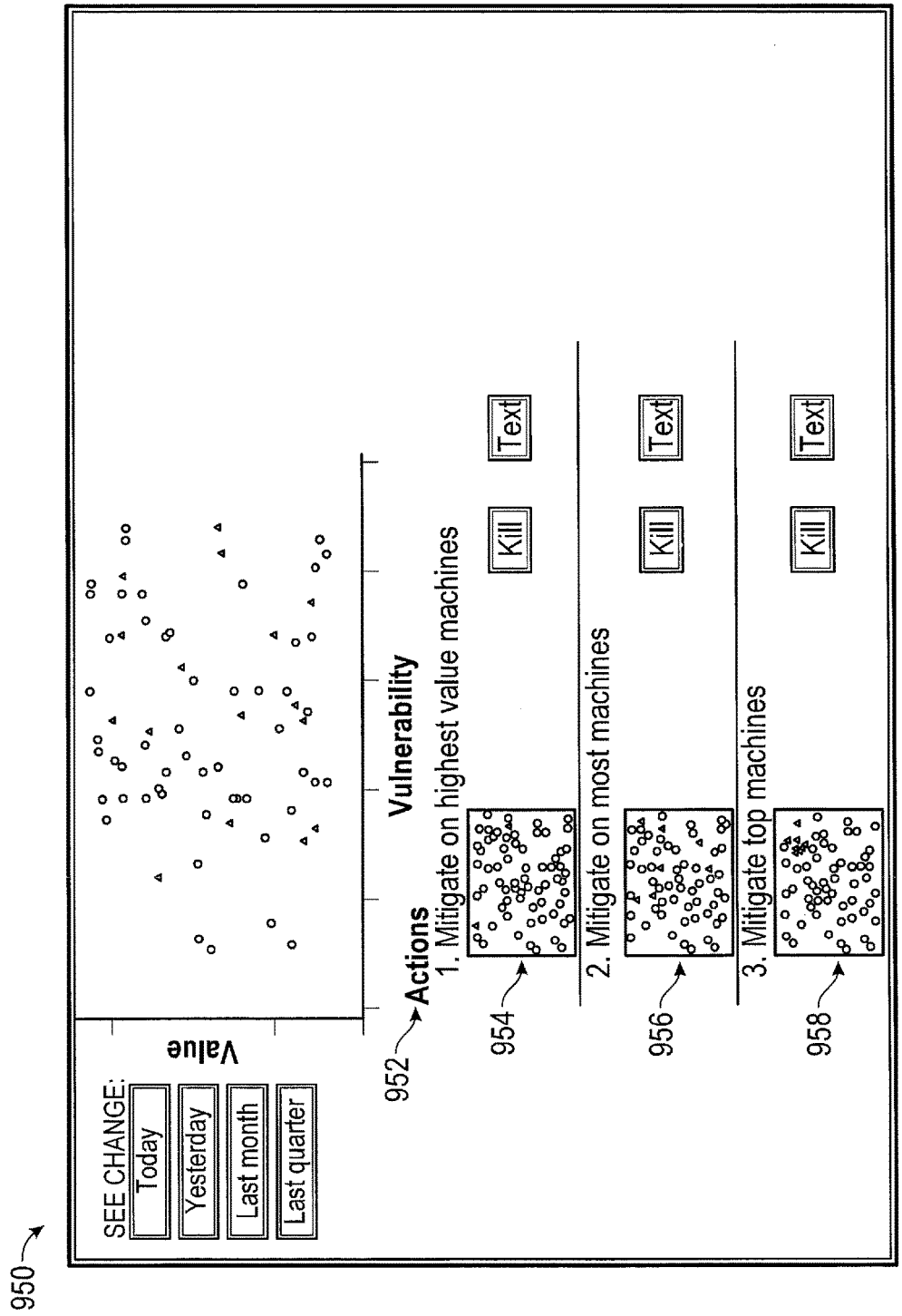
FIG. 9D is an example user interface illustrating remedial actions to be taken in response to an external event.

Along with presenting information describing the external event, the system can facilitate remedial actions to be taken. FIG. 9D is an example user interface 950 illustrating remedial actions 952 to be taken in response to an external event. As will be described (e.g., with respect to FIG. 13), one or more network devices can include software (e.g., an agent) in communication with the system. The reviewing user can interact with user interface 950 to immediately handle the external event, and reduce the network device risk values (e.g., by reducing compromise vulnerabilities of affected network devices).

For instance, the user interface 950 includes remedial actions 952 to "kill" (e.g., kill processes associated with FLASH, remove FLASH entirely, and so on) FLASH on network devices with compromise values greater than a threshold (e.g., the highest value network devices). In this way, the reviewing user can immediately reduce a threat to high value network device targets. The user interface 950 includes a graphical representation 954 of high value network devices that are affected (e.g., the high value network devices can be highlighted). Similarly, the user interface 950 includes a remedial action 952 to "kill" FLASH on a majority of network devices 956, and on "top machines" 958 (e.g., network devices with highest network device risk values, such as a top threshold percent of network devices or a top threshold number).

By providing the reviewing user the immediacy of information describing an external event, and then facilitating a remedial action to improve network security, the system can better ensure that events outside the control of the reviewing user can be dealt with proportionally to their severity.

Figure 10:
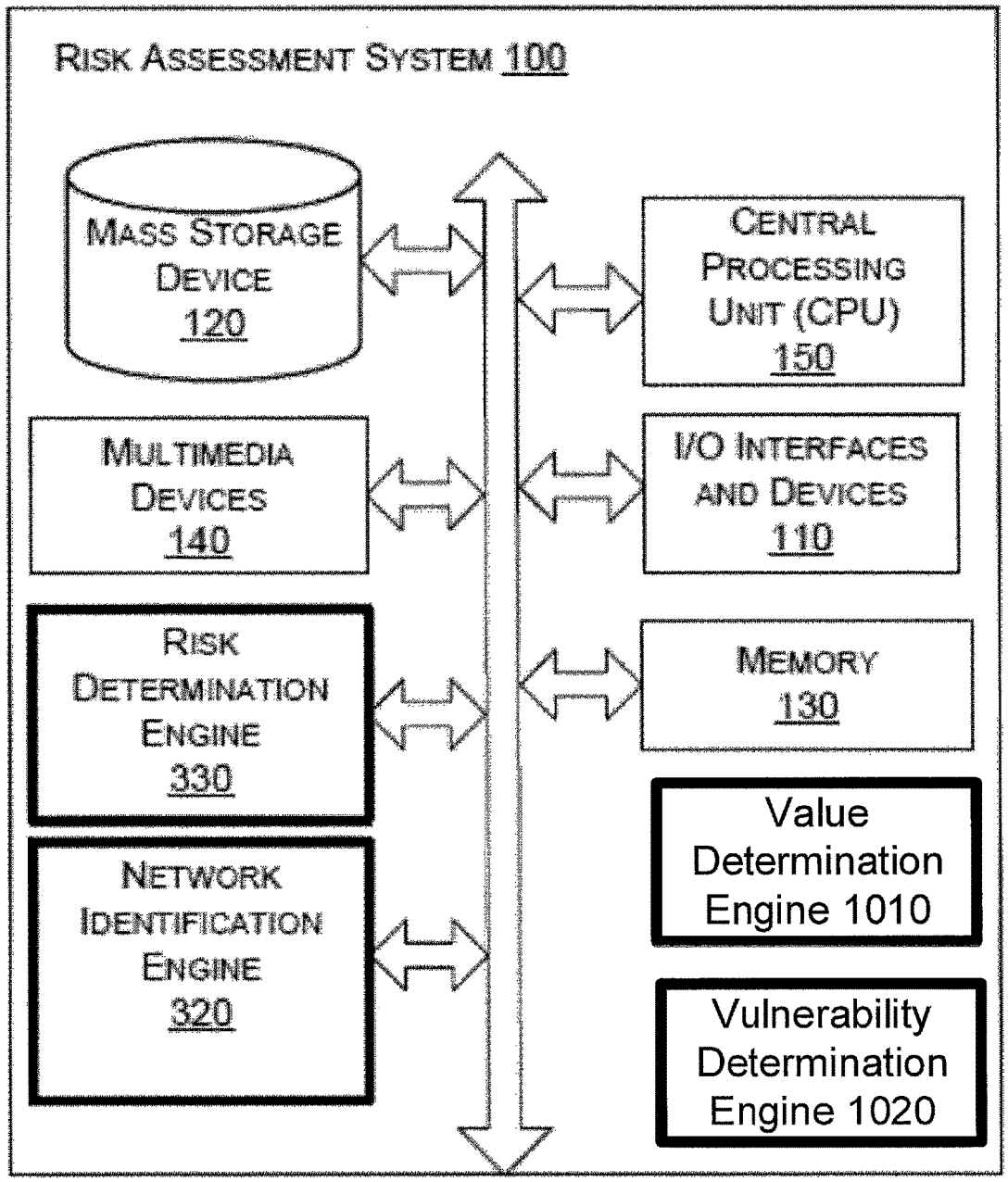
FIG. 10 is a block diagram of one embodiment of the risk assessment system, including example components and modules.

FIG. 10 is a block diagram of one embodiment of the risk assessment system 100, including example components and modules. The risk assessment system 100 includes many components similar to those in the system of FIG. 8, such as one or more central processing units ("CPU") 150, one or more memories 130, and one or more the modules (or "engines"), etc.

In the embodiment of FIG. 10, the risk assessment system 100 includes a value determination engine 1010 (e.g., which can implement functionality described below with respect to FIG. 12A-12B) and vulnerability determination engine 1020 (e.g., which can implement functionality described below with respect to FIG. 12A-12B). These "engines," which are also referred to herein as "modules," are configured for execution by the CPU 150 and may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Figure 11:
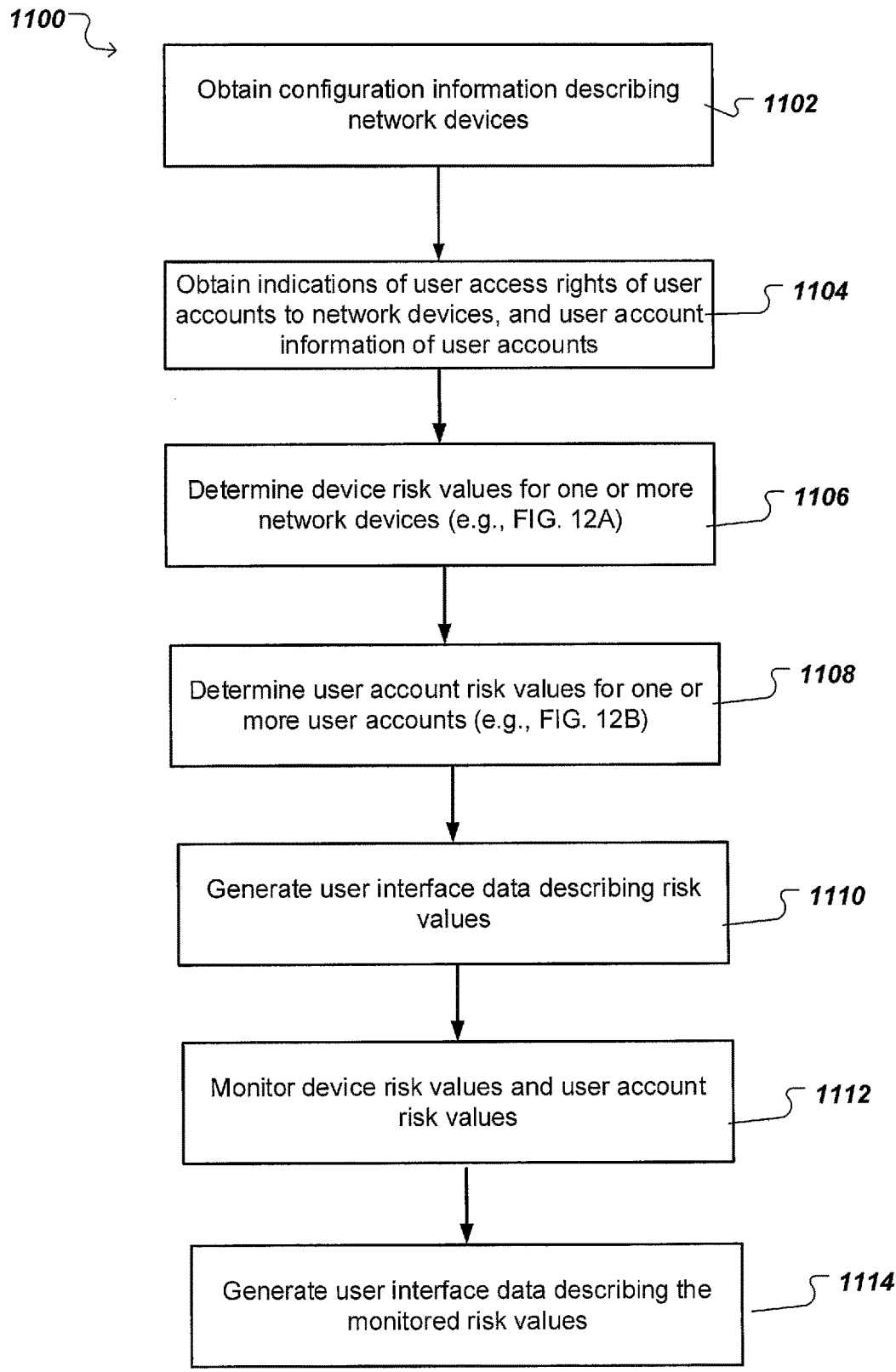
FIG. 11 is a flowchart of an example process for generating user interface data describing risk values associated with user accounts and network devices of one or more networks.

FIG. 11 is a flowchart of an example process 1100 for generating user interface data describing risk values associated with user accounts and network devices of one or more networks. For convenience, the process 1100 will be described as being performed by a system of one or more computers (e.g., the risk assessment system 100).

The system obtains configuration information describing network devices (block 1102). To analyze vulnerabilities of network devices, and thus likelihoods that network devices can be compromised, the system obtains configuration information for each network device. The configuration information can include types of software being executed on the network device (e.g., applications, operating systems, and so on), hardware included in the network device, network information associated with each network device, and so on.

The system obtains indications of user access rights of user accounts, and user account information of user accounts (block 1104). As described above, with respect to FIGS. 3-4, the system can obtain user account access information (e.g., indicating actual access attempts to network devices, or accesses that are possible) identifying access rights of user accounts with respect to network devices, group membership information of user accounts, and so on.

The system also obtains user account information of user accounts, which can include user profile information (e.g., an employee role associate with each user account, a department in which the employee works, locations from which the user account is utilized), user account rules enforced on the networks (e.g., whether two factor authorization is required, whether passwords need to be changed after an elapsed period of time), network actions of user accounts (e.g., web pages visited by employees associated with the user accounts, services accessed (e.g., software services accessible over the Internet as will be described, user account transitions to subsequent user accounts), and so on.

The system determines network device risk values for one or more network devices (block 1106). The system determines compromise vulnerabilities and compromise values for the one or more network devices, and combines (e.g., weights) the determined information to determine network device risk values. Determining network device risk values is further explained below, with respect to FIG. 12A.

The system determines one or more metrics that measure aspects of a compromise vulnerability and a compromise value for each network device. Each metric associated with a compromise vulnerability measures an aspect of a network device that is known, or assumed, to be associated with an increase in the network device being able to be compromised (e.g., by an attacker). For instance, an example metric measures the degree to which a network device follows basic security practices (e.g., practices set forth as one or more rules by a security officer), including whether the network device runs anti-virus software, security software, and so on. The example metric can increase in value depending on the degree to which the network device is an outlier with respect to the ideal values for the metric (e.g., an L2 norm associated with the practices). In the described example, the value of the metric can increase if a network device does not run anti-virus and/or security software. The system can then combine (e.g., weight) respective values of the metrics to determine a compromise vulnerability for each network device.

Similarly, each metric associated with a compromise value measures an aspect of a network device that is known to increase the priority an attacker might place on compromising the network device. For instance, an example metric measures whether the network device is used by user accounts with compromise values greater than a threshold. An attacker might place a high priority on a network device used by high value user accounts, so that he/she can obtain log-in credentials (e.g., skim the credentials) by compromising the network device.

The system determines user account risk values for one or more user accounts (block 1108). As above, the system determines compromise vulnerabilities and compromise values for the one or more user accounts, and combines (e.g., weights) the determined information to determine user account risk values. Determining user account risk values is further explained below, with respect to FIG. 12B.

The system determines one or more metrics that measure aspects of a compromise vulnerability of the user accounts. For instance, the system can determine whether user accounts are required to have changed passwords periodically, and if not, the system can increase the metric, and thus compromise vulnerabilities, of all affected user accounts. Additionally, a metric can measure whether an employee, while logged-in as a user account, is known to visit web pages that are identified as malicious. The system can obtain log data describing network actions to identify web pages visited by user accounts.

The system determines one or more metrics that measure aspects of a compromise value of the user accounts. For instance, a metric can measure an importance of group membership information associated with each user account. That is, the system can increase a value of the metric based on whether a user account is included in a group that includes user accounts associated with particular employee roles (e.g., executive employees, security officers, and so on).

The system can optionally determine a risk value for the one or more networks (e.g., a total risk value), for all network devices (e.g., a total risk value for the network devices), and for all user accounts (e.g., a total risk value for user accounts).

For instance, in some implementations the system can combine (e.g., determine a measure of central tendency) of all risk values for network devices to determine a total risk value for the network devices, and similarly for user accounts. Additionally, the system can weight the total risk value for network devices and total risk value for user accounts to determine a risk value for the networks.

Figure 12A:
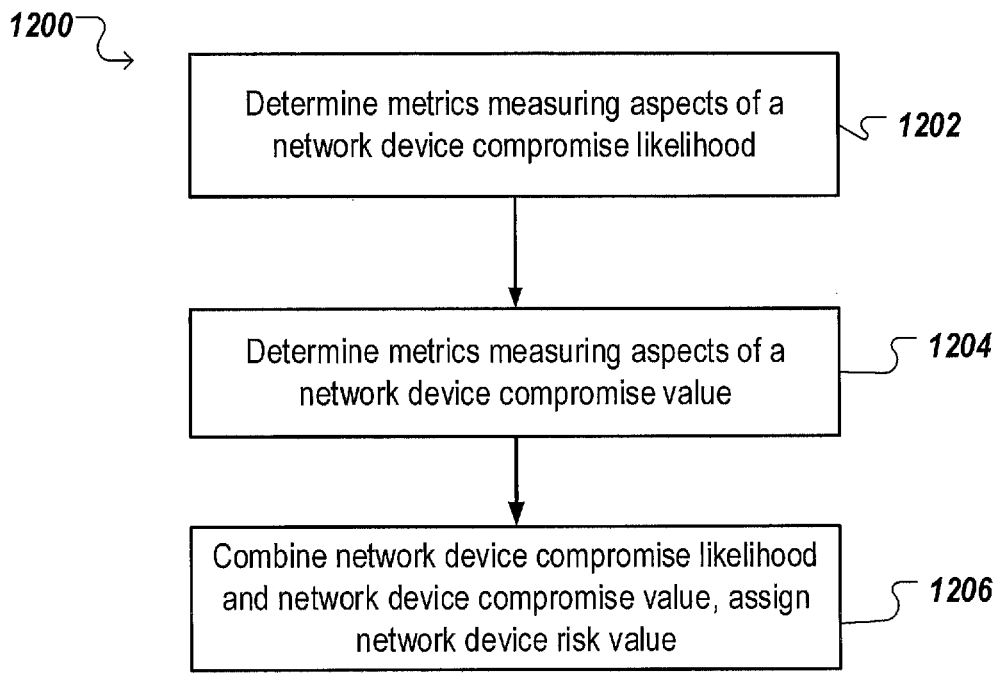
FIG. 12A is a flowchart of an example process for determining a network device risk value of a network device.
Figure 12B:
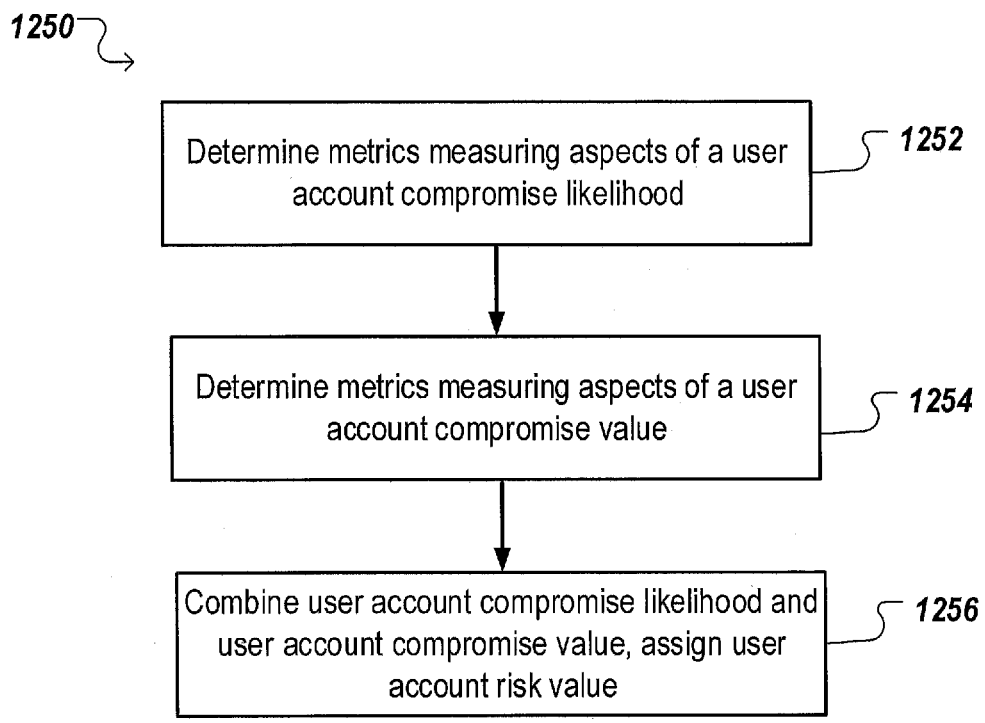
FIG. 12B is a flowchart of an example process for determining a user account risk value of a user account.

In addition, the system can determine metrics associated with information of all network devices and/or all user accounts (e.g., some metrics measure information for individual network devices and/or user accounts as described in FIGS. 12A-12B).

That is, in some implementations the system can determine the below information, and utilize the determined information to determine a total risk value of network devices, a total risk value of user accounts, and a total risk value of the networks.

For instance in determining a total risk value for the network devices, the system can determine a number of network devices (e.g. a total number of network devices associated the networks), a number of inactive network devices (e.g., a number of network devices with no active logons in a prior time period such as 90 days), a number of machines running vulnerable operating systems, a number of network devices that haven't been analyzed to determine applications executing on the respective network device, a number of distinct applications running on the networks (e.g., on network devices included in the networks), a percentage of applications that are up to date (e.g., a current version), a percentage of commonly exploited applications that are up to date), a number of network devices with local administrator accounts on them, and so on.

To determine a total risk value for the user accounts, the system can determine a number of administrator accounts (e.g., a total number of enterprise, domain, and built-in accounts on the networks, a recommended value for each is less than a threshold such as 10, 12, 20), a number of enabled administrator accounts (e.g., a total number of usable administrative accounts), a number of stale administrator accounts (e.g., a number of administrative accounts with no logons in a prior time period such as 30 days) a number of administrative accounts with old passwords (e.g., a number of accounts with passwords that haven't been changed in longer than a threshold such as 180 days), a number of administrative accounts not using two factor authentication (e.g., number is to preferably be less than or equal to a threshold such as 0, 1, 2), a number of distinct local administrator accounts, and so on.

To determine a total risk value for the networks, the system can combine the above determined information, along with information including, a number of secure to non-secure communication paths (e.g., a number of detected network paths between a secure and non-secure portion of the network), a number of secure to external communication paths, a number of low volume connection paths (e.g., a number of communication paths that are rarely traversed). Determining communication paths (e.g., secure, non-secure connections, which can be determined from a network topology, and so on) are described above, with respect to FIGS. 2A, 6, and so on).

The system generates user interface data describing the determined risk values (block 1110). As illustrated in FIGS. 9A-9D, the system generates user interface data for presentation on a user device. Utilizing the user interfaces, a reviewing user can monitor risk values of network devices and user accounts, enabling the reviewing user to determine whether the overall security of the networks is improving.

To facilitate this enablement, the system monitors network device risk values and user account risk values (block 1112). The system determines risk values periodically, and maintains (e.g., in one or more databases) multitudes of risk values for each network device and user account over lengths of time.

The system generates user interface data describing the monitored risk values (block 1114). As illustrated in FIGS. 9A-9B, the system can generate user interface elements that illustrate the change in risk values. Using these generated user interfaces, the reviewing user can examine quantifiable empirically generated evidence regarding the risk of user accounts and network devices associated with the networks.

FIG. 12A is a flowchart of an example process 1200 for determining a network device risk value of a network device. For convenience, the process 1200 will be described as being performed by a system of one or more computers (e.g., the risk assessment system 100).

The system determines metrics measuring aspects of a network device compromise vulnerability (block 1202). As described above, a network device compromise vulnerability is a measure describing a likelihood a network device can be compromised (e.g., by a malicious actor). To determine the network device compromise vulnerability, the system determines multitudes of metrics that each measure a particular aspect of an increase in likelihood of compromise. While examples of metrics are described below, it should be understood that the examples are not exhaustive, and additional metrics can be included. Additionally, the system can utilize less than the total of the metrics described below to determine a network device compromise vulnerability.

The system determines a metric measuring the network device's conformance to one or more best practice guidelines for basic security. An entity (e.g., a corporation, governmental entity) can generate best practice guidelines that indicate base network device configurations that are acceptable within the entity. The system can access information describing the guidelines, and measure a distance from the guidelines that the actual configuration information for the network device indicates. For instance, the guidelines can indicate that each network device is to execute an anti-virus software, or a particular type or version of anti-virus software, along with other monitoring software including software to scan files received in e-mails, firewall software executing on the network device, and so on. The system obtains the configuration information for the network device, and determines whether the network device conforms to the guidelines. For each determined instance of non-conformity (e.g., lack of an anti-virus software) the system can increase a value associated with the metric. Additionally, the system can increase the value by varying amounts depending on the distance from the ideal described in the guidelines (e.g., if the network device runs anti-virus software which hasn't had its virus definition data updated recently, the value can be lower than if the network device fails to run anti-virus software at all). Similarly, the system can increase the value by varying amounts depending on a weighting, or importance, that is associated with each best practice (e.g., not having anti-virus software can be weighted higher than software to scan files received in e-mails).

The system determines a metric measuring a degree to which the network device is running (e.g., executing, or just merely installed or available to be run on the network device) software that is known to be exploitable. The system can obtain information describing exploits of software, and obtain information describing software on the network device (e.g., the system can communicate with an agent executing on the network device, or the system can access configuration information for the network device) to determine whether the network device is running exploitable software. As an example of obtaining exploits of software, the system can utilize the Common Vulnerability Scoring System (CVSS) to determine exploits. The system increases the value associated with the metric depending on the exploit associated with the software (e.g., software exploits that allow for the complete compromise of the network device can have a higher value than other exploits). For instance, the system can access the value assigned to the exploit by the CVSS (e.g., a number between 1 and 10). Similarly, the system can increase the value associated with the metric depending on a number of software applications known to be exploitable, or that have had exploits in the past. Furthermore, even if the network device executes software that does not have any presently known exploits, the value associated with the metric can be increased if the software is known to have had exploits in the past, or is of a type that commonly has exploits (e.g., web browsers are known to have exploits, which can be undiscovered publicly but utilized in the wild, for instance by malicious actors).

The system determines a metric measuring a level of inactivity of the network device. The system determines whether the network device has been inactive for greater than one or more threshold time periods, with each threshold being associated with a particular value for the metric. For instance, a network device that is rarely used can be unnecessary to the networks, and can be at an increase likelihood for compromise as an attacker might assume it is rarely monitored.

The system determines a metric measuring numbers of shared local administrator accounts that can access the network device. The system increases a value associated with the metric according to increasing numbers of shared local administrator accounts. Since an administrator account affords great permissions with respect to the network device (e.g., and thus other network devices it's in communication with, as described above), the number of these accounts are to be kept at a minimum. Specifically, network administrators have reduced visibility and oversight of local administrator accounts as they are not centrally managed, thus causing the network device to be at a greater likelihood of compromise.

The system determines a metric associated with information describing encryption of the network device. In some implementations, the system can indicate that the value associated with the metric is binary, indicating whether the network device utilizes encryption. In some implementations, the system can increase the value depending on the type of encryption utilized. For instance, an encryption standard known to not have any exploits, or be at a risk of being compromised, can have a low value. An encryption standard known to not be as secure, can have an increased value.

The system determines a metric describing the network connectivity of the network device. The system can increase a value associated with the metric according to a degree at which the network device can be accessed. For instance, if the network device is accessible over the Internet, the value can be high, whereas if the network device is only accessible through an Intranet (e.g., which may connect to the Internet through a different network device), the value can be lower.

Additionally, the system determines a metric describing a number of paths to the network device (e.g., which can be based on a determined network topology, as described above with respect to FIG. 2A-2D). The greater the number of paths to the network device, the more likely it could be that he network device can be accessed, and potentially compromised. Similarly, a metric can determine communication paths, and network connectivity, to the network device from other network devices indicated as being valuable, or that have associated compromise values greater than a threshold.

After determining one or more of the described metrics, the system combines (e.g., weights) the respective values to determine an overall value. The network device compromise vulnerability can be determined from the overall value. For instance, overall values can be separated into ranges, with each range being associated with a respective compromise vulnerability. Additionally, the overall values can be normalized against a maximum overall value, or an average overall value, to determine the compromise vulnerability. In some implementations, the system can provide the overall value, or each measured value, to a machine learning algorithm which classifies values according to empirically determined compromises of network devices, and the machine learning algorithm can indicate a compromise vulnerability. Similarly, in some implementations the system can provide each value of an associated metric to a machine learning algorithm (e.g., a k-means clustering algorithm) to cluster network devices according to the values of the determined metrics. The machine learning algorithm can then provide a compromise vulnerability for the network device.

Upon determining the compromise vulnerability for the network device, the system stores information describing the compromise vulnerability (e.g., time stamp associated with the determination, values of metrics, and so on) in one or more databases.

The system determines metrics measuring aspects of a network device compromise value of the network device (block 1204). As described above, a network device compromise value is a measure indicating a priority that an attacker would place on compromising the network device. While examples of metrics are described below, it should be understood that the examples are not exhaustive, and additional metrics can be included. Additionally, the system can utilize less than the total of the metrics described below to determine a network device compromise value.

The system determines a metric describing a type of operating system being run by the network device. The system can increase a value associated with the metric depending on whether the operating system is a consumer type (e.g., an operating system utilized on commonly purchased computers, laptops) or a type associated with the maintenance of networks (e.g., a server operating system, such as LINUX or other *NIX based operating systems).

The system determines a metric associated with a name, or other identifier, of the network device. For instance, an attacker can value a network device more highly if the network device has a name generally accepted to indicate that it has greater privileges than other network devices (e.g., a domain controller). The system can access information describing names that have been determined to indicate more valuable network devices, and can compare a name of the network device to the accessed information. The system can then increase a value associated with the metric based on the comparisons (e.g., a domain controller can be a highest value, and a name indicating a personal laptop can be a lower value). Similarly, if a particular identifier, or portion of an identifier, is associated with systems that are known to have value, the system can increase a value of associated with the metric. That is, even if the identifier is not publicly known to indicate an importance (e.g., increase in value), an attacker may determine the information (e.g., from information indicating user accounts that access the network device, from one or more files explaining naming conventions, and so on), which can increase the compromise value of the network device. Optionally, the system can increase a value associated with the metric to a greater degree if the network device is associated with a name than if the network device is associated with an identifier, or portion of identifier.

The system determines a metric associated with applications, or other software, being run (e.g., executed) on the network device. The system can obtain information identifying applications that indicate the network device is utilized to maintain the networks, or deal with network security. The system can then compare the identified applications to applications running on the network device, and increase a value associated with the metric depending on the comparisons (e.g., increase proportionally). For instance, applications that can be utilized to configure server systems, user accounts, update permissions and privileges, and so on, can cause the system to increase the value.

The system determines a metric associated with user accounts that access the network device. As described above, with reference to FIG. 11, the system obtains user account access information, and can determine user accounts that can access, or are known to access, the network device. The system can increase a value associated with the metric depending on a number of user accounts that access the network device with associated user account compromise values greater than a threshold. The system can also increase the value depending on the particular user account compromise values (e.g., proportionally to the user account compromise values). Since valuable user accounts are likely to access valuable network devices, the system can determine valuable network devices based on actual actions taken by the valuable user accounts.

Similarly, the system can determine the most common user account that accesses the network device, and can increase the network device compromise value based on the user account compromise value of the most commonly utilized user account. That is, if the most common user account is highly valuable, the system can determine that the network device is also valuable.

Additionally, the system can determine a metric associated with a cost that would be incurred if the network device is compromised (e.g., as described above with respect to FIG. 4). The system can increase a value associated with the metric depending on the determined cost (e.g., in proportion to the determined cost, for instance with respect to other network devices).

In some implementations, the system can determine a metric describing whether the network device is included in a secure area of the networks, or connects to network devices in secure areas (e.g., as described above with respect to FIG. 2 using a network topology), and can increase a value associated with the metric accordingly.

Similar to determining the network device compromise vulnerability, the system can combine the determined metrics to determine a network device compromise value for the network device. In some implementations, the system can receive information (e.g., from a security officer) indicating a ranking of the most valuable network devices. The system can initially determine network devices associated with the highest network device compromise values, and then present the determined network devices for ranking by the security officer, or other employee. The network device compromise values of the network devices ranked by the security officer can be greater than remaining network devices, and proportional to the particular ranking.

The system combines the network device compromise vulnerability and network device compromise value into a network device risk value (block 1206). As illustrated in FIG. 9A, the risk value is a linear combination of the compromise vulnerability and compromise value. In some implementations, the system can weight the compromise vulnerability and compromise value, and normalize the result to determine the risk value (e.g., the compromise value can be weighted greater than the compromise vulnerability). In some implementations, the system can provide the determined compromise vulnerability and compromise value to a machine learning algorithm trained on labeled data to determine a network device risk value for the network device. The system stores information describing the determined network device risk value (e.g., in one or more databases).

FIG. 12B is a flowchart of an example process 1250 for determining a user account risk value of a user account. For convenience, the process 1250 will be described as being performed by a system of one or more computers (e.g., the risk assessment system 100).

The system determines metrics measuring aspects of a user account compromise vulnerability of the user account (block 1252). As described above, the user account compromise vulnerability is a likelihood that an attacker can compromise the user account.

The system determines a metric indicating a length of time from which the user account was last used. User accounts that haven't been used in a while (e.g., a user selectable period of time, such as a month, a year) can be at a greater risk for compromise. For instance, an employee associated with the user account can no longer be employed at an entity which maintains the networks, causing the user account to be unnecessary, and at a greater risk of compromise. Additionally, if the system is an administrator account, the value can increase more sharply according to when the account was last used (e.g., if the administrator account hasn't been used for a week, or a month, the value can increase higher than a non-administrator account which hasn't been used for the same period of time).

The system determines a metric indicating whether the user account requires two-factor authentication to be utilized. Since two-factor authentication provides an added degree of assurance that a correct person (e.g., an employee approved to use the user account) is utilizing the user account, the user account compromise vulnerability can be lower. Similarly, if the user account does not utilize two-factor authentication, the system can increase a value associated with the user account compromise vulnerability (e.g., the system can increase the value higher if network guidelines indicate user accounts are supposed to, or are recommended to, active two factor authentication).

The system determines a metric associated with a length and/or complexity of the user account's password. For instance, a value associated with the metric can be increased if the user account is likely to be compromised utilizing a dictionary-based attack, or a brute-force attack depending on the length of the password.

The system determines a metric associated with web pages visited by the user account. The system can obtain information describing a network history of the user account, and increase a value associated with the metric based on an analysis of the visited web pages. For instance, web pages known to of a particular type (e.g., torrent web pages), or known to be associated with malicious software (e.g., malware), can cause the value to be increased.

The system determines a metric associated with successful phishing attempts. In some implementations, the system can obtain information describing historical phishing attempts on the user account, and whether they were successful. For instance, an entity that maintains the networks can periodically send phishing e-mails to user accounts, to monitor whether employees associated with the user accounts fall to the phishing attempt trap and provide improper private information. The system can analyze the historical performance of these test phishing attempts, along with actual malicious phishing attempts, and increase a value associated with the metric accordingly.

Additionally, the system determines a metric associated with network devices the user account logs into. For instance, if the user account commonly accesses a particular network device with a high compromise vulnerability, or that is known to have been compromised within a prior selectable time period, the system can increase a value associated with the metric. That is, the system can determine that the user account credentials can be skimmed more easily if an attacker can compromise the main network device the user account utilizes.

After determining one or more of the above metrics, the system can determine a compromise vulnerability of the user account (e.g., as described above with reference to FIG. 12A).

The system determines metrics measuring aspects of a user account compromise value of the user account (block 1254). As described above, a user account compromise value indicates a priority that an attacker would place on compromising the user account (e.g., with respect to other user accounts).

The system determines a metric describing privileges and permissions associated with the user account. For instance, the system can increase a value associated with the metric depending on user account access rights of the user account (e.g. whether the user account can access network devices with high compromise values). Additionally, the system can increase the value depending on whether the user account is an administrator account, a local administrator account, or other user account which can escalate, or otherwise modify, privileges of other user accounts or network devices. Similarly, the system can increase the value if the user account is associated with other user accounts that have increased privileges. For example, an employee can have a first user account (e.g., for normal use), and a second user account associated with an increase in privileges (e.g., for very particular uses). The system can increase the value for the first user account, as the first user account can, in part, lead to access to the second user account.

The system determines a metric associated with a name of the user account. The system can increase a value associated with the metric depending on whether the name includes text that indicates that the user account has an importance with respect to the networks. For instance, the system can determine whether the user account includes "admin", "it", "service", "ops", and so on. Upon a positive determination the system can increase the value. Similar to the above discussion regarding an identifier of a network device leading to an increase in the value, an identifier (e.g., a name, portion of name, numbers or characters included in the name, and so on), can also lead to an increase in the value.

The system determines a measure associated with group membership information of the user account. The system can determine, for every group, a distance from the group to a group including a user account associated with one or more executives (e.g., the chief executive officer), and can assign a value to the group based on the distance. In this way, the system can determine that user accounts closer to executives, can more easily access user accounts of the executives, and are thus greater in value. Specifically, these user accounts may otherwise be less protected than the executive accounts themselves, and can thus be used as a gateway into the more valuable executive accounts.

The system determines a metric associated with network devices the user account logs onto. The system can obtain indications of network device compromise values, and increase the user account compromise value based on whether the user account is known to, or can, log-into high value network devices (e.g., increased proportionally to the number of network devices).

The system determines a metric associated with user accounts the user account is known to transition to, or user accounts used to transition to the user account. For instance, if the user account is known to transition to a user account with administrator privileges (e.g., a same employee can have a user account utilized commonly, and a privileged user account to perform administrative functions), a value associated with the metric can be increased.

Additional metrics can include metrics associated with an employee role of the user account (e.g., network security employees, executives, and so on can have a greater value for this metric than assistants), whether the user account is enabled (e.g., non-enabled user accounts that can no longer be utilized can have a lower compromise value).

The system combines the metrics to determine a user account compromise value for the user account (e.g., as described above).

The system combines the user account compromise vulnerability and user account compromise value to determine a user account risk value (block 1256). As described above, with reference to FIG. 12A, the system can combine the compromise vulnerability and compromise value to determine an overall risk value for the user account.

Figure 13:
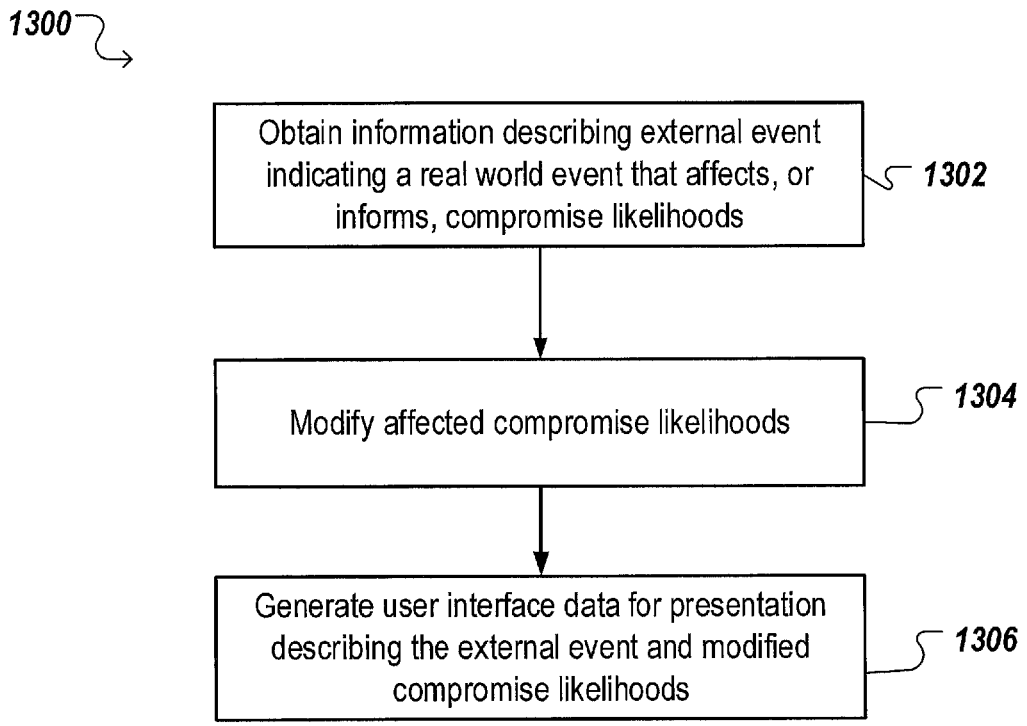
FIG. 13 is a flowchart of an example process for generating user interface data describing an external event.

FIG. 13 is a flowchart of an example process 1300 for generating user interface data describing an external event. For convenience, the process 1300 will be described as being performed by a system of one or more computers (e.g., the risk assessment system 100).

The system obtains information describing an external event (block 1302). As described above, an external event is a real-world event that informs, or affects, a likelihood of a user account or network device being compromised. One or more employees can monitor news regarding external events, and provide information to the system describing any identified external events.

For an external event associated with user accounts, the system can receive, for example, a data dump of a compromised server system. For instance, if a web page is compromised by an attacker, the attacker can release personal information maintained by servers that host the web page, such as user account log-ins/passwords, personally identifiable information, and so on.

For an external event associated with network devices, the system can receive, for example, information describing software or hardware that is affected by the external event. For instance, the system can receive information describing that a particular application allows for a particular type of exploit (e.g., an exploit in which an attacker can escalate privileges, an exploit in which an attacker can gain root access of a network device, and so on).

In some implementations, the system can actively scan for, and obtain, information describing external events. For instance, the system can monitor news articles for external events, and upon identification, can parse the news article to determine the scope of the event. For instance, an article might identify that an exploit was determined for a particular application which allows for a particular exploit. The system can then store the parsed information. Similarly, the system can determine that a web page was hacked, and either attempt to search for the data dump, or contact a person (e.g., a security officer) alerting him/her to the determined hacking.

The system modifies compromise vulnerabilities of user accounts and/or network devices (block 1304). After obtaining information describing the external event, the system determines user accounts and/or network devices that are affected by the external event.

For an external event associated with user accounts, the system scans through the released data for user account, or personally identifiable information, associated with user accounts of the networks. For instance, an employee may utilize the same user account name for work as for other web pages. The system can therefore scan through the released data for user account names that are the same, or similar, to user accounts of the maintained networks. Similarly, the system can scan through the released data for personal information (e.g., name, address, phone number, and so on) that corresponds to personal information of employees. The system can then increase the compromise vulnerability of affected user accounts, and in some implementations notify the user accounts to change their passwords, or force a change in password. In some implementations, the system can determine one or more metrics that are affected by the external event. For instance, the system can increase a metric associated with passwords of user accounts, since the affected user accounts may have had their passwords compromised. Additionally, the system can increase a metric associated with phishing attempts, sine the affected user accounts may receive increased phishing attempts, or blackmail attempts.

For an external event associated with network devices, the system can determine (e.g., from configuration information, or from agents executing on network device) which network devices execute affected software, or include affected hardware. The system can then raise the compromise vulnerabilities of the affected network devices. Additionally, as described in FIGS. 9C-9D, the system can enable a reviewing user to stop the exploited application from executing on the affected network devices, or can disable (e.g., in operating systems executing on the network devices) the hardware in the affected network devices.

Similarly, for an external event associated with the network devices, the system can modify (e.g., raise) user account compromise vulnerabilities of user accounts that commonly (e.g., greater than a threshold) access affected network devices.

The system generates user interface data describing the external event and modified compromise vulnerabilities (block 1306). As illustrated in FIGS. 9C-9D, the system can generate user interface data for presentation describing an external event. Additionally, the system can include functionality to stop affected applications or hardware (e.g., through communications with agents or other software executing on the affected network devices).

Figure 14:
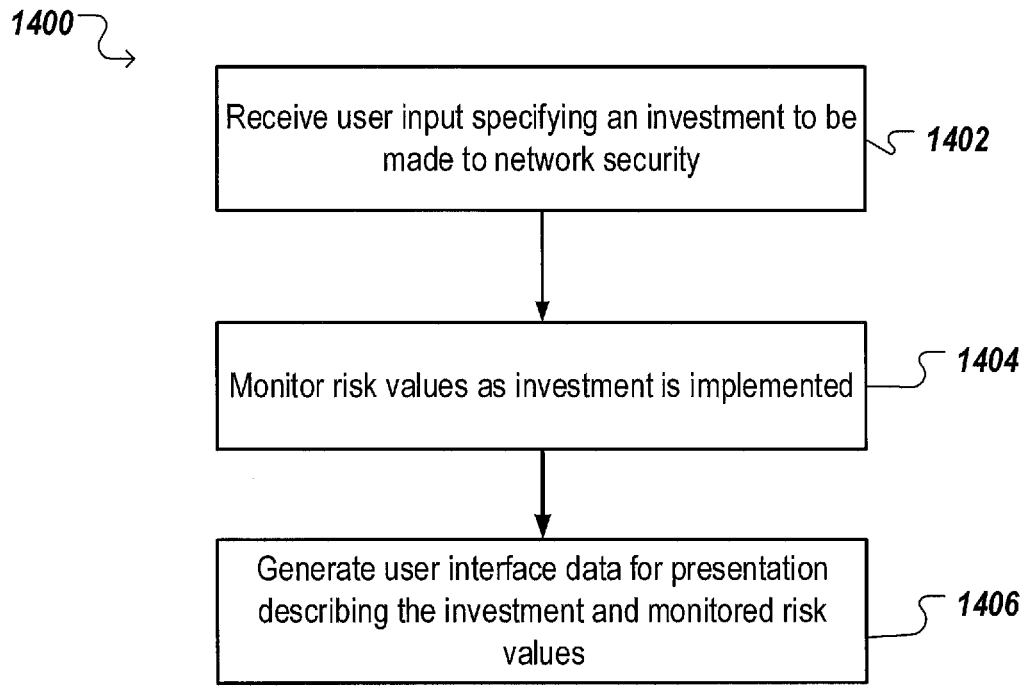
FIG. 14 is a flowchart of an example process for monitoring network security investments implemented in the networks.

FIG. 14 is a flowchart of an example process 1400 for monitoring network security investments implemented in the networks. For convenience, the process 1400 will be described as being performed by a system of one or more computers (e.g., the risk assessment system 100).

The system receives user input specifying an investment to be made to network security (block 1402). As described above, an investment is one or more goals, that when implemented, each reduce a risk value of one or more user accounts and/or one or more network devices. The system can determine investments that will most reduce risk values by analyzing which metrics are most commonly raising compromise vulnerabilities or compromise values of user accounts and/or network devices.

For instance, the system can determine that a metric associated with exploitable applications on network devices is affecting greater than a threshold (e.g., a threshold percentage) of network devices. That is, the system can determine that a large number of network devices are executing applications that are raising compromise vulnerabilities. Additionally, the system can determine that network devices which don't have a use for the application are executing the application (e.g., a server system that is executing FLASH). The system can then determine that an investment to remove the exploitable application will be beneficial.

Similarly, the system can determine that forcing user accounts to implement two-factor authentication will lower user account risk values. Additional examples can include an investment to remove inactive network devices, remove user accounts with administrative privileges that haven't been used in a threshold time period, and so on.

The system can receive a selection of an investment (e.g., a determined investment), or the system can receive information describing an investment (e.g., a reviewing user can indicate that he/she will implement a particular investment).

The system monitors risk values as the investment is implemented (block 1404). As described above, with reference to FIG. 11, the system monitors risk values of user accounts and network devices periodically.

Figure 21:
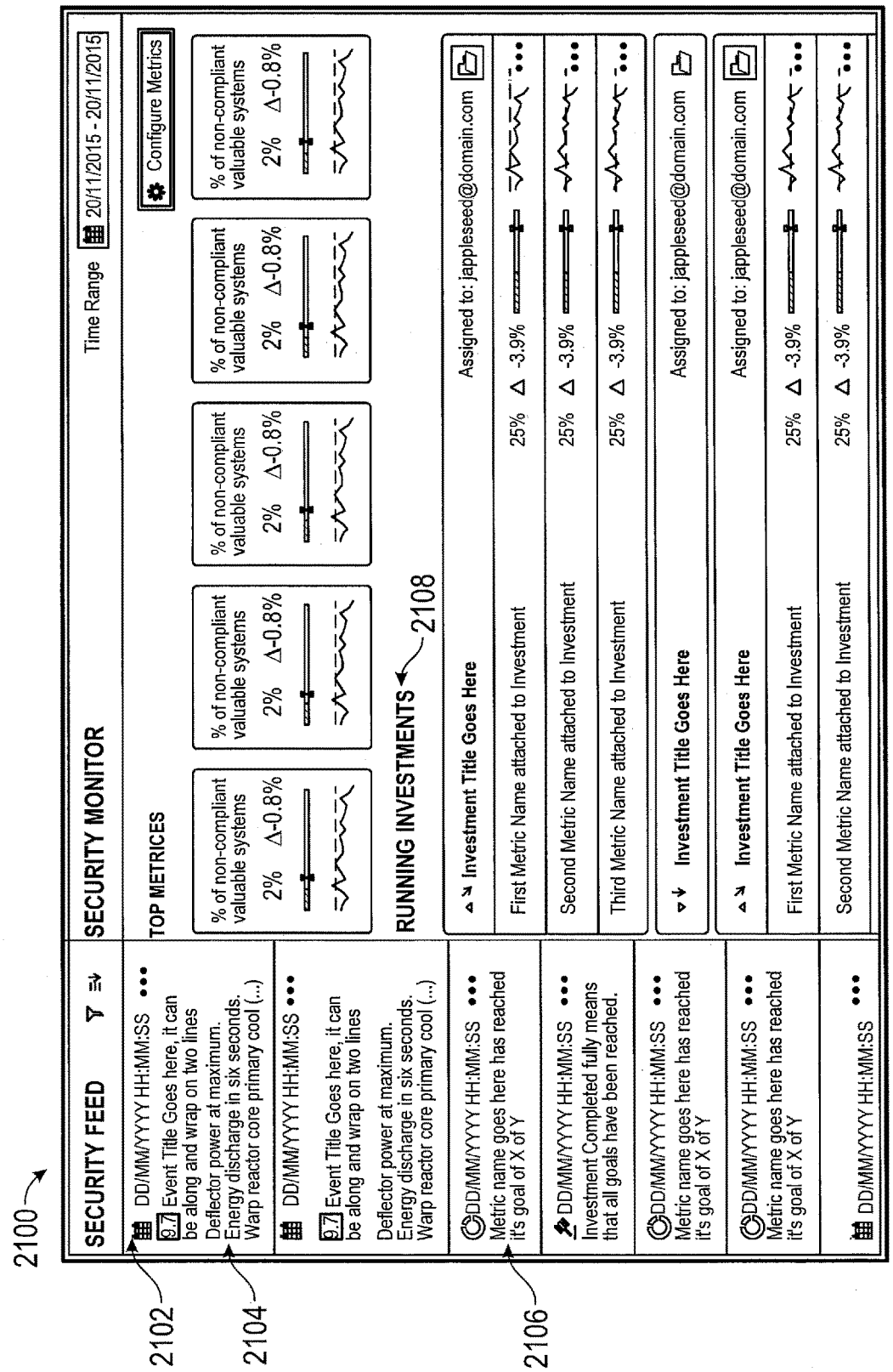
FIG. 21 is an example user interface illustrating summary information associated with presently occurring investments.

The system generates user interface data describing the investment and monitored risk values (block 1406). As illustrated in FIG. 21, the system can present information describing all investments being implemented, along with prior implemented investments. The system can monitor a decrease in values associated with particular metrics as each investment is being implemented, and provide summary information associated with the investment for presentation to the reviewing user. In this way, the reviewing user can actively monitor how actions to improve network security are affecting risk values.

Figure 15:
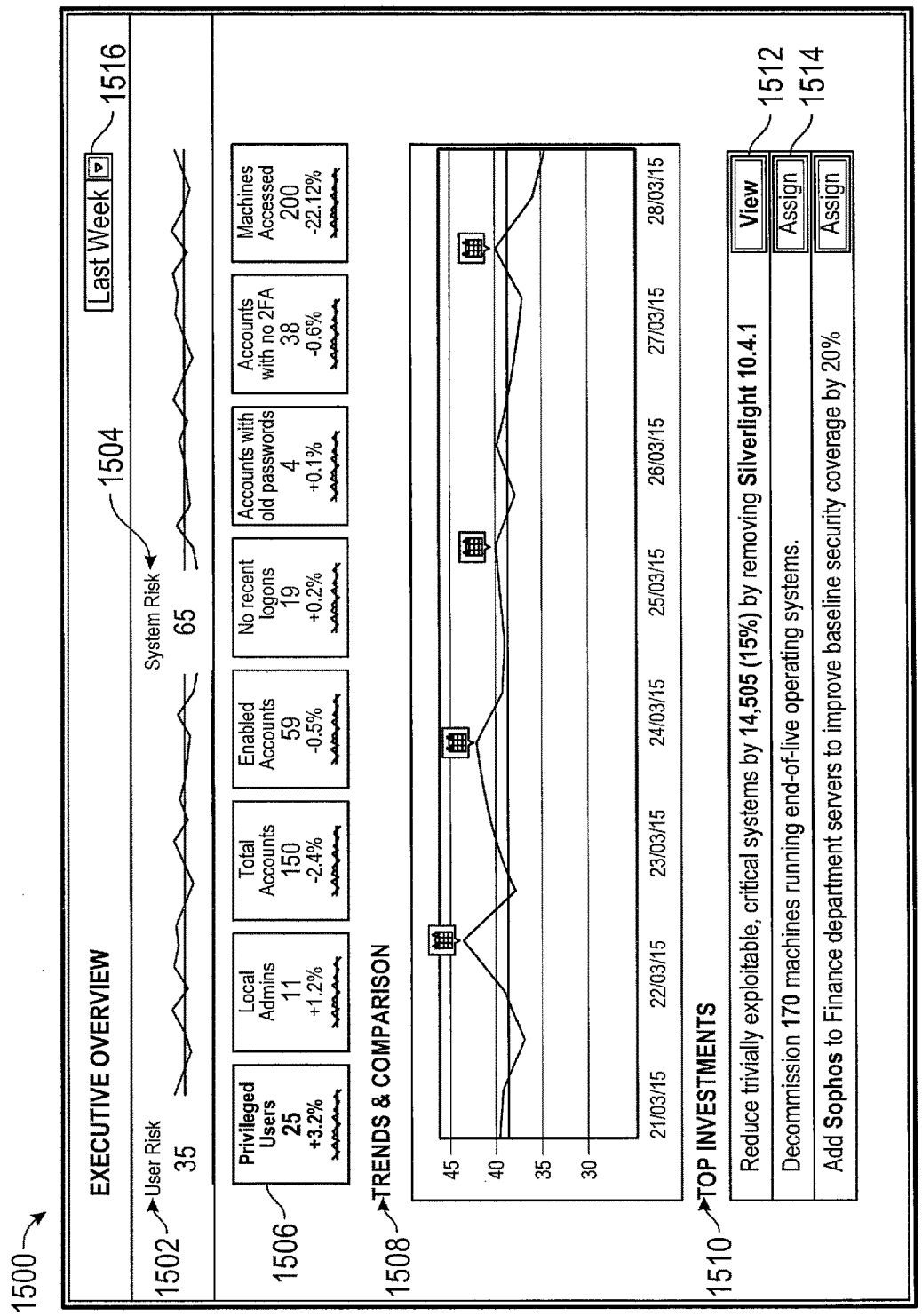
FIG. 15 is an example user interface illustrating summary information of network devices and user accounts.

FIG. 15 is an example user interface 1500 illustrating summary information of network devices and user accounts. The user interface includes a user account risk value 1502 of all user accounts along with a network device risk value 1504 of all network devices. The system can combine risk values of each user account and each network device to generate an overall risk value, providing a reviewing user (e.g., a security officer) with a quick overview of risk.

The user interface 1500 further includes indications of summary information 1506 associated with particular metrics used to determine compromise vulnerabilities and/or compromise values. The system can select metrics that are most affecting the risk values of user accounts and/or network devices, and include summary information describing each metric. For instance, the system has determined that a metric associated with a number of privileged user accounts (e.g., administrative accounts) has improved by 3.2% (e.g., since a user selectable time period 1516), representing a decrease in user account risk values. Similarly, a number of user accounts that use two factor authentication has decreased by 0.6%, representing an increase in user account risk values.

For more detailed information, each metric included in the summary information 1506 can be selected, and a graphical representation of trends 1508 can be presented. The graphical representation 1508 includes a chart associated with the metric (e.g., as illustrated a number of privileged users). The chart identifies raw values associated with the metric mapped to points in time, and can therefore illustrate increases and decreases that are associated with the metric.

Additionally, the user interface 1500 includes identifications of "top investments," 1510 which as described above, are investments that are determined to cause the greatest reduction in risk values of user accounts and/or network devices. For investments presently being implemented, the user interface 1500 includes an option to "view" 1512 the progress of the implementation. In some implementations, selecting the option to view 1512 the progress can cause the user interface 1500 to be updated with detailed information regarding the investment, as illustrated in FIG. 21. For investments not presently being implemented, the user interface 1500 includes an option to "assign" 1514 the investment, and begin implementation.

Figure 16:
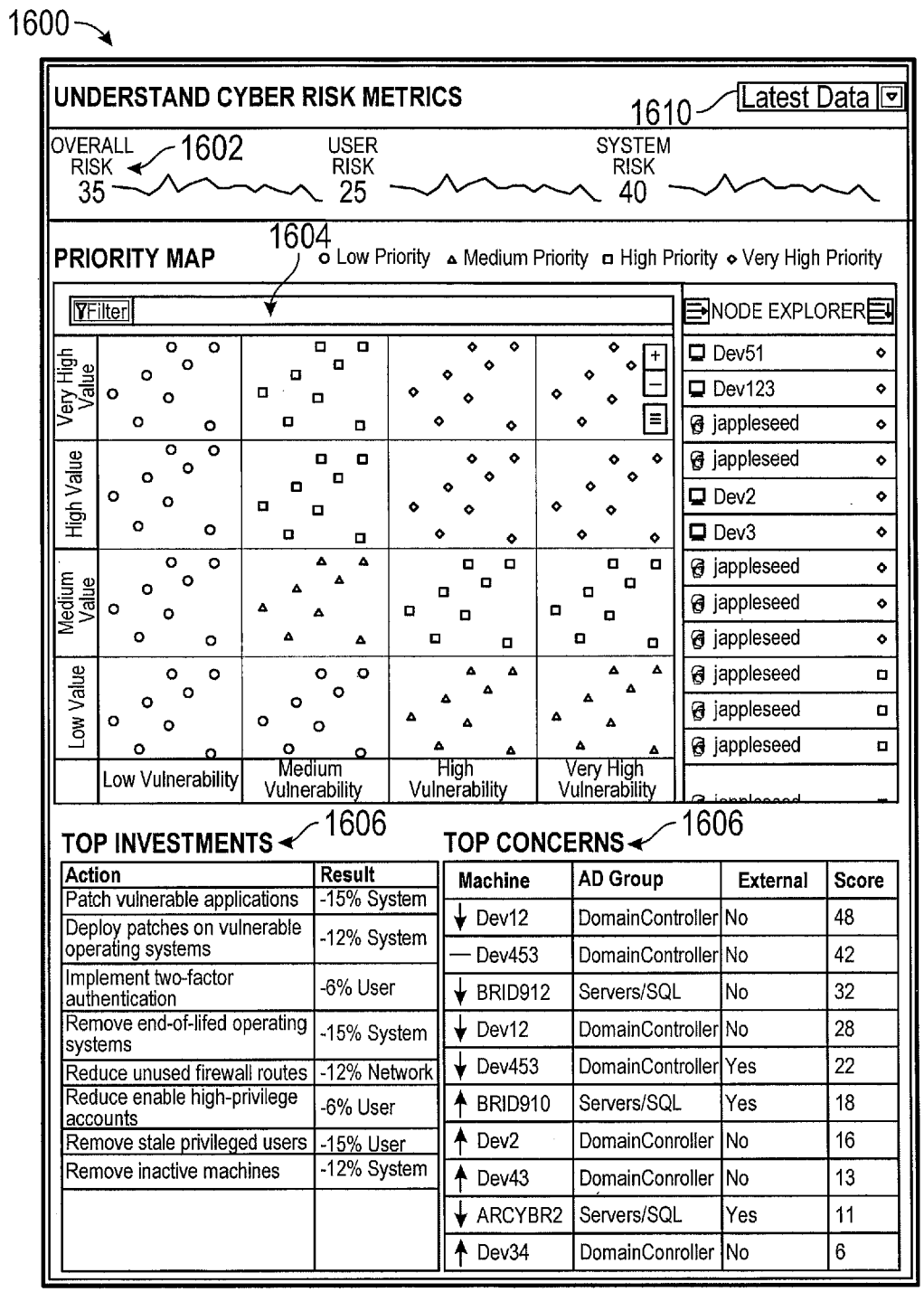
FIG. 16 is an example user interface illustrating compromise values and compromise vulnerabilities.

FIG. 16 is an example user interface 1600 illustrating compromise values and compromise vulnerabilities. As in FIG. 15, the user interface 1600 includes an overall user account risk value and network device risk value. Additionally, the user interface 1600 includes a weighted combination of each overall risk value, which is an overall risk value 1602 for the networks.

The user interface 1600 further includes a graphical representation 1604 of user account risk values and network device risk values, which can be assigned a particular color based on respective risk values (e.g., green can represent low risk values, and red can represent high risk values).

The user interface 1600 further identifies top investments 1606 that have been implemented, and the resulting decrease in user account risk value or network device risk value. Additionally, "top concerns" 1608 are included which identify user accounts and/or network devices that have the most change in associated risk values (e.g., in a user selectable period of time 1610).

Each user account and network device included in the graphical representation 1604 can be selected, and upon selection information describing the selected user account or network device can be presented.

FIG. 17 is an example user interface 1700 illustrating selection of a user account. Using the user interface 1700, the reviewing user can quickly ascertain why the selected user account is indicated in the upper right quadrant (e.g., high user account risk value).

As illustrated, a user account associated with a name of "Net Admin" was selected by the reviewing user. The user interface 1700 provides information 1702 describing metrics that are most causing the selected user account's user account compromise vulnerability and user account compromise value. For instance, the system has determined that the selected user account's compromise vulnerability is "Very High" because the user account "hasn't been used in 3 years," doesn't use two factor authentication, and has logged in greater than a threshold number of network devices (e.g., "499 machines.") Similarly, the system has determined that the selected user account's compromise value is "Very High" because the user account "can administer 7/9 domains," "is an enterprise administrator" (e.g., an administrator with high privileges), and "has admin in the name.").

Figure 18:
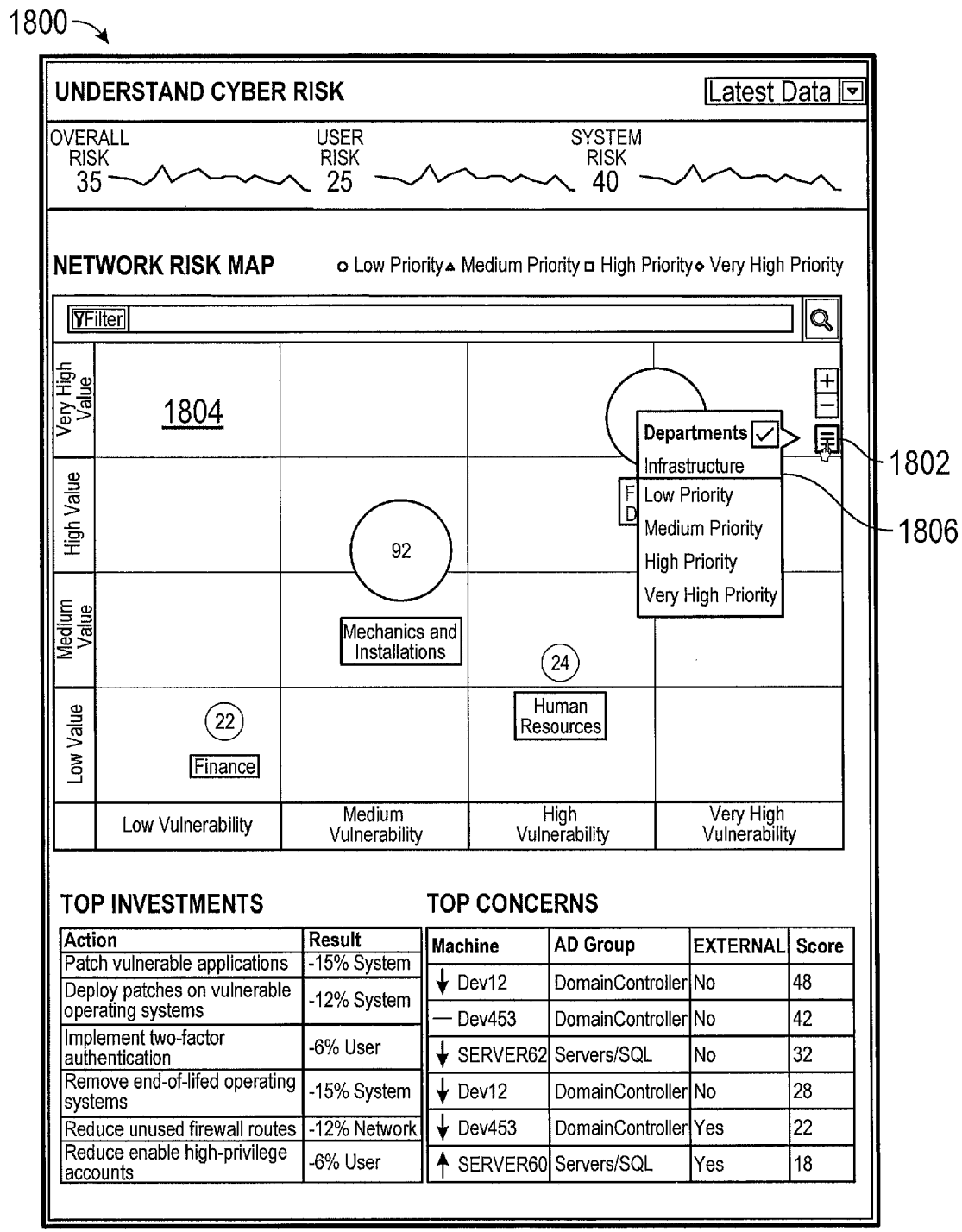
FIG. 18 is an example user interface illustrating user accounts grouped together according to employee department.

FIG. 18 is an example user interface 1800 illustrating user accounts grouped together according to employee department. Instead of merely viewing user account risk values of each user account, the reviewing user can select an option 1802 to view user accounts grouped according to department.

Upon selection of the option 1802, the system can combine user account compromise vulnerabilities and user account compromise values of each respective department, to determine overall values for the department. The overall values for each department can then be included in a graphical representation 1804. As illustrated in FIG. 18, each group is represented as a circle included in the graphical representation 1804. In some implementations, a size of the circle (e.g., a radius) can depend on a number of user accounts associated with the respective department. In some implementations, a size of the circle can depend on a variance of user account compromise values and user account compromise vulnerabilities (e.g., the radius can increase if user accounts have larger varying risk values).

Through the use of user interface 1800, the reviewing user can quickly determine which departments need to be focused on to reduce risk values. Additionally, the reviewing user can select "Infrastructure" 1806 to view network devices organized according to infrastructure.

Figure 19:
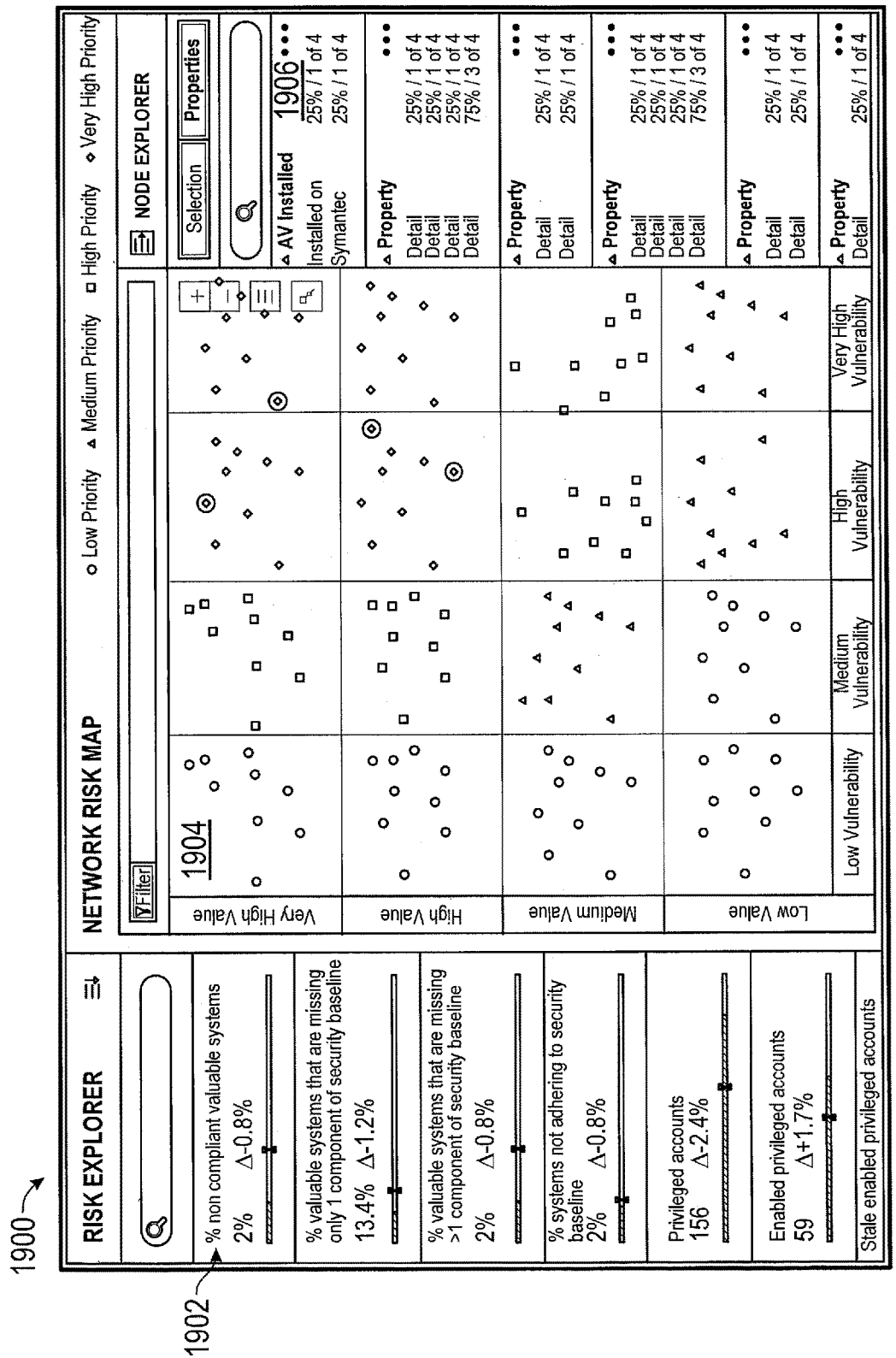
FIG. 19 is an example user interface illustrating summary information associated with one or more metrics.

FIG. 19 is an example user interface 1900 illustrating summary information associated with one or more metrics. The user interface 1900 includes indications of metrics 1902, and whether the metric has improved or gotten worse in a user selectable time period. For instance, the system has determined that the "% of non-compliant valuable systems" (e.g., systems that follow basic network security guidelines as described above) has improved by 0.8%. Additionally, the user interface 1900 includes an option to search for a particular metric. The reviewing user can provide a search query (e.g., a natural language search query), which the system can receive and parse to determine a matching metric.

Each metric can be selected, and network devices and/or user accounts affected by the metric can be identified (e.g., highlighted) in the graphical representation 1904. For instance, the reviewing user has selected "% of non-compliant valuable systems," and four network devices are identified in the graphical representation 1904.

The user interface 1900 further includes detailed information 1906 associated with the selected metric. For instance, the detailed information 1906 indicates that "25%" of the identified network devices have anti-virus software. Additional information is included below.

Figure 20:
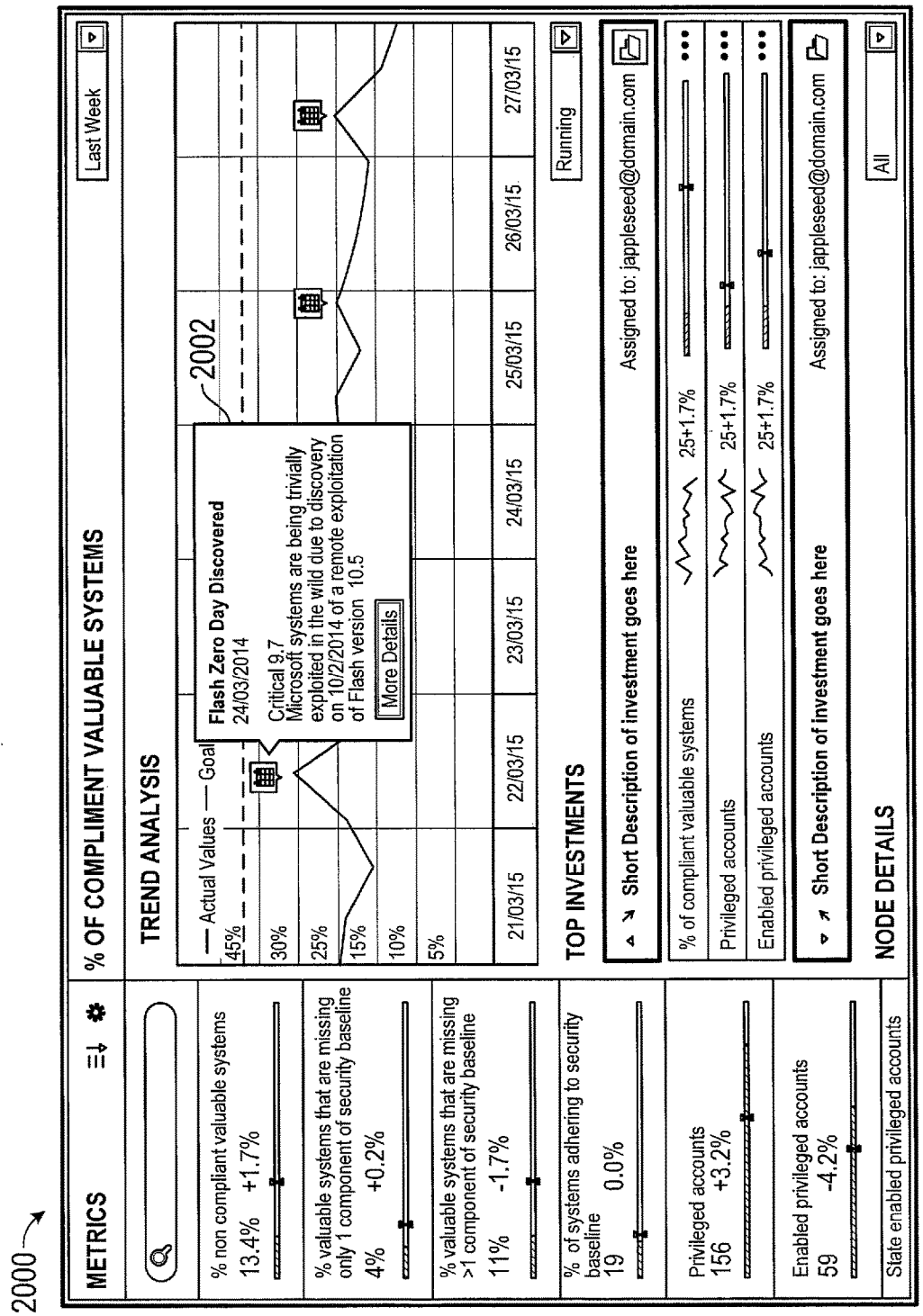
FIG. 20 is an example user interface illustrating trend information associated with a selected metric.

FIG. 20 is an example user interface 2000 illustrating trend information associated with a selected metric. The trend information 2002 includes textual descriptions of events (e.g., external events) that affected the compromise vulnerabilities of user accounts and/or network devices.

FIG. 21 is an example user interface 2100 illustrating summary information associated with presently occurring investments and a feed 2102 describing events. The user interface 2100 includes a feed 2102 of events of importance to the reviewing user, including external events 2104, particular goals of reducing metrics 2106 (e.g., included in investments), and so on.

Furthermore, the user interface illustrates investments 2108 that are presently occurring, and the investment's affect on particular metrics (e.g., "First Metric" has a reduction of 3.9%). By using user interface 2100, the reviewing user can quickly view an overview of all investments being made, and returns on the investments (e.g., reductions in metrics).

Figure 22:
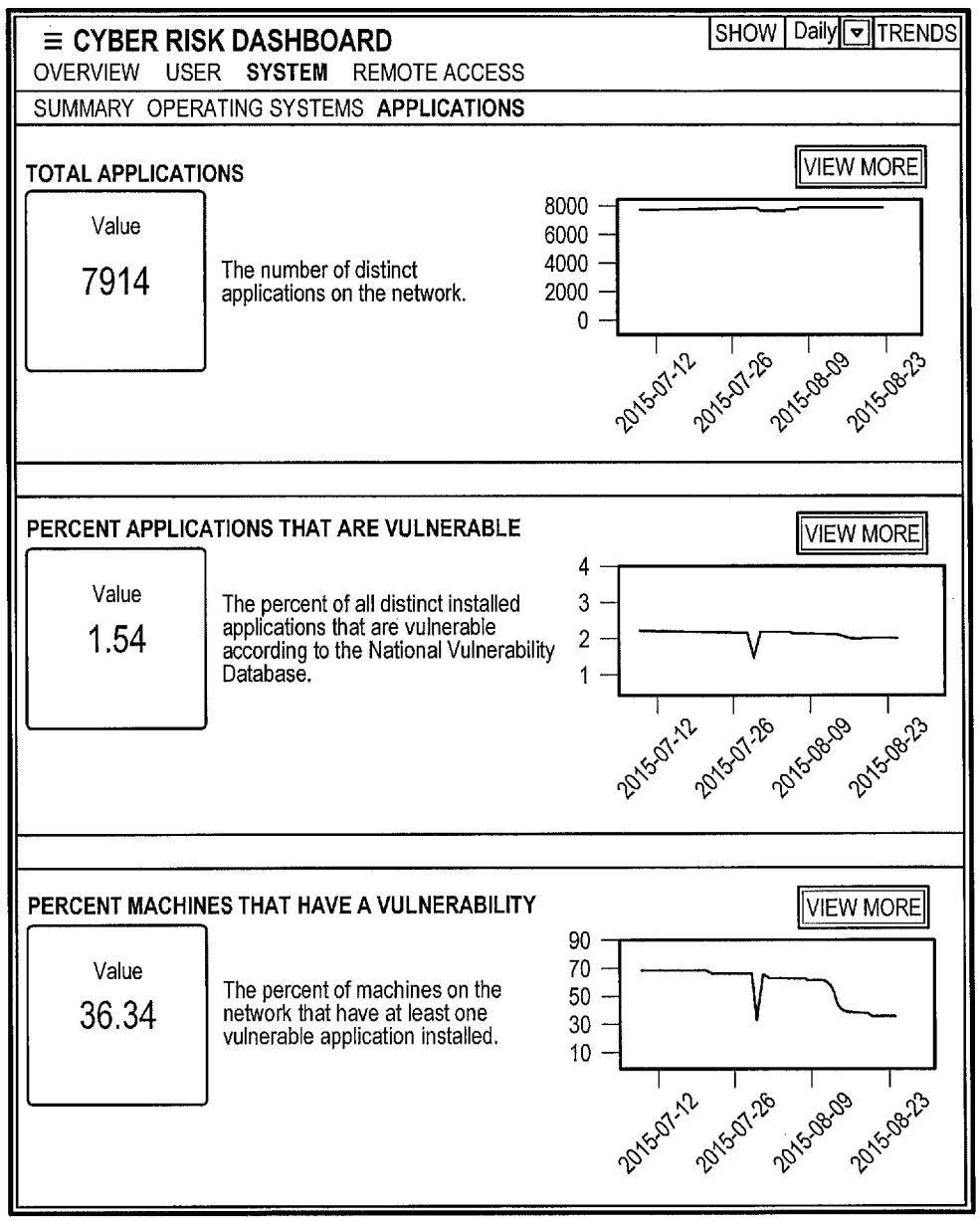
FIG. 22-24 are examples of additional user interfaces illustrating additional embodiments.
Figure 23:
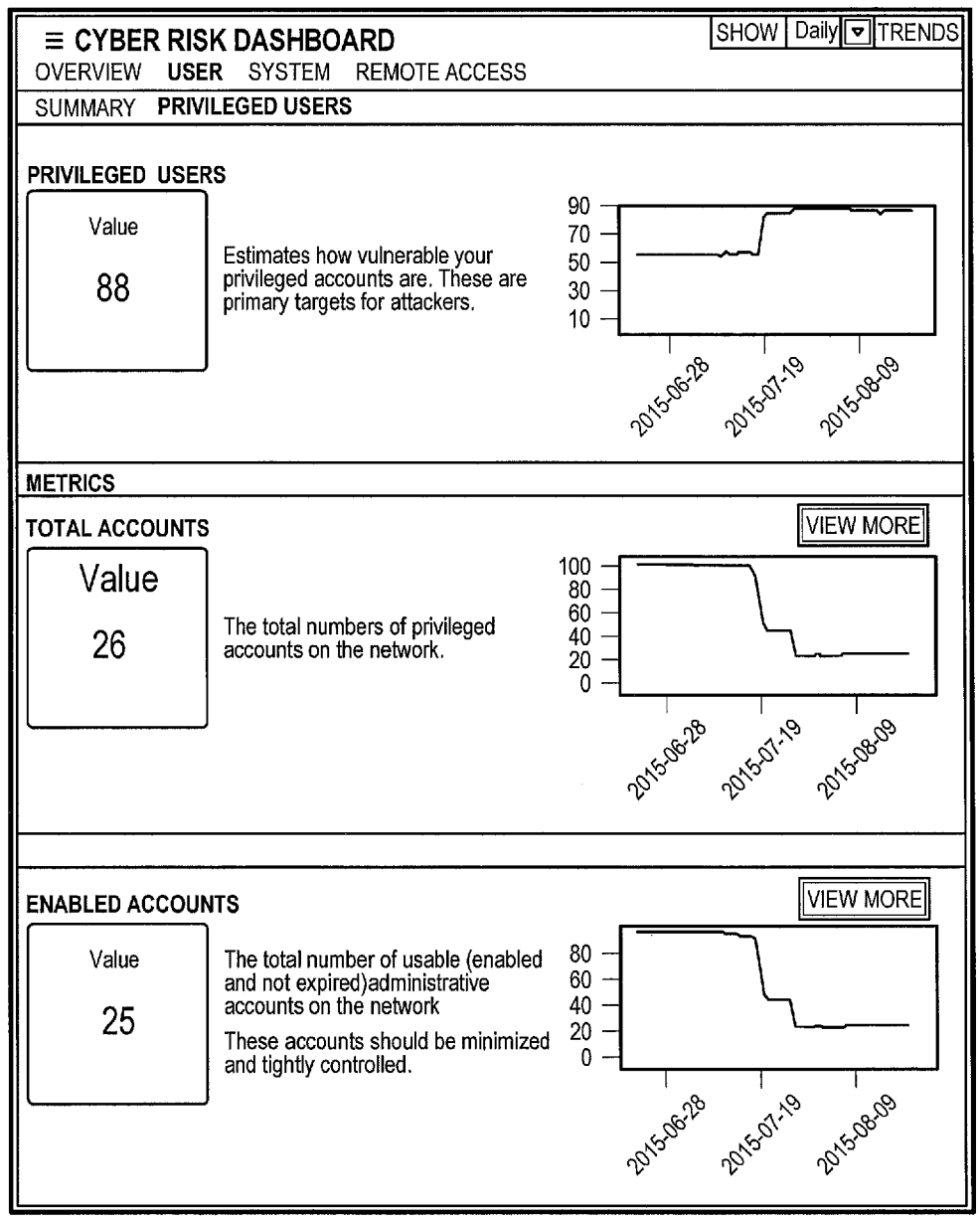
Figure 24:
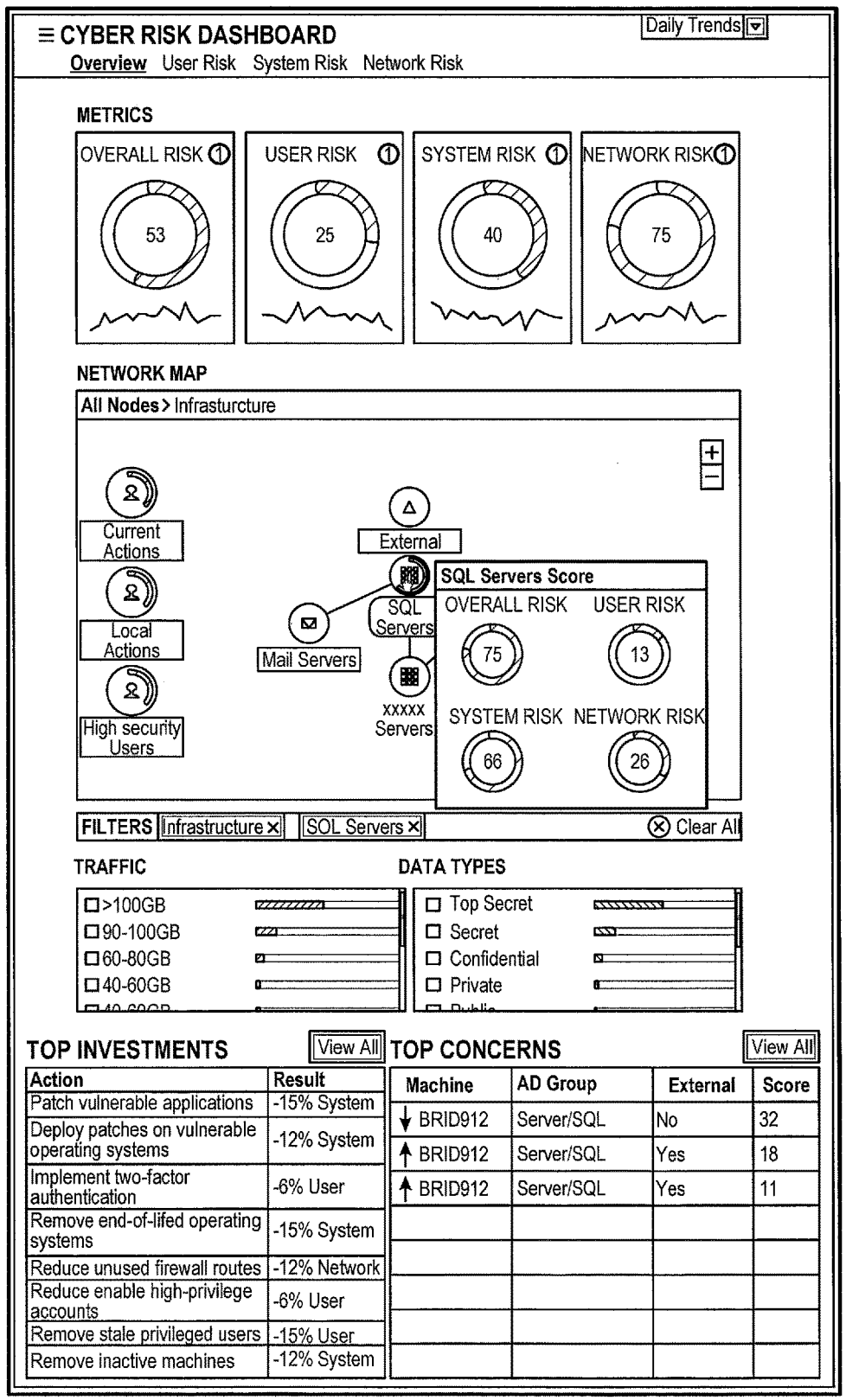

FIGS. 22-24 are additional user interfaces illustrating additional embodiments. For instance, FIGS. 22-24 illustrate metrics associated with network devices and user accounts.

FIG. 24 illustrates a total risk value for the networks, user accounts, and network devices. Additionally, FIG. 24 illustrates a network map, illustrating a network topology of the networks and associated risk values for a node in the network topology. The system can determine risk values of all network devices included in a node (e.g., a node that includes all 'SQL Servers'). In this way, the reviewing user can examine the network topology, and quickly identify which nodes are associated with a highest risk (e.g., user account risk value, network device risk value, and so on).

Manipulating Metrics

While determining risk values (e.g., compromise risk), as described above, can offer powerful insights into risk associated with a network device or user account, certain metrics (e.g., metrics measuring aspects of compromise value or compromise likelihood) may be of added, or extra, importance to particular networks. Additionally, for a particular network, certain aspects of the network may be particularly important to a company, and an existing metric (e.g., as described above), may not capture the aspects' importance to a degree sufficient to the company.

A user (e.g., a security officer) can therefore modify, or create, one or more metrics (e.g., using one or more user interfaces generated by, or that can provide information to, the risk assessment system 100), which can be applied to the user's network(s). As will be described below, the user can specify features, aspects, and so on, of a user account or network device the user is interested in, and specify how the interested features, aspects, are to be measured. In this specification, a feature, or aspect, (hereinafter both referred to as an aspect) of a user account or network device is any describable property of the user account or network device that can inform or affect a risk of the user account or network device, including a property associated with a status (e.g., whether the user account or network device is enabled on a network), network action (e.g., a logon by a user account; communication provided to, or received by, a network device; information stored or accessible by the network device; software executing on the network device, and so on), privilege information (e.g., user account privileges), label information (e.g., an employee associated with the user account is an executive, a network device is indicated as being important), and so on.

Figure 25C:
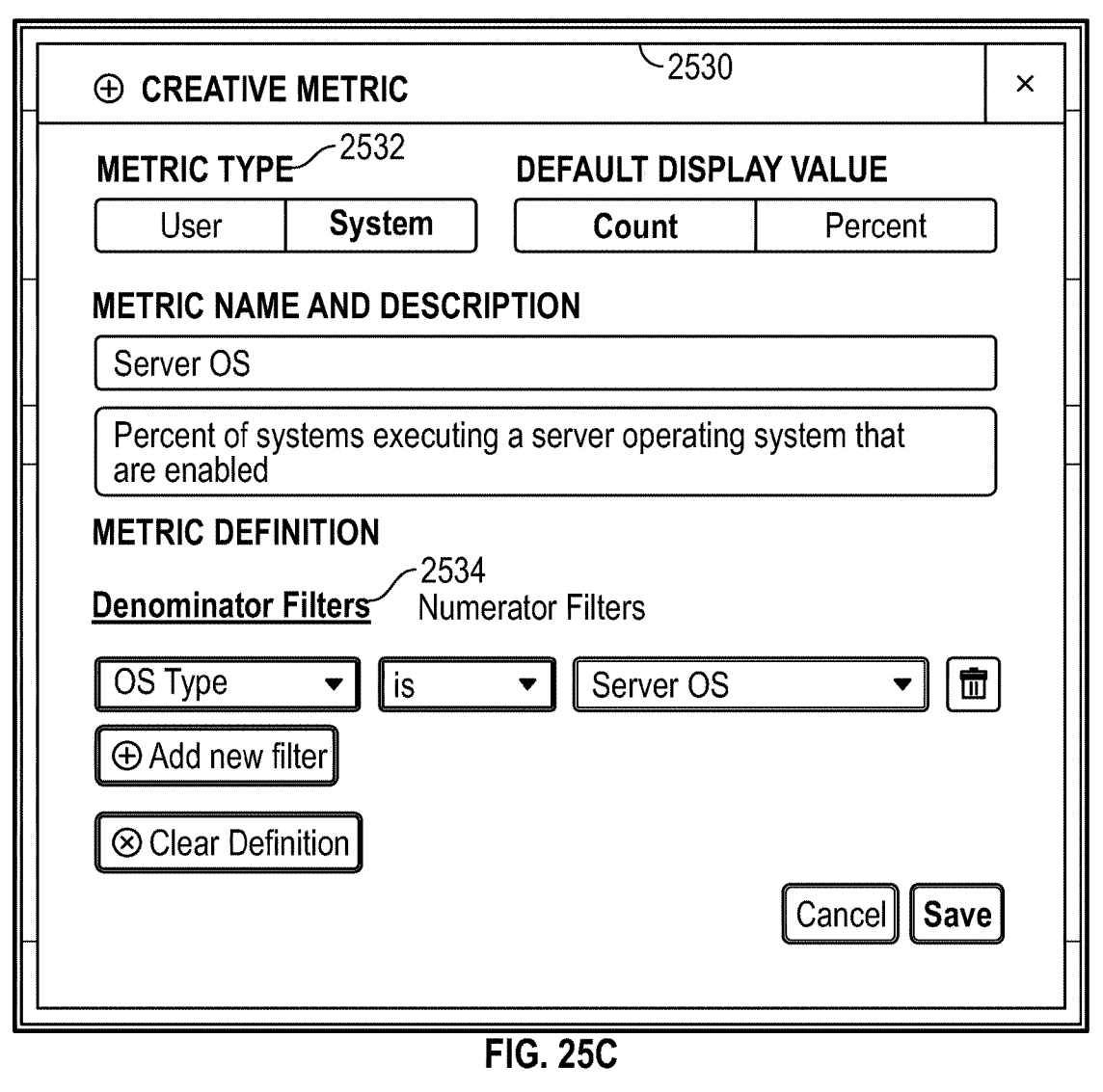

For example, and as illustrated in FIGS. 25C-25D, a user can create a metric associated with measuring numbers of network devices that are (1) enabled (e.g., active on the networks, or that have at least one communication path with one or more other network devices as indicated by a determined network topology) and (2) execute a particular operating system (e.g., particular type of operating system, particular type of a particular version, and so on). Upon creation, the metric can be applied to live data associated with the networks, for instance in the above-described example, the system can access configuration information of each network device, and optionally network topology information, and determine a value associated with the measure. In this way, network devices and/or user accounts that are affected by the metric can be identified (e.g., a network device or user account affected by a metric can represent that a value of the metric for the network device or user account is greater than zero or has a Boolean True value, similarly a network device or user account affected by a metric can represent that the network device or user account conforms to the aspects associated with the metric).

When creating a metric, the user can select from among a list of aspects associated with a user account or network device, with the list including, in some implementations, aspects that are common to most networks. For example, the list can include a name of a user account or network device, a time since a user account or network device was last accessed, particular software being executed on a network device, and so on. Additionally, the user can define particular aspects that can be specific to the user's network, and utilize these defined aspects when creating a metric, or modifying a different metric. For instance, a user associated with the Air Force can specify that a list of network devices (e.g., IP addresses of the network devices, or other identifiers of the network devices) are associated with particularly sensitive functionality or information. That is, the user can import information (e.g., information specifying the network devices), and the user can identify (e.g., label) the specified information. The user can define a feature associated with the list, for instance a feature labeled "isMissile," indicating that the network devices, for example, maintain information associated with missile locations. When creating metrics, the user can utilize the "isMissile" label, and the system can access the list of network devices when applying the created metrics. In the above described example of operating system type, the user can create a metric measuring numbers of network devices that (1) are enabled, (2) execute a particular operating system, and (3) are associated with the "isMissile" label (e.g., are identified in the list). In this way, the user can monitor these network devices, and define an easy shorthand to reference the network devices. Similarly, the user can modify the metric to measure numbers of network devices that are in communication paths with network devices that satisfy the above three (3) elements (e.g., utilizing a determined network topology as described above), and so on. Thus, the user can create metrics that are specific to the user's networks, enabling the metrics to be updated and configurable according to needs of the user.

Once a custom metric has been created, for instance the aspects that are to be utilized in determining the metric have been indicated, the user can further describe how the metric is to be incorporated in determining risk values. For example, a first created metric can be of minor importance to a user, and the user can specify a weighting associated with the metric when determining an overall value associated with a compromise value or compromise likelihood (e.g., combining values of metrics to determine an overall value associated with a compromise value or compromise likelihood, also called a compromise vulnerability, is described above with reference to FIGS. 12A-12B). In contrast, a second created metric can be of greater importance to the user, and the user can cause a compromise likelihood or compromise value to be higher based on the value of the created metric. Assigning a weighting to each metric, or modifying a weighting of a metric, is described below with respect to FIG. 26.

Figure 27:
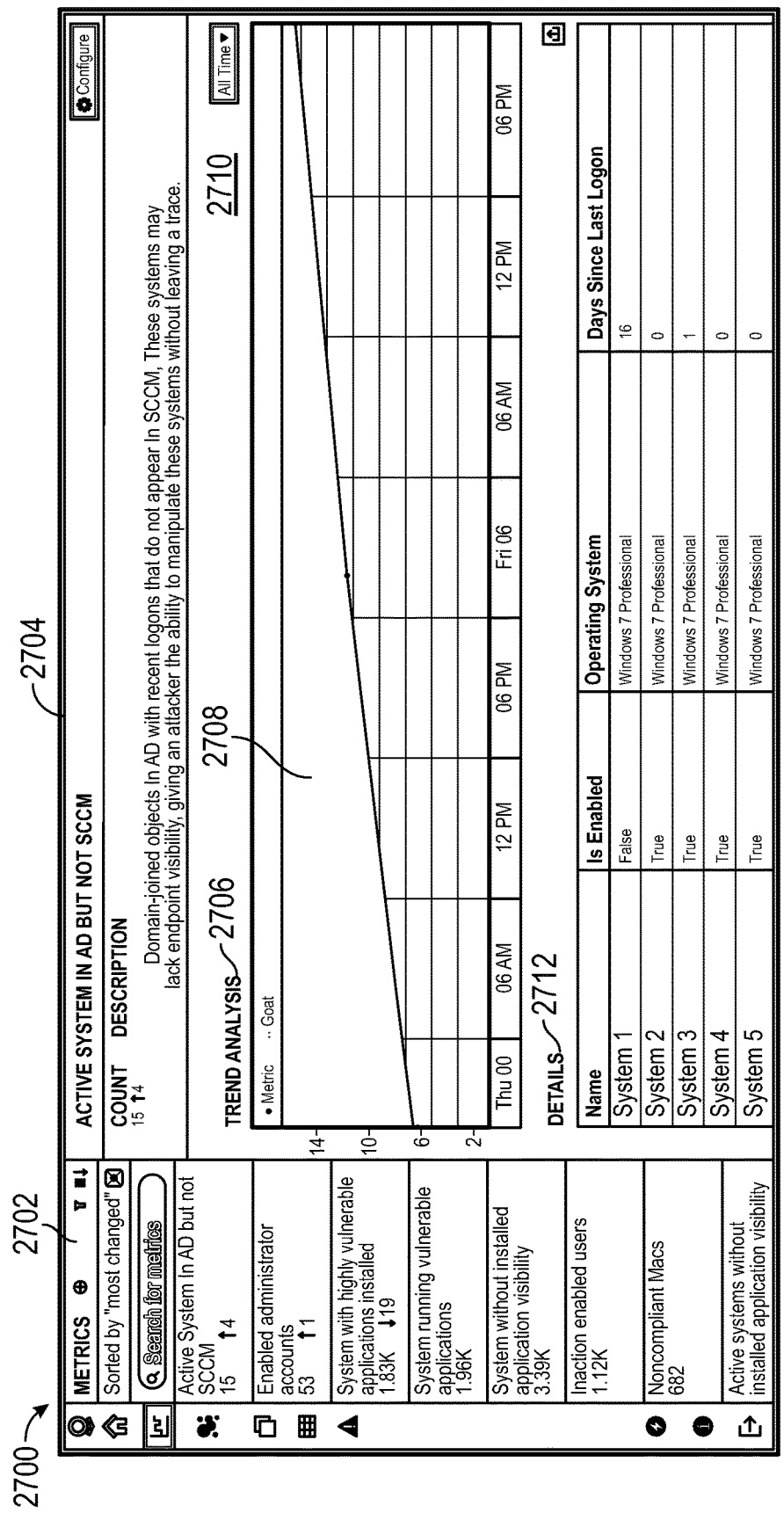
FIG. 27 illustrates an example user interface for monitoring a metric.

The custom metric can be applied to the networks, and a number, or percentage, of user accounts or network devices can be identified that are affected by the metric. For instance, in the above-described example of a metric associated with network devices that are (1) enabled and (2) executing a particular operating system, the system can apply the metric to the networks and identify a number, or percentage, of network devices that satisfy the two conditions. As will be described below, and as illustrated in FIG. 27, one or more user interface can be generated that enable a user to monitor the metric over time. That is, a number of network devices that conform to the metric (e.g., satisfy the two conditions) can be included such that a user can monitor the metric, and determine whether any progress to reduce the number of affected network devices is working (e.g., the user can create an investment as described above with respect to, at least, FIG. 14-15).

In some implementations, a metric (e.g., a custom metric) can be used to monitor particular aspects of user accounts and/or network devices, but not be incorporated in determining risk values (e.g., determining compromise value or compromise likelihood). For instance, a user can be interested in monitoring a count, or percentage, of network devices and/or user accounts that are affected by a metric, and also indicate that the metric is not to be utilized in determining risk values. In this way, the user can monitor the metric (e.g., identify a number of network devices that are (1) enabled and (2) executing a particular operating system), but not include the metric when determining risk values (e.g., the user may be capturing risk in a different way utilizing different metrics, and just be interested in the count or percentage).

FIG. 25A illustrates an example user interface 2500 for creating a metric to be applied to user accounts or network devices associated with one or more networks. As described above, a user (e.g., a security officer) can specify information associated with a new metric, such that the user can measure information relevant to the user's networks.

The user interface 2500 includes an indication of the "metric type" 2502, which as illustrated specifies whether the metric is associated with a user account or a network device. As described above, and specifically with reference to FIGS. 12A-12B, the system can determine risk values of user accounts and network devices using multitudes of metrics, with each metric being applicable to either user accounts or network devices. Therefore, when creating the new metric, the user can indicate whether the metric is measuring aspects of a user account or network device.

A user can specify a "display value" 2504 associated with the created metric. The "display value" 2504 can be modified to either display a count (e.g., a number of user accounts or network devices that satisfy the aspects indicated by the metric), or a percentage (e.g., a number of user accounts or network devices out of a total, which satisfy the aspects indicated by the metric). In this way, upon selection of the created metric, after being applied to the networks, the count or percentage can be presented (e.g., an example presentation is included as FIG. 27). A user can monitor the count or percentage over time, and can take actions to lower the count or percentage (e.g., create an investment as described above). As an example, FIG. 15 illustrates a graph 1508 that includes a count associated with a metric (e.g., summary information describing a number of privileged users). Alternatively, when creating a metric associated with privileged users, a user can indicate that the "display value" 2504 is to be a percentage, and the graph 1508 can instead illustrate a moving percentage of the number of privileged users (e.g., with respect to all users). The percentage can, as an example, be preferable if the reviewing user is interested in keeping the relative number of privileged users to below a particular threshold percentage, and is not necessarily interested in an absolute number of privileged users being below a threshold amount.

Using the user interface 2500, a user can provide a name 2506 and an associated description 2508 of the metric being created. The name and description can be included in subsequent user interfaces, for instance in FIG. 9B, metrics are indicated and described in the user interface 920 (e.g., description 924). Furthermore, the name can be utilized as a reference, for instance in some implementations the name can be included as an aspect when creating a new metric. As an example, a metric associated with a user account being (1) privileged and (2) known to access network devices that execute a particular application, can be later referenced when creating a particular metric. A user can specify that the particular metric is to include the aspects above (e.g., aspect (1) and (2)), along with an additional aspect, such as (3) a measure associated with a time at which the user account last changed a password 2514. In this way, a metric name can act as a quick shorthand when creating new metrics.

When indicating aspects (e.g., "filters" as illustrated in FIG. 25A) associated with the metric being created, the user can select "denominator filters" 2510 (e.g., filters that describe aspects of a pool of user accounts or network devices) and "numerator filters" 2512 (e.g., filters that describe aspects of a set of user accounts or network devices included in the pool). As illustrated, "denominator filters" 2510 for a metric type 2502 "user account," include aspects of user accounts such as whether the user account is enabled, is an administrator, when the user account last accessed the networks, and so on. In some implementations, indicating both "numerator filters" 2512 and "denominator filters" 2510 is associated with a "display value" 2504 being a percentage, and indicating solely "numerator filters" 2512 is associated with a count. Optionally, the user interface 2500 can grey out, or otherwise make inaccessible, the "denominator filters" 2510 option when the "display value" 2504 count is selected.

Each selected "denominator filter" 2510 or "numerator filter" 2512 is associated with a type of value 2516. For example, a type of value associated with a user account being enabled, (e.g., "is Enabled" as illustrated) is a Boolean response of True or False. For other types of filters, for example "Password Last Set" 2514, a type of value 2516 can be numerical (e.g., a number of days elapsed since a password re-setting), a calendar date (e.g., whether the password has been set since a particular date, such as a date after which user account information may have been compromised, for instance as described in FIG. 13 due to an external event), and so on.

Each of the filters (e.g., filters included in the denominator filters 2510 or filters included in the numerator filters 2512) can be applied together in a Boolean operation when the metric is utilized (e.g., applied to information associated with a user account or network device, such as configuration information, user profile information, user account access information, network topology information, and so on). That is, the created metric can have an associated value and effect on a risk value of a user account or network device, if each of the filters are satisfied. As an example of the created metric being applied to a particular user account, if "Is Enabled" is True, "Is AD Admin" (e.g., Active Directory Administrator) is True, and a "Last Logon" 2515 of the particular user account is "within the last 30 days" 2518, then the created metric can have an effect on a risk of the particular user account.

Once the metric being created is described using user interface 2500, the user can save 2519 the metric for use in determining a compromise value or compromise likelihood of a user account or network device (e.g., indicated by the metric type 2502, which in the example of FIG. 25A is a user account).

Additionally, as will be described, the user can specify how the created metric is to be utilized when determining a compromise value, or compromise likelihood, of a user account or network device. For instance, an effect of the created metric can be increased (e.g., an effect the metric has on a compromise value or compromise likelihood) depending on a distance from values of one or more of the filters. For example, a particular filter may be associated with a time a password of a user account was last set, and a value may be indicated as being longer than the last 30 days. A value of the metric for individual user accounts can be increased depending on a length of time, beyond 30 days, since the user accounts last had a password change (e.g., a user account with a password change 120 days earlier can have a higher value of the metric, such as a proportionally higher value or non-linear higher value, than a user account with a password change 31 days earlier).

FIG. 25B illustrates an example user interface 2520 for creating a metric associated with a network device. As described above, a user of the user interface (e.g., user interface 2500 or 2520) can indicate whether a metric being created is associated with a user account or a network device (e.g., specified by selecting a metric type 2502). In the example user interface 2520, the user has selected "system" 2522 (e.g., a network device).

In response to the selection of "system" 2522, the user interface 2520 presents filters 2524 (e.g., aspects) that are associated with a network device. For instance, the user can select aspects that are specific to a network device, such as "Has Application Data," and the user can specify information describing particular application data as a value. For instance, upon selection of "Has Application Data," the user interface 2520 can update with selectable options associated with types of application data (e.g., data associated with particular applications). In contrast, the filters 2510 presented in FIG. 25A are associated with a user account being selected (e.g., the metric type 2502 is set as "user" in FIG. 25A).

FIG. 25C-25D illustrate an example of creating a metric. As illustrated, a user has selected a metric type 2532 associated with a network device (e.g., the user has selected "system"). To describe the metric, the user has provided textual data identifying a name of the metric (e.g., "Server OS"), and a description (e.g., "Percentage of systems executing a server operating system that are enabled").

In accordance with the name and description, the user has indicated aspects associated with a group of network devices related to the metric. That is, the user has specified that "Denominator Filters" 2534 (e.g., as described above) are to include an operating system type with values of "Is" and "Server OS." In this way, the user can limit the total pool of network devices to the specific group of network devices to which the metric relates (e.g., the user has limited the network devices to network devices that execute a server operating system). FIG. 25D illustrates the user interface 2530 upon selection of "Numerator Filters" 2534. As described above, the metric is being created as a measure associated with network devices that are enabled and are executing a server operating system. Therefore, the user has indicated that "Numerator Filters" 2534 specify that network devices are (1) to be enabled and (2) execute a server operating system.

As described above, with reference to FIGS. 12A-12B, a network device executing a server operating system can be associated with an increased compromise value. The metric being created further indicates that the network devices are to be enabled, which in some implementations can be associated with the network devices being able to presently access the networks, which can further increase a compromise value. As will be described in FIG. 26, the user can specify a weighting associated with the created metric when the system determines compromise values of network devices. Upon applying the created metric, a user can additionally view summary information describing a percentage of network devices that satisfy the "Numerator Filters" 2534 (e.g., are enabled, and execute a server operating system), and can monitor the percentage over time (e.g. an example user interface for monitoring a metric is illustrated in FIG. 27).

Figure 26:
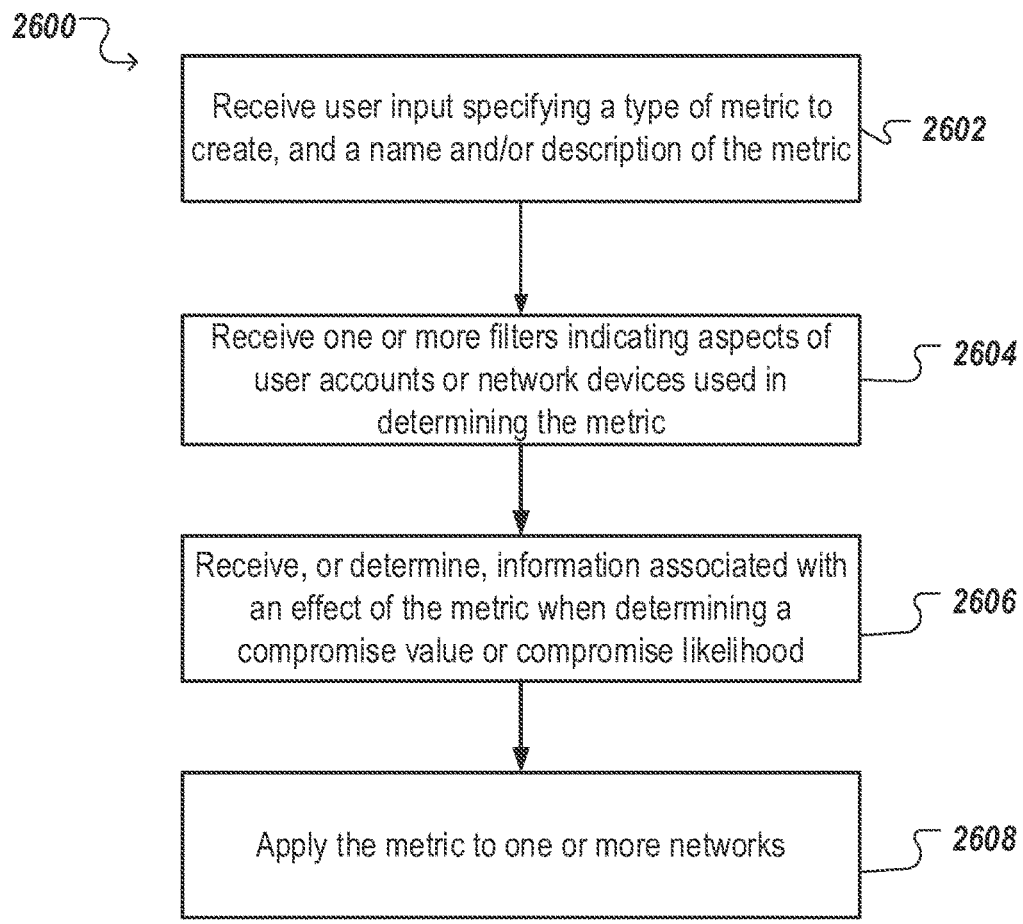
FIG. 26 illustrates an example process for creating a metric measuring aspects of a compromise value or compromise likelihood, and applying the created metric.

FIG. 26 illustrates an example process 2600 for creating a metric measuring aspects of a compromise value or compromise likelihood, and applying the created metric. For convenience, the process 2600 will be described as being performed by a system of one or more computers (e.g., the risk assessment system 100).

The system receives user input specifying a type of metric and identification information (block 2602). As described above, and as illustrated in FIGS. 25A-25D, the system can present a user interface for presentation that enables a user to create (e.g., describe information sufficient to create) a metric. As described above (e.g., FIGS. 12A-12B, and so on), metrics can be associated with user accounts, network devices, and optionally both user accounts and network devices in particular implementations. The user can create a metric (e.g., a custom metric), and specify a type of the metric by interacting with the user interface to select whether the metric is associated with a user account or network device. Furthermore, the user can include a name (e.g., a succinct name explaining the metric, which can be used as a reference when creating other metrics as described in FIG. 25A), and textual information describing the metric.

The system receives selections of one or more filters indicating aspects of user accounts or network devices to be used in determining the metric (block 2604). As illustrated in FIGS. 25A-D, the user can specify filters associated with the metric, with each filter indicating an aspect associated with a user account or network device, and indicating a value that satisfies the filter. When the system applies the created metric, the system can access information associated with user accounts or network devices (e.g., configuration information, information describing a network topology, user account information such as user account access information, profile information, and so on), and determine whether values associated with the selected filters are satisfied (e.g., the values comport with aspects of a network device or user account). That is, the system can determine, for instance for a particular user account, whether a value associated with a selected filter is satisfied (e.g., a value can be 'less than 30 days', a selected filter can indicate a time of a last logon of a user account, and the value can be satisfied if information associated with the particular user account indicates that a last logon of the particular user account was less than 30 days prior).

The system receives, or determines, information associated with an effect of the metric when determining a compromise value or compromise likelihood (block 2606). As illustrated in FIG. 9A, compromise values and compromise likelihoods can be determined for user accounts and/or network devices. Since, as described above, each compromise value and compromise likelihood is determined from a multitude of metrics, one or more of the metrics can be associated with a respective effect when determining the compromise value or compromise likelihood.

An effect of a metric, in this specification, includes any information, such as a weighting, that is applied to a value associated with the metric when determining a compromise value or compromise likelihood of a user account or network device. A user, after creating a metric, can indicate whether the metric is to be applied to determining a compromise value or compromise likelihood, and can further indicate a method of computing an effect of the metric.

For example, the user can specify a weighting of the metric (e.g., a constant value associated with the metric), to be utilized when determining a compromise value or compromise likelihood. The weighting can be applied, along with other weightings of other metrics, to determine an overall value of a compromise value or compromise likelihood (e.g., each weighting can be applied to a respective value of a metric, and then summed). As described above, particular metrics can be Boolean in nature (e.g., whether a user account is an administrator), while other metrics can be associated with numerical values (e.g., a time since a password of a user account was last changed). When indicating a method of computing an effect of the metric, the user can specify whether, in the case of a metric being associated with numerical values, an effect of the metric is to increase based on an increase associated with a numerical value.

For example, a metric can have an effect (e.g., on a compromise likelihood) upon determining that a password of a user account was last changed greater than a threshold amount of time prior (e.g., 30 days prior). In determining a compromise likelihood of a particular user account, the system can determine a value associated with the example metric, which can be based on a distance of a measured aspect of the particular user account (e.g., a time associated with a most recent password change) from the threshold amount of time. For instance, if the particular user account changed his/her password 60 days prior, the value of the example metric can be proportional to the difference from the threshold (e.g., 30 days prior). In this way, the system can increase a compromise likelihood of the particular user account, since the particular user account will have had proportionally more time for his/her password to be compromised (e.g., skimmed). Optionally, the value can be modified differently than proportionally, and can include any arbitrary function (e.g., a square root of the value, logarithm of the value, and so on, such as a square root of 60 days minus the threshold of 30 days).

In this way, a user can specify methods of each metric being determined, and subsequently utilized to determine a compromise likelihood or compromise value of a user account or network device. Different networks may call for different methods, for instance a user of a first network may be more interested in weighting network devices based on a number of vulnerable applications they run (e.g., exploitable applications, for instance as indicated by the common vulnerability scoring system (CVSS)), than weighting network devices based on a maximum severity score of any one application they run (e.g., a maximum score of any of the exploitable applications as indicated by CVSS). Therefore, a user (e.g., a security officer) can fine-tune methods associated with determining compromise values and/or compromise likelihoods based on needs associated with the user's networks.

FIG. 27 illustrates an example user interface 2700 for monitoring a metric. As described above, metrics can be created and monitored to determine whether any investments (e.g., as described above) to reduce an effect associated with the metric are working (e.g., reducing a number of network devices or user accounts affected by the metric). User interface 2700 includes indications of metrics 2702 being applied to one or more networks, along with summary information associated with each metric. For instance, as illustrated the summary information includes a total number of network devices or user accounts that are affected by the metric (e.g., network devices or user accounts associated with aspects that satisfy the metric), and for one or more of the metrics, a change in the number since a prior time period (e.g., a user selectable time period, such as a day, a week, a month, and so on). For example, user interface 2700 indicates that a metric measuring "Enable administrator accounts," is associated with "53" user accounts (e.g., 53 administrator accounts) and the number of user accounts has been reduced by "1" since the prior time period. The indication of metrics can be organized, for instance as illustrated organized according to metrics that have been most changed (e.g., a largest percentage reduction or increase). The order can further be user-selectable, and can be based on investment information associated with the metrics (e.g., investments associated with a longest amount of time, or associated with a highest cost to complete, can be ordered near the top of the user interface 2700).

User interface 2700 illustrates information associated with a particular metric (e.g., a metric selected by a user of the user interface 2700), "Active Systems in AD But Not SCCM" 2704. That is, the particular metric 2704 is associated with network devices that are (1) Active (e.g., enabled as described above), (2) in Active Directory, and (3) Not in System Center Configuration Manager. A number of network devices that are affected by the metric are indicated (e.g., "15"), along with an indication of an increase in the number (e.g., "4"). In some implementations, the user can specify a number, or percentage, of network devices affected by the particular metric 2704 that is acceptable. The system (e.g., the risk assessment system 100) can then identify whether the presented number in the user interface 2700 is acceptable, and optionally whether the number is good, mediocre, poor, and so on. For instance, the system can provide descriptive text (e.g., adjacent to the number), or the number can be presented in a particular color depending on its value (e.g., an acceptable number can be green, a mediocre number can be yellow or orange, and a poor number can be red), or a particular pattern (e.g., cross-hatched, dotted, lined, shaded, and so on).

A graphical illustration 2708 of the number of network devices affected by the metric is included, which can be plotted against user selectable time periods 2710. For instance, a user selectable time period can include a working week, a particular day, a month, a calendar year, a time since an investment associated with reducing an effect of the metric was instituted, and so on. The user interface 2700 further includes indications of network devices 2712 that are affected by the metric (e.g., Systems 1-5). In some implementations, each indication of a network device 2712 can be selectable, and upon selection, the user interface 2700 can be updated to specify information associated with the selected network device. For instance, the information can include configuration information of the selected network device, user account access information (e.g., user accounts that have accessed the network device, which can be similarly selectable, logons to the network device, and so on), network topology information (e.g., network systems in communication paths, or that have actually communicated with, the selected network device), and so on.

Network Risk Map

As described above, and illustrated in, at least, FIGS. 18-19, the system (e.g., risk assessment system 100) can determine risk values for user accounts and/or network devices associated with one or more networks. Each risk value is a combination of a compromise value (e.g., also called an importance herein), which is determined from one or more metrics measuring aspects of the compromise value, and a compromise likelihood, which is determined from one or more metrics measuring aspects of the compromise likelihood. The system can generate, or cause generation of, one or more user interfaces describing risk values of user accounts and/or network devices, which in this specification is described as a network risk map. An example network risk map is described below, and illustrated in FIG. 28A.

The network risk map can be utilized to view an overview of risk associated with the networks, and can further be used to quickly navigate amongst specific metrics to gain insights into particulars of risk associated with the networks. For instance, a user can determine that a particular metric is affecting the networks (e.g., increasing risk values), and view a user interface describing the metric over a time period (e.g., as described in FIG. 27).

The user can further refine and filter information included in the network risk map, for example by constraining particular network devices that are included in the network risk map according to particular configuration information. For instance, the user can request that only network devices executing a particular operating system, or particular software, or that store particular types of data, or that are connected with (e.g., determined from a network topology of the networks) network devices that satisfy one or more constraints, and so on, are to be included. As an example, the moment an exploit becomes known (e.g., a zero-day), a user can view the network risk map and filter, refine, the network risk map to present only network devices that are affected by the exploit. The user can then quickly focus on network devices with associated compromise values greater than a threshold.

Information associated with network risk maps can be shared with other users associated with other networks, such that a particular network risk map can be applied to other networks. As will be described, information associated with a network risk map can include filters and refinements applied to network devices and user accounts, particular metrics utilized in determining risk values of networks devices and user accounts, particular weights applied to values of metrics in determining compromise value and compromise likelihood, and so on. In this way, a user can receive information associated with a network risk map, apply the network risk map to the user's networks, and view risk values of the user's own network devices and/or user accounts according to the network risk map. In the above example of an exploit becoming known, the received network risk map can focus the user's attention on network devices and/or user accounts that are to be watched for compromise. Thus, network risk maps can be shared, reducing an effectiveness of an exploit being utilized by attackers as users (e.g., security officers) can rapidly gain knowledge of which network devices and/or user accounts are to be watched, locked down, modified, and so on. In some implementations, the system (e.g., risk assessment system 100) can determine similarities between networks (e.g., networks controlled, maintained, by different companies), and can automatically share network risk maps to users of particular networks that have been utilized by users of one or more other networks. For example, if a particular network was compromised and a user associated with the particular network (e.g., a security officer) utilized a particular network risk map (e.g., particular filters, weights of metrics, and so on) to determine a method of attack or network devices or user accounts utilized in the attack, the particular network risk map can be shared with users of other networks that are similar to the particular network. Since an attack on multiple networks may follow a same pattern, or utilize a same method of attack, the users receiving the shared network risk map can more effectively block a similar attack.

Figure 28A:
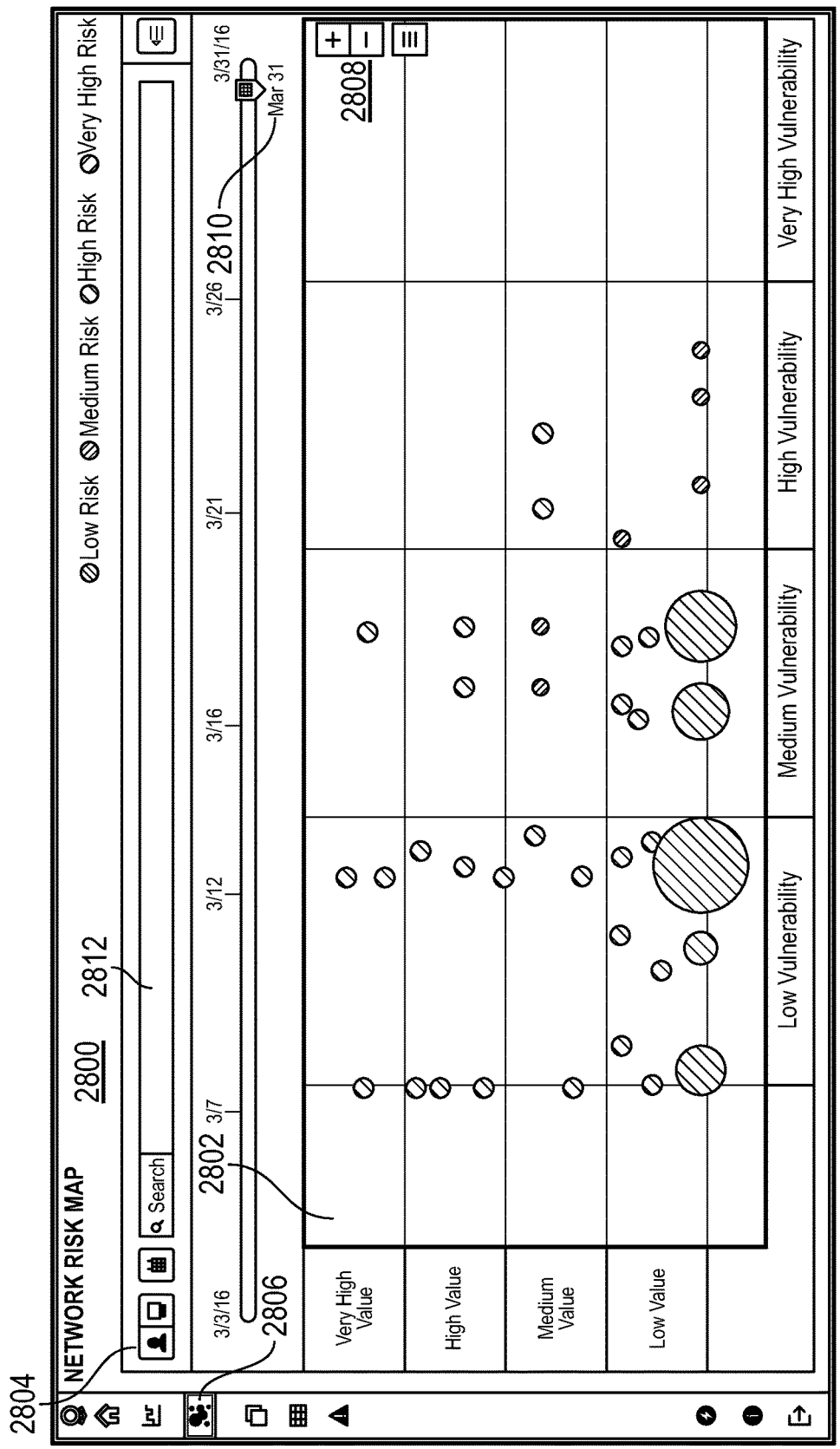
FIG. 28A illustrates an example user interface for presenting a network risk map.

FIG. 28A illustrates an example user interface 2800 for presenting a network risk map 2802. As described above, the network risk map 2802 specifies risk values associated with network devices or user accounts (e.g., a user of the user interface 2800 can select between network devices or user accounts utilizing user interface elements 2804). User interface 2800 includes risk values associated with user accounts (e.g., user interface element 2804 associated with user accounts has been selected), which are grouped according to one or more distance functions. For instance, user accounts with similar risk (e.g., similar locations in the network risk map, determined from a combination of compromise likelihood and compromise value) can be grouped together, with a size of a circle, or optionally arbitrary polygonal shape, sized according to a number of user accounts that have been grouped together. The system can determine a measure of central tendency of risk values for the user accounts grouped together, and position the circle at the measure of central tendency of risk value, with a radius of the circle determined, as described above, according to a number of user accounts. Alternatively, the circle can be sized according to a variance of risk values of the grouped user accounts (e.g., a variance from the measure of central tendency). The system can further group user accounts according an employee role of the user accounts, a location from which the user account works, and other arbitrary groupings a user of the user interface 2800 can define. Measures of central tendency of risk values of user accounts in each grouping can then be determined, which is described above with respect to FIG. 18.

The network risk map 2802 specifies risk values of user accounts as a combination of compromise value and compromise likelihood (e.g., as described above), allowing a user of the user interface 2800 to quickly ascertain overall risk of a network. The user interface 2800 can be presented, for instance, upon a user viewing user interface 2700, and interacting with user interface element 2806. That is, the user can view specifics of metrics, and also view an overall network risk map 2802 in which the specific metrics are utilized to determine risk.

The user interface 2800 includes a zoom control 2808, which a user can interact with to zoom in and out of the network risk map 2802. For instance, the user can zoom in on a portion of the network risk map 2802, which can cause the user accounts grouped in circles to separate as the distance between risk values increases. In this way, the user can view detailed information that would otherwise be unavailable (e.g., hidden in the network risk map 2802). Similarly, in some implementations the user can pinch-to-zoom on a portion of the network risk map 2802 using a touch sensitive screen of a user device. Each grouping of user accounts and/or network device can be colored, or patterned, according to risk values. For instance, colors can include green, orange, yellow, red, and so on. Additionally, a pattern can include lines, cross-hatches, dots, shadings, and so on.

A time slider 2810, or other user interface element to modify a time period, is included in the user interface 2800 that specifies a time period from which risk values are determined. For instance, as illustrated in user interface 2800, the time slider 2810 is positioned on "March 31," indicating that risk values have been determined (e.g., by the system) using information from "March 31." That is, the time slider 2810 provides a snapshot of determined risk values from "March 31". The time slider 2810 can be moved, showing the network risk map at different time periods and providing an easy to understand window into risk as a function of time. As described above, as time is changed (e.g., due to movement of the time slider 2810), an animation can be presented illustrating changes in risk values of one or more user accounts and/or network devices. For instance, a line connecting a user account's position in the network risk map at a starting date and an ending date can be presented. In this way, the user can track particular user accounts and/or network devices (e.g., user accounts and/or network devices that have the greatest change in risk value) across different time periods.

The network risk map 2802 can be filtered, refined, according to a search user interface element 2812. The system can filter the network risk map 2802 to include only user accounts, or network devices, that conform to the input filter(s) and refinements. A user can filter the presented user accounts, or network devices, according to describable properties of the user accounts, such as name (e.g., portion of name), identifier, employee role associated with user accounts, employee department (e.g., system administrators, legal team, officers), and so on. Similarly, the user can filter the presented user accounts, or network devices, according to other aspects utilized in determining risk values (e.g., aspects associated with metrics as described above). For instance, the user can utilize the search 2812 to filter user accounts according to a password complexity, a most recent logon time, a time from which a password was changed, group membership information, network devices accessed, and so on. In some implementations the user can provide natural language search queries, which the system can receive and parse to determine filters to be applied to the network risk map 2802. For example, a user can specify that the user is to view user accounts that have logged on in the past 5 days, have particular group memberships, and have accessed a particular web page in the past 5 days. The system can determine aspects indicated in the natural language search query, and apply the aspects to the network risk map 2802. For example, the user can filter a network risk map according to network devices accessed by a particular user account, or user accounts transition to from the particular user account, to determine an effect that a compromise of the particular user account would have on the network. The user can further manipulate the time slider to specify one or more times at which the filters are to be applied, or can incorporate an indication of a time, or time period (e.g., within a prior working week), into a search query.

Similar to the above, the search user interface 2812 can further receive information associated with specific metrics being utilized to determine risk values, and refine the network risk map 2802 based on the information. For instance, the user can specify that only user accounts, or network devices, that are affected by particular metrics are to be included in the network risk map 2802. Similarly, the user can specify values thresholds associated with metrics (e.g., as described above with respect to FIGS. 12A-12B, metrics can be associated with numerical values and determined for each user account or network device), and only user accounts or network devices associated with the value thresholds can be presented. In this way, the user can specify a threshold value of a metric associated with measuring a number of exploitable applications on each network device, and network devices with a value of the metric (e.g., a number of exploitable applications) greater than the threshold can be included in the network risk map 2802. In some implementations, a weight applied to particular metrics can be modified using the search user interface 2812. For instance, the user can specify that a weight associated with a metric measuring a maximum severity score of any application (e.g., highest common vulnerability scoring system score) executing on a network device is to be increased (e.g., increased from 5 to 15). The system can then determine risk values utilizing the updated weight, and present the modified risk values in the network risk map 2802. In some implementations, the modified weight can be applied permanently (e.g., until a subsequent change), or until the user navigates away from the user interface 2800 or selects a user interface element to clear the modified weight.

Figure 28B:
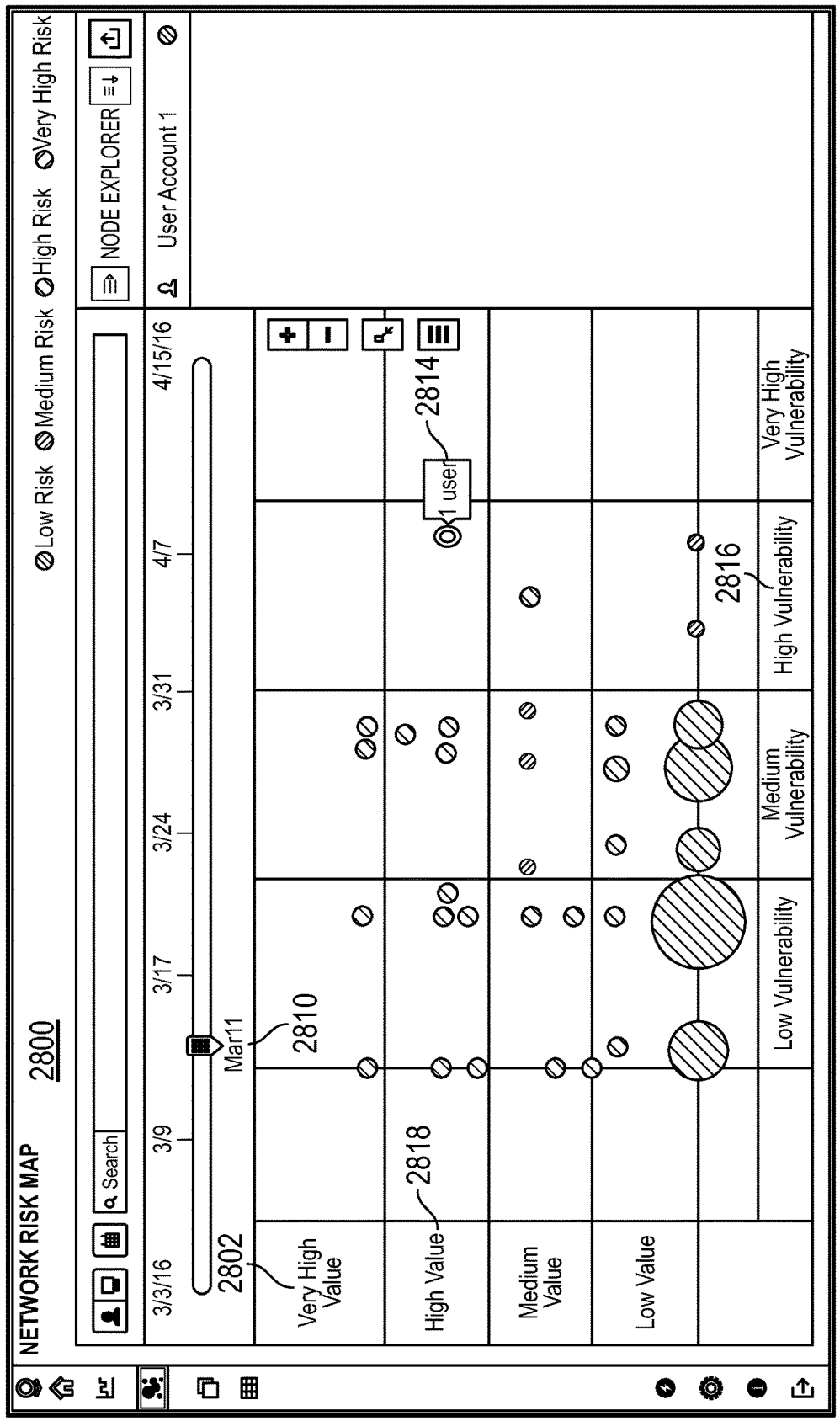
FIG. 28B illustrates a second example user interface for presenting a network risk map.

FIG. 28B illustrates a second example user interface 2800 for presenting a network risk map 2802. As illustrated, a user of the user interface 2800 has interacted with the time slider 2810 to specify that risk values are to be determined from March 11$^{th}$. The system therefore has accessed maintained information specifying risk values, or determined risk values, that are associated with March 11$^{th}$.

A particular user account 2814 is presented in the user interface 2800 that is associated with a high compromise value and a high compromise likelihood (e.g., "User Account 1"). In the user interface 2800 described in FIG. 28A (e.g., associated with March 31), the particular user account 2814 was not indicated as having a high compromise value and a high compromise likelihood—indeed no user account was. Through interactions with the time slider 2810 (e.g., or other specification of a time change), a user of the user of the network risk map can determine changes in risk, and for instance, can determine that a change made after March 11$^{th}$ that is associated with the particular user account 2814 has worked to lower a risk value of the user account 2814. For example, as will be described in FIG. 28C, particular metrics that caused a high compromise value and compromise likelihood are displayed, enabling the user to determine remedial actions to take to lower the risk value of the particular user account 2814 (e.g., create an investment).

In some implementations the network risk map 2802 can be rotated about an axis, and modified to present information specific to a selected user account (e.g., particular user account 2814). For instance, a user device presenting the network risk map 2802 can have one or more sensors (e.g., accelerometers) that can determine a rotation about an axis (e.g., a user can rotate the user device left or right, such as a rotation about the yaw-axis, y-axis, and so on). Upon rotation, the user interface 2800 can update to include risk values of the particular user account 2814 over time. For instance, a graph can be included that plots risk value of the particular user account as a function of time.

Additionally, upon rotation the user interface 2800 can update to include a chart (e.g., a bar graph) illustrating which metrics caused the particular user account's 2814 risk value to be high. For instance, a rectangle can be presented that extends from a lower portion 2816 of the network risk map 2802 to a location of the circle associated with the particular user account 2814, with portions of the rectangle sized according to an effect of metrics associated with determining compromise likelihood. Similarly, a rectangle can be presented that extends from a left portion 2818 of the network risk map 2802 to the location of the circle associated with the particular user account 2814, with portions of the rectangle sized according to an effect of metrics associated with determining compromise value. Each portion can include descriptive text identifying an associated metric.

Furthermore, the user can indicate that the rectangle (e.g., bar graph) associated with either compromise value or compromise likelihood is to be presented, and extended across a multitude of periods of time. That is, the makeup of either compromise value or compromise likelihood can be presented as a function of time. In this way, the user can determine which metrics are affecting the user over time. For example, a bar graph associated with compromise value can be extended as a function of time, and the user interface can present a multitude of bar graphs (e.g., adjacent bar graphs) with differently sized portions according to values of particular metrics. Any investments made to metrics can be specified in the user interface, such that the user can determine whether investments to reduce effects of metrics are working (e.g., an effect of a metric should be reduced, that is a portion of the rectangle should be smaller, if an investment is working).

The above description included a user rotating a user device to view information specific to a particular user account. In some implementations, the described views can be presented upon interaction with one or more selectable options, and can be presented on user devices that do not include sensors to monitor rotations.

Figure 28C:
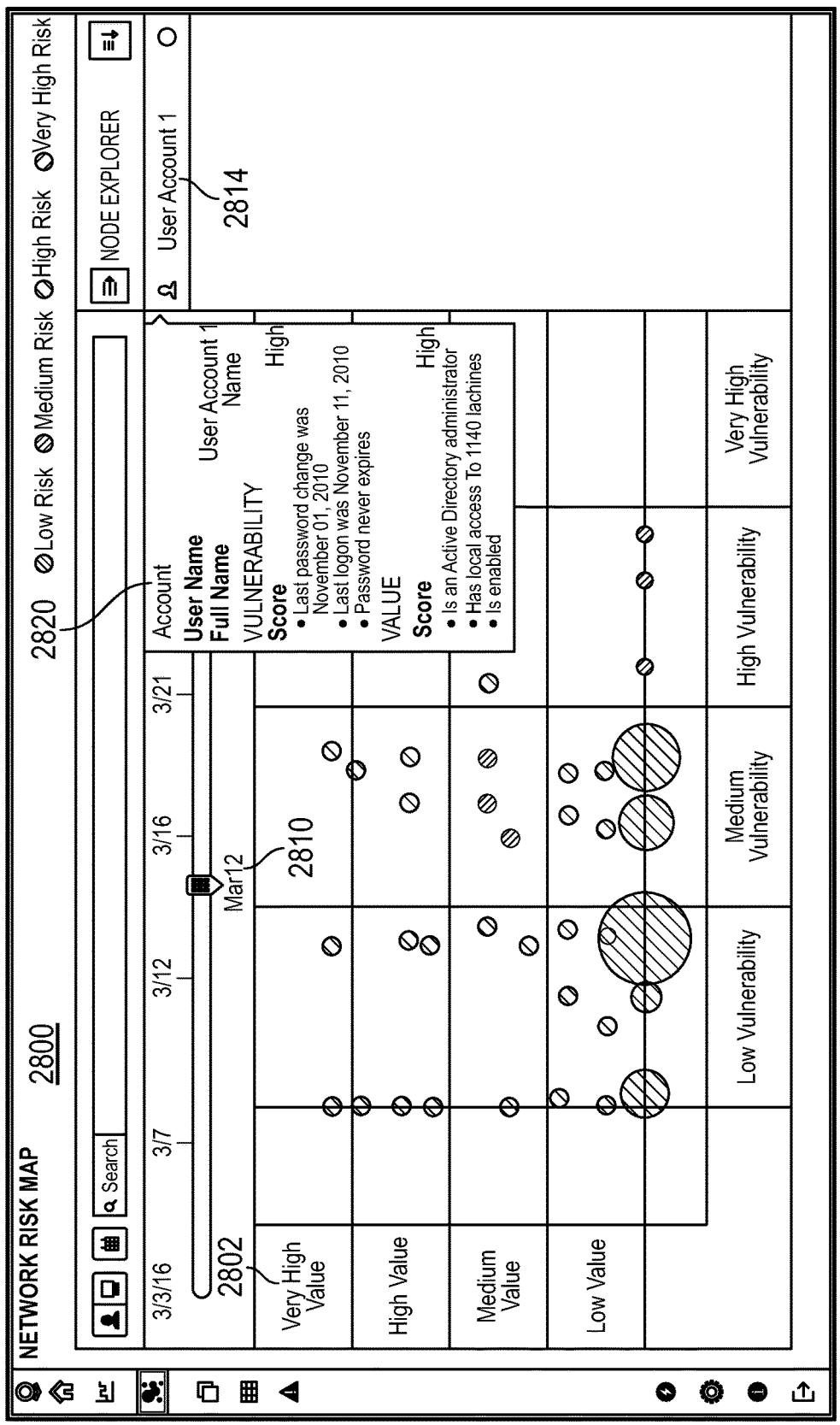
FIG. 28C illustrates an example user interface presenting summary information associated with a particular user account.

FIG. 28C illustrates an example user interface 2800 presenting summary information 2820 associated with a particular user account 2814. The summary information 2820 includes indications of metrics that are affecting the particular user account 2814. A user viewing user interface 2800 can determine that metrics associated with the particular user account's 2814 password are affecting risk, and provide information to the particular user account to change his/her password. Additionally, the user can cause the password of the particular user account 2814 to no longer be valid, and force a password change.

Figure 28D:
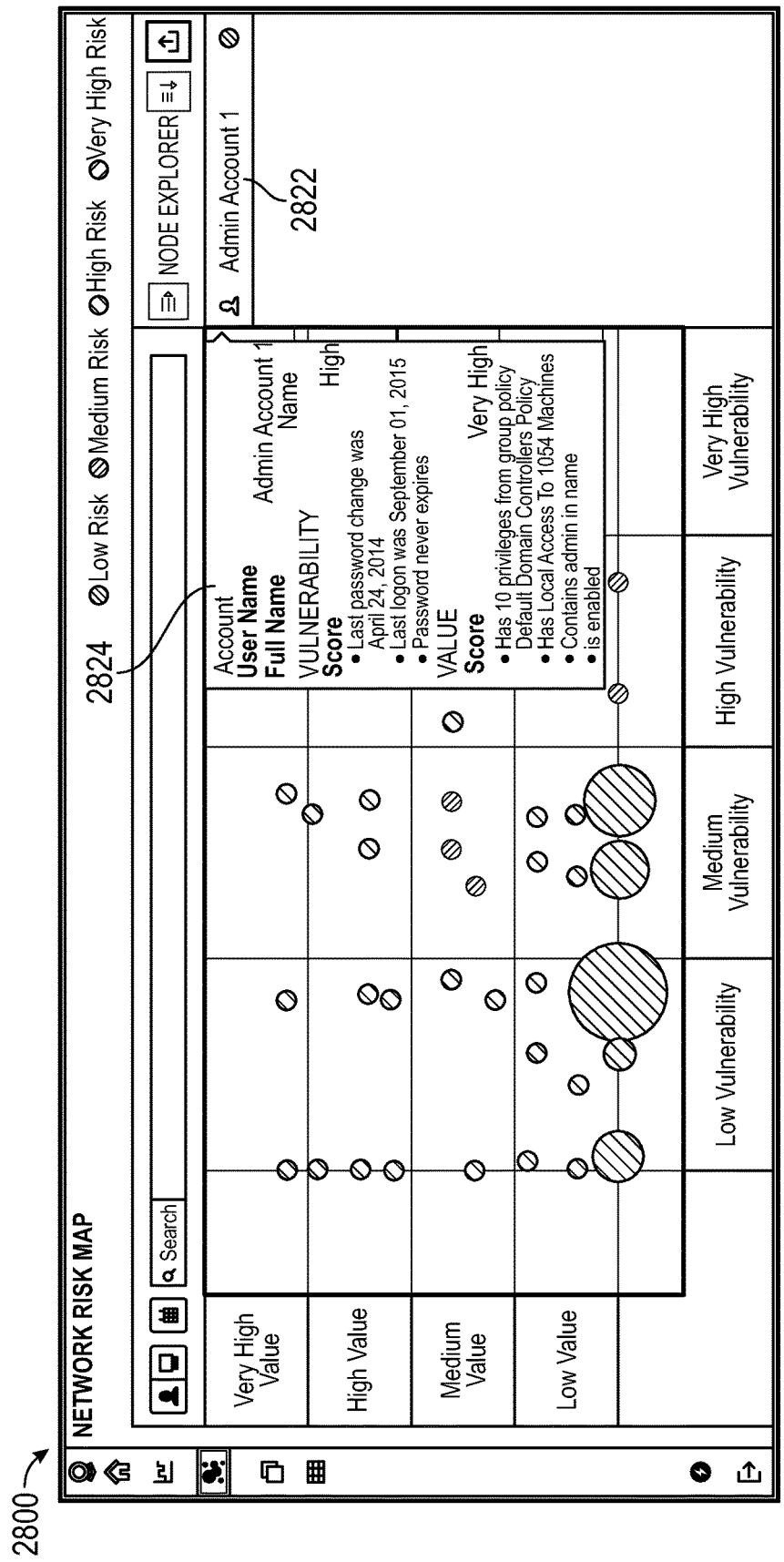
FIG. 28D illustrates a second example user interface presenting summary information associated with a user account.

FIG. 28D illustrates a second example user interface 2800 presenting summary information 2824 associated with a user account 2822. The user interface 2800 is presenting summary information 2824 associated with a different user account (e.g., "Admin Account 1") 2822.

Figure 28E:
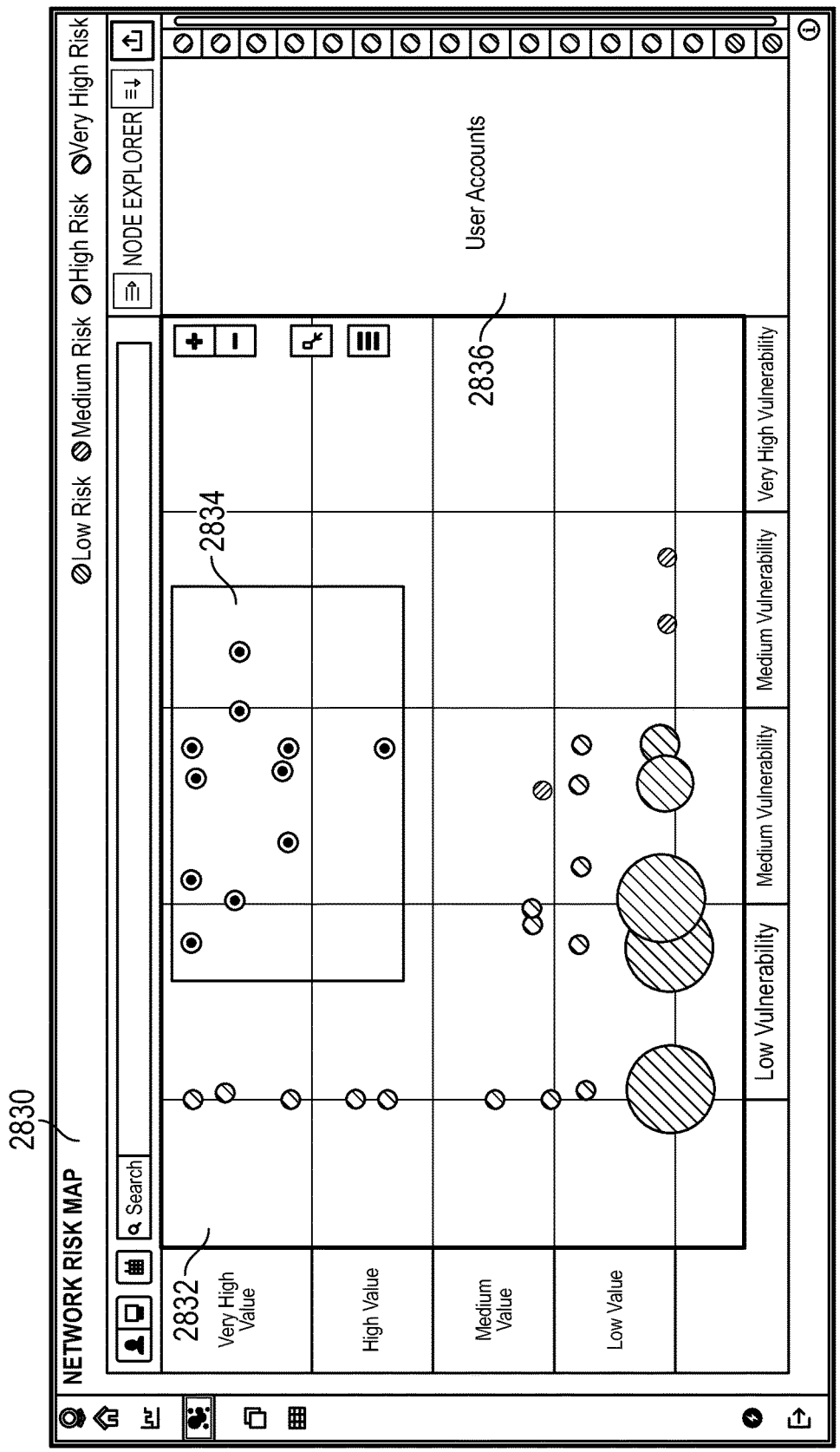
FIG. 28E illustrates a user interface for exporting information associated with user accounts.

FIG. 28E illustrates a user interface 2830 for exporting information associated with user accounts. The user interface 2830 includes a network risk map 2832 presenting risk values of user accounts, however exporting information can function similarly for a network risk map presenting risk values of network devices. A user of the user interface 2830 can request that information included in the network risk map 2832 be exported (e.g., for later presentation, such as offline presentation, for storage, and so on). The user can utilize a touch sensitive screen of a user device to generate a polygonal boundary 2834 the inside of which specifies user accounts that are to be exported. For instance, the user can identify a particular corner of the boundary 2834, and with one or more other fingers draw the shape into existence. Similarly, the user can utilize a mouse, or other input device, to specify the boundary 2834.

The user accounts included in the boundary 2834 are then presented in the user interface 2830, for instance in the portion 2836 (e.g., an identifier of each user account along with a graphical depiction of a risk value, for instance based on a color or pattern as described in FIG. 28A). The user can then request that information associated with each user account be exported (e.g., the user can interact with a user interface element, or the exporting process can begin automatically). The information can be exported as a document (e.g., a comma separate value CSV document), that specifies details of each user account, including one or more of: values of metrics utilized in determining a compromise value, compromise risk, methods of computing an effect of the metrics, configuration information, user account access information, and other information that was utilized in determining a risk value, user profile information specifying the user account, and so on.

Multiple Data Visualizations

As described above, methods of computing effects of metrics (e.g., weights applied to metrics when determining compromise values and/or compromise likelihoods) can be modified by a user, and the modifications can be applied to generate updated network risk maps. Optionally, multiple network risk maps can be viewed at the same time, with each network risk map being associated with distinct methods of computing the effects of metrics. For instance, a user can view two or more risk maps, and specify that each risk map is to have different weights applied to metrics. In this way, the user can quickly compare network risk maps to, for instance, determine a network risk map that most accurately describes risk values, or provides risk values for different scenarios in which the user is interested. For example, the user may want to compare the effects of distinct metrics on risk values, and can separately increase particular metrics for respective network risk maps. The user can then, for instance, quickly view users' locations within the respective network risk maps. Optionally, the user can select a user account in a first network risk map, and the selection can be carried to one or more other displayed network risk maps (e.g., the user can specify that selections of information included in particular network risk maps are to be shared with other network risk maps, so that the shared network risk maps can automatically select the same information). In this way, the user can select a user account or network device, and view information associated with the selected user account or network device across one or more other network risk maps.

Sharing Network Risk Maps

As described above, information associated with network risk maps can be shared with users that maintain, or control, or secure, one or more networks, such that the users can apply the information to their respective networks. Information associated with networks includes search information (e.g., search queries entered in the search user interface element 2812 illustrated in FIG. 28A), methods of computing effects of metrics (e.g., weights applied to metrics when determining compromise values and/or compromise likelihoods, and so on as described in FIG. 26), and so on.

As an example described above, a user associated with a network can determine that particular search information was the most useful for identifying network devices that should be monitored (e.g., in response to an attack by a malicious actor, or in response to an exploit being released). The search information can indicate, for instance, that network devices which have the greatest quantities of a particular type of data, and which execute a particular version of software (e.g., OpenSSL), and which are accessed by administrator accounts, should be monitored, disabled, modified (e.g., the version of the software should be upgraded), and so on. In some implementations, the user can cause the disabling, modification, using one or more user interfaces. That is, each network device can execute an agent that is in communication with the system, and which can modify aspects of the network device (e.g., disable or delete software, modify software, turn the network device off, and so on).

A different user associated with a different network can receive (e.g., automatically receive as described in FIG. 29) the particular search information, and apply the search information to the different user's network (e.g., a system, similar or same as the network risk assessment system 100, can apply the search information). As described in FIGS. 28A-28D, the search information can filter, or refine, a network risk map associated with the different network, drawing focus towards particular network devices or user accounts. For example, the filtered, or refined, network risk map can particular network devices, and the user can monitor one or more of the particular network devices associated with a high compromise value (e.g., greater than a threshold).

As described above, methods of computing effects of metrics can also be shared. For instance, a user can determine that a metric measuring particular aspects of network devices should be weighted substantially higher, and can modify the weighting. These modified methods can be provided to other users to be applied to the users' respective networks, optionally in addition to search information being provided.

For example, a user can determine that a network device or user account was likely compromised by an attacker utilizing a particular combination of factors. For instance, network devices compromised by an attacker may all have executed a particular operating system, been accessible by administrator accounts, and so on. In addition, the user can determine that a threshold amount (e.g., a majority) of network devices were executing a particular version of software, or the user can determine that the network devices being compromised were in communication paths (e.g., determined using a network topology) with network devices that store a particular type of information (e.g., sensitive information, information associated with a particular software application, and so on). In this way, the user can determine that search information is to include network devices associated with the particular operating system that are accessible by administrator accounts. The user can then specify that a weight of a metric associated with network devices executing the particular version of software is to be increased, or a weight associated with network devices in communication paths with network devices that store the particular type of information is to be increased. In this way, the user can filter network devices based on what the user has seen on the user's network, and can increase a compromise likelihood and/or a compromise value based on metrics that the user has seen, or suspects, may need to be increased.

The system can, in some implementations, determine search information and/or methods of computing effects of metrics based on obtained exploit information (e.g., the system can determine search information associated with the exploit, such as a type of affected software application and so on, as described above in FIG. 13). Additionally, subsequent to a compromise of a network, the system can determine commonalities of aspects of user accounts or network devices that are associated with user accounts or network devices actually compromised. In this way, the system can determine that particular aspects are to be included in search information (e.g., such that network risk maps solely focus on the aspects), while weights associated with particular metrics are to be increased (e.g., such that network risk maps place an added emphasis of the metrics).

Sharing information associated with a network risk map can be made automatic (e.g., users can automatically receive information associated with network risk maps from other networks). The shared information can be triggered according to external events (e.g., described above), or can be triggered periodically based on time. Additionally, users can subscribe to updates from other users (e.g., select users), for instance users that maintain similar networks (e.g., similarly created, are associated with a similar business, and so on). The system can trigger updates to shared information and provide the time-sensitive information to be applied to other networks (e.g., the system can activate a system that determines risk values of user accounts and/or network devices for each network). In some implementations, a user of a network can logon, and immediately view one or more network risk maps of the user's networks, with a particular (or more) network risk map being associated with information received from a different user of a different network (e.g., any updates the different user made can be automatically provided to the user and applied).

Figure 29:
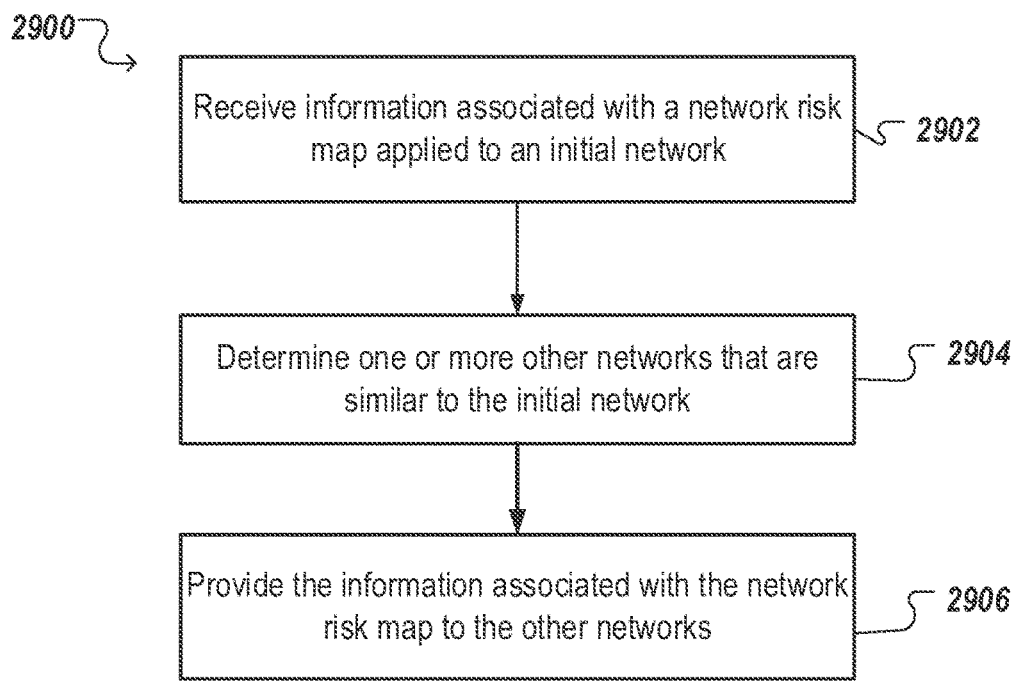
FIG. 29 illustrates an example process for sharing information associated with a network risk map.

FIG. 29 illustrates an example process 2900 for sharing information associated with a network risk map. For convenience, the process 2900 will be described as being performed by a system of one or more computers (e.g., the risk assessment system 100).

The system receives information associated with a network risk map applied to an initial network (block 2902). As described above, a user, or the system, can determine information associated with a network risk map that best identifies network devices and/or user accounts that are to be monitored after a particular event, such as an exploit being made public or otherwise available, or an attack having occurred on the user's networks.

The system determines one or more other networks that are similar to the initial network (block 2904). In response to an exploit being released, or an attack occurring on the initial network, other networks can preferably take proactive measures to guard their networks against the exploit being utilized, or a similar attack occurring on their networks. Networks that are similar to the initial network can benefit from information associated with the network risk map, such that users (e.g., security officers) associated with the other networks can quickly apply the information, and view respective network risk maps geared towards monitoring network devices and/or user accounts that may be compromised.

The system can measure similarity between networks according to values of common metrics utilized in determining risk values. For instance, the system can compare values of metrics determined for the initial network, with values of the same metrics determined for other networks. A measure of similarity can be increased between the initial network and other networks depending on a closeness and quantity of values of metrics.

Additionally, search information included in the information associated with the network risk map can be applied to other networks, and the system can determine whether network devices and/or user accounts filtered according to the search information are greater than a threshold in number or percentage, and optionally are associated with compromise values greater than a threshold. In this way, the system can determine whether an exploit, or attack, can be applied to the other networks as applied to the initial network.

The system provides the information associated with the network risk map to the determined networks (block 2906). As described above, the system can provide the information to other networks, enabling users of the other networks to monitor particular network devices and/or user accounts (e.g., network devices and user accounts at an increased risk of attack). In this way, an effectiveness of an attack on a network can be subsequently minimized once other networks are given the tools to monitor network devices and/or user accounts that are involved in the attack. In some implementations, the information can be specified in a document (e.g., an XML document, a CSV file) that includes search information, information describing metrics, associated weights or other methods of computing effects of the metrics, and so on).

Investments and Trend Information

As described above, with respect to, at least, FIG. 14, the system can determine investments that will cause a greatest reduction in risk values, cause a greatest reduction in a variance of risk values (e.g., lower risk values of the highest user accounts and/or network devices). The system can simulate which metrics are to be associated with investments to reduce risk values, and can present recommendations to the user. For instance, the system can determine an area under a curve sketched out by network devices or user accounts in a network risk map, and simulate which metrics can be reduced which would have a greatest reduction in the area (e.g., the area can represent an overall risk associated with the networks). In some implementations, the system can modify a reduction in the area according to a cost associated with implementing the reduction (e.g., a cost associated with one or more of, training employees, acquiring new software or systems, maintaining the software or systems, creating new software or hardware, and so on). For instance, changing a particular metric can be associated with a greatest reduction, but also be associated with a greatest cost. The system can therefore balance the reduction against the cost (e.g., a user can provide the cost information), and determine a best metric to invest in.

The system can further determine trends associated with groups of network devices and/or user accounts, and present the trend information to a user. For instance, the system can determine that when user accounts are grouped according to an employee role, and specifically an employee role for a particular office location, that a single group is unusually high, or has increased in risk value (e.g., measure of central tendency of risk value determined from risk values of user accounts included in the single group) at greater than a threshold rate.

Services

The description above includes, for instance, methods and systems utilized to determine risk values associated with user accounts and/or network devices. In some implementations, the system (e.g., risk assessment system 100) can determine risk values associated with services (e.g., software services). A service can include, for example, an online software service (e.g., software as a service application) that can be utilized to store arbitrary data related to work being performed by employees associated with user accounts. For instance, instead of storing data locally on a network device, a user can utilize a storage service that can maintain the data in cloud storage accessible using a user name/password, two factor authentication, and so on.

The system can determines metrics associated with compromise value and compromise likelihood of each service being utilized, and include an option to present risk values of services in one or more user interfaces (e.g., in the network risk map illustrated in FIGS. 28A-28D). As an example, the system can monitor (e.g., using application and proxy data), quantities and types of information that are being provided to a cloud storage service (e.g., the system can obtain information from agents executing on network devices that monitors the information being provided to the service). The system can obtain information identifying a value (e.g., importance) of particular types of data (e.g., based on metrics associated with network devices storing the particular types of data), and can increase a compromise value of a service that stores types of data known to be valuable. Additionally, the system can determine network devices associated with a high compromise value, and monitor services to which the determined network devices provide information). The system can infer that valuable network devices will also provide valuable information for storage in the cloud services.

Furthermore, the system can determine a compromise likelihood of each service according to an ease at which the service can be compromised. For instance, services that require two-factor authentication can be associated with a reduced compromise likelihood, and services that require passwords to be changed periodically and/or require passwords to be of a particular complexity, can also be associated with a reduced compromise likelihood. Compromise likelihood can further be determined from historical information describing a frequency at which user accounts associated with a service are compromised.

Services can additionally be incorporated into metrics associated with user accounts and/or network devices. For instance, a metric associated with measuring each user account's conformance to best practices can be modified to include whether each user account is utilizing approved services. That is, the system can increase a value of the metric upon determining that a user account provides information to a service that is not approved for use (e.g., the system can obtain proxy data, or other network information, specifying that particular quantities of data are being provided to unapproved services).

Other Embodiments

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method comprising:
   by a computing device having one or more computer processors and a non-transitory computer readable storage device storing software instruction for execution by the one or more computer processors,
   accessing:
      network device information indicating one or more of:
         configuration information of network devices within a network, or
         a network topology indicating communication paths between network devices determined using, at least, monitored network traffic between the network devices; and
      user account information indicating:
         user access rights of respective user accounts, and
         one or more of:
            profile information of respective user accounts,
            user account rules enforced on the network, or
            network actions associated with the user accounts;
   for each of the network devices and user accounts:
      determining a vulnerability indicating a likelihood of the network device or user account being compromised, the vulnerability based on values of a plurality of vulnerability metrics determined using network device information associated with the network device or user account information associated with the user account;
      determining an importance indicating a priority an attacker would place on compromising the network device or the user account, the importance based on values of a plurality of importance metrics determined using network device information associated with the network device or user account information associated with the user account;
   providing, for presentation, an interactive user interface comprising a visual representation of:
      at least some of the determined vulnerabilities for the network devices and/or the user accounts;
      at least some of the determined importances for the network devices and/or the user accounts,
      wherein the interactive user interface is operable to modify, in response to received input indicating a weighting for one or more network device, user account, vulnerability metric, or importance metric, the determined vulnerabilities and/or importances, included in the interactive user interface;
   receiving, in the interactive user interface, input associated with modifying an adjustable user interface element indicating a time period associated with determining vulnerabilities and determining importances; and
   updating, in the interactive user interface based on the indicated time period, the visual representation, thereby presenting increases or decreases in respective vulnerabilities or importances, for the network devices and/or the user accounts.

2. The method of claim 1, further comprising:
providing, for presentation, selectable options associated with creating a vulnerability metric or an importance metric, the selectable options including indications of aspects of network devices or user accounts to be associated with the created vulnerability metric or importance metric; and
receiving selections of indications of aspects, and values associated with respective aspects, wherein the values indicate conditions that are to be satisfied for the vulnerability metric or importance metric to be associated with an effect on a vulnerability or an importance.

3. The method of claim 2, further comprising:
receiving information associated with an effect of the created vulnerability metric or importance metric when determining a vulnerability or an importance, the information specifying a weighting to be applied a value of the created vulnerability metric or importance metric.

4. The method of claim 1, wherein the interactive user interface includes a search user interface element, and wherein the method further comprises:
receiving a search query specifying aspects of network devices or user accounts; and
filtering the network devices or user accounts based on the aspects specified in the search query, and presenting network devices or user accounts that are associated with the specified aspects.

5. The method of claim 4, further comprising:
monitoring received search queries, and sharing one or more received search queries with an outside system associated with a different network, wherein the outside system determines vulnerabilities and importances for network devices and/or user accounts that are associated with the different network, and wherein the received search queries filter the network devices and/or user accounts based on respective specified aspects.

6. A computerized method comprising:
by a computing device having one or more computer processors and a non-transitory computer readable storage device storing software instruction for execution by the one or more computer processors, the computing device and a plurality of network devices coupled to a network;
obtaining, by the computing device via the network, configuration information describing at least some of the network devices within the network;
determining, from the configuration information and for at least one network device, one or more metrics measuring aspects of a network device compromise vulnerability of the network device;
obtaining indications of user access rights of user accounts to respective network devices;
determining, for each network device and using the user access rights and configuration information, one or more metrics measuring aspects of a network device compromise value of the network device; and
determining, for at least one user account, one or more metrics measuring aspects of a user account compromise vulnerability, and one or more metrics measuring aspects of a user account compromise value.

7. The method of claim 6, further comprising:
generating user interface data for presentation, the user interface data comprising a visual representation of one or more of:
network device compromise vulnerabilities mapped to corresponding network device compromise values, or
user account compromise vulnerabilities mapped to corresponding user account compromise values.

8. The method of claim 7, wherein the visual representation associated with network devices comprises a chart mapping, for each network device, a network device compromise vulnerability to a network device compromise value of the network device, the mapping for the network device comprising a visual element included in the chart.

9. The method of claim 6, further comprising:
obtaining information identifying a real world event that informs or affects one or more metrics associated with user account compromise vulnerabilities and/or network device compromise vulnerabilities, the information associated with a portion of configuration information and/or user account information; and
modifying compromise vulnerabilities of user accounts and/or network devices with same user account information and/or configuration information as the obtained information.

10. The method of claim 9, further comprising:
generating user interface data illustrating the modification.

11. The method of claim 6, wherein determining, for a particular network device, a metric measuring an aspect of a network device compromise value of the particular network device comprises:
obtaining information describing network traffic between the network devices;
determining, based on the information describing network traffic, a network topology of the network, wherein the network topology comprises a plurality of nodes each connected by an edge to one or more of the plurality of nodes, wherein each edge indicates a communication path, and wherein each node is associated with one or more network devices;
determining a number of edges connecting to a node associated with the particular network device; and
assigning a value associated with the metric based on the determined number of edges.

12. The method of claim 6, further comprising:
receiving an indication of a metric measuring aspects of a network device compromise value or network device compromise vulnerability or user account compromise value or user account compromise vulnerability;
monitoring, over a threshold amount of time, a number of network devices or user accounts that are affected by the metric; and
providing, for presentation, information associated with a reduction in the number of network devices or user accounts that are effected by the metric.

13. A system comprising one or more computer systems and one or more computer storage media storing instructions that when executed by the computer systems cause the computer systems to perform operations, the system and a plurality of network devices being coupled to a network, and the operations comprising:
obtaining, by the system via the network, configuration information describing at least some of the network devices within the network;

determining, from the configuration information and for at least one network device, one or more metrics measuring aspects of a network device compromise vulnerability of the network device;

obtaining indications of user access rights of user accounts to respective network devices;

determining, for each network device and using the user access rights and configuration information, one or more metrics measuring aspects of a network device compromise value of the network device; an determining, for at least one user account, one or more metrics measuring aspects of a user account compromise vulnerability, and one or more metrics measuring aspects of a user account compromise value.

14. The system of claim 13, wherein the operations further comprise:

generating user interface data for presentation, the user interface data comprising a visual representation of one or more of:

network device compromise vulnerabilities mapped to corresponding network device compromise values, or user account compromise vulnerabilities mapped to corresponding user account compromise values.

15. The system of claim 14, wherein the visual representation associated with network devices comprises a chart mapping, for each network device, a network device compromise vulnerability to a network device compromise value of the network device, the mapping for the network device comprising a visual element included in the chart.

16. The system of claim 13, wherein the operations further comprise:

obtaining information identifying a real world event that informs or affects one or more metrics associated with user account compromise vulnerabilities and/or network device compromise vulnerabilities, the information associated with a portion of configuration information and/or user account information; and modifying compromise vulnerabilities of user accounts and/or network devices with same user account information and/or configuration information as the obtained information.

17. The system of claim 16, wherein the operations further comprise:

generating user interface data illustrating the modification.

18. The system of claim 13, wherein determining, for a particular network device, a metric measuring an aspect of a network device compromise value of the particular network device comprises:

obtaining information describing network traffic between the network devices;

determining, based on the information describing network traffic, a network topology of the network, wherein the network topology comprises a plurality of nodes each connected by an edge to one or more of the plurality of nodes, wherein each edge indicates a communication path, and wherein each node is associated with one or more network devices;

determining a number of edges connecting to a node associated with the particular network device; and assigning a value associated with the metric based on the determined number of edges.

19. The system of claim 13, wherein the operations further comprise:

receiving an indication of a metric measuring aspects of a network device compromise value or network device compromise vulnerability or user account compromise value or user account compromise vulnerability;

monitoring, over a threshold amount of time, a number of network devices or user accounts that are affected by the metric; and providing, for presentation, information associated with a reduction in the number of network devices or user accounts that are effected by the metric.

20. A computerized method comprising:

by a computing device having one or more computer processors and a non-transitory computer readable storage device storing software instruction for execution by the one or more computer processors, accessing:

network device information indicating one or more of:
configuration information of network devices within a network, or
a network topology indicating communication paths between network devices determined using, at least, monitored network traffic between the network devices; and user account information indicating:
user access rights of respective user accounts, and
one or more of:
profile information of respective user accounts, user account rules enforced on the network, or network actions associated with the user accounts;

for each of the network devices and user accounts:

determining a vulnerability indicating a likelihood of the network device or user account being compromised, the vulnerability based on values of a plurality of vulnerability metrics determined using network device information associated with the network device or user account information associated with the user account;

determining an importance indicating a priority an attacker would place on compromising the network device or the user account, the importance based on values of a plurality of importance metrics determined using network device information associated with the network device or user account information associated with the user account;

providing, for presentation, an interactive user interface comprising a visual representation of:

at least some of the determined vulnerabilities for the network devices and/or the user accounts;

at least some of the determined importances for the network devices and/or the user accounts;

receiving, in the interactive user interface, input associated with modifying one or more weightings for one or more network device, user account, vulnerability metric, or importance metric, the determined vulnerabilities and/or importances, included in the interactive user interface; and updating, in the interactive user interface based on the input, the visual representation, thereby presenting increases or decreases in respective vulnerabilities or importances, for the network devices and/or the user accounts.

21. The method of claim 20, wherein the interactive user interface is further operable to adjust a time period associated with determining vulnerabilities and determining importances, wherein vulnerabilities and importances are determined based on network device information and user account information associated with the adjusted time period.

22. The method of claim 20, further comprising:
providing, for presentation, selectable options associated with creating a vulnerability metric or an importance metric, the selectable options including indications of aspects of network devices or user accounts to be associated with the created vulnerability metric or importance metric; and
receiving selections of indications of aspects, and values associated with respective aspects, wherein the values indicate conditions that are to be satisfied for the vulnerability metric or importance metric to be associated with an effect on a vulnerability or an importance.

23. The method of claim 22, further comprising:
receiving information associated with an effect of the created vulnerability metric or importance metric when determining a vulnerability or an importance, the information specifying a weighting to be applied a value of the created vulnerability metric or importance metric.

24. The method of claim 20, wherein the interactive user interface includes a search user interface element, and wherein the method further comprises:
receiving a search query specifying aspects of network devices or user accounts; and
filtering the network devices or user accounts based on the aspects specified in the search query, and presenting network devices or user accounts that are associated with the specified aspects.

25. The method of claim 24, further comprising:
monitoring received search queries, and sharing one or more received search queries with an outside system associated with a different network, wherein the outside system determines vulnerabilities and importances for network devices and/or user accounts that are associated with the different network, and wherein the received search queries filter the network devices and/or user accounts based on respective specified aspects.

* * * * *